US011600263B1

(12) United States Patent
Blair et al.

(10) Patent No.: US 11,600,263 B1
(45) Date of Patent: Mar. 7, 2023

(54) NATURAL LANGUAGE CONFIGURATION AND OPERATION FOR TANGIBLE GAMES

(71) Applicant: Amazon Technologies, Inc., Seattle, WA (US)

(72) Inventors: James Robert Blair, Seattle, WA (US); Mark Chien, Bellevue, WA (US); Farah Lynn Houston, Seattle, WA (US); Steven T Rabuchin, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 322 days.

(21) Appl. No.: 16/914,603

(22) Filed: Jun. 29, 2020

(51) Int. Cl.
*G06F 40/00* (2020.01)
*G10L 15/18* (2013.01)
(Continued)

(52) U.S. Cl.
CPC .......... *G10L 15/18* (2013.01); *A63F 11/0074* (2013.01); *G06F 40/20* (2020.01);
(Continued)

(58) Field of Classification Search
CPC ................. G10L 15/18; A63F 11/0074; A63F 2011/0086; G06F 40/20; G06F 40/40;
(Continued)

(56) References Cited

U.S. PATENT DOCUMENTS 10,282,280 B1 * 5/2019 Gouskova ........... G06F 11/3684
10,319,365 B1 * 6/2019 Nicolis ................... G10L 15/26
(Continued)

FOREIGN PATENT DOCUMENTS

CN 107875625 4/2018
WO WO-2021058749 A1 * 4/2021 ........... G06N 3/0454

OTHER PUBLICATIONS

C. Magerkurth, M. Memisoglu, T. Engelke, N.A. Streitz: (Towards the next generation of tabletop gaming experiences. Graphics Interface 2004 (GI'04), London (Ontario), Canada, May 17-19, 2004. pp. 73-80, AK Peters) (Year: 2004).*

(Continued)

*Primary Examiner* — Huyen X Vo
*Assistant Examiner* — Philip H Lam
(74) *Attorney, Agent, or Firm* — Pierce Atwood LLP

(57) ABSTRACT

This disclosure describes a tabletop game assistant system configured to ingest and guide tangible games (such as board games, card games, etc.) using natural language interaction and image capture/visual display components. The system can include features enabling a game developer to "teach" the system the rules of a game using natural language, such as written instructions, to reduce or eliminate the need for writing dedicated code. The system may process images of a game board and/or tokens such as game pieces and/or cards to further generate game data in the form of a logical game model. The system can use the game data to guide human players of the game and, in some cases, participate as a player itself. The system may further be configured to observe a game and detect invalid actions, answer questions regarding the rules, and suggest moves. The system may provide additional utilities such as generating a random output (e.g., rolling virtual dice) and learning to recognize new game pieces.

20 Claims, 39 Drawing Sheets

(51) Int. Cl.
*A63F 11/00* (2006.01)
*G09B 19/22* (2006.01)
*G06T 1/00* (2006.01)
*G06F 40/20* (2020.01)
*G06T 7/00* (2017.01)
*G06K 9/00* (2022.01)
*G06F 40/40* (2020.01)
*G06T 7/13* (2017.01)

(52) U.S. Cl.
CPC ............... *G06F 40/40* (2020.01); *G06K 9/00* (2013.01); *G06T 1/00* (2013.01); *G06T 7/00* (2013.01); *G06T 7/13* (2017.01); *G09B 19/22* (2013.01); *A63F 2011/0086* (2013.01)

(58) Field of Classification Search
CPC .... G06K 9/00; G06T 1/00; G06T 7/00; G06T 7/13; G09B 19/22
See application file for complete search history.

(56) References Cited

U.S. PATENT DOCUMENTS

| | | | |
|---|---|---|---|
| 10,748,529 B1 | 8/2020 | Milden | |
| 11,176,776 B1* | 11/2021 | Joshi | A63F 3/00643 |
| 2007/0015583 A1* | 1/2007 | Tran | G07F 17/32 463/40 |
| 2008/0242422 A1* | 10/2008 | Kropivny | A63F 13/00 463/42 |
| 2009/0172659 A1* | 7/2009 | Oberg | A63F 13/31 717/178 |
| 2010/0121808 A1 | 5/2010 | Kuhn | |
| 2010/0150102 A1* | 6/2010 | Li | H04W 36/24 455/436 |
| 2010/0331085 A1 | 12/2010 | Nagano | |
| 2013/0267319 A1* | 10/2013 | Kuhn | G07F 17/3223 463/34 |
| 2015/0297984 A1* | 10/2015 | Ogilvie | A63F 11/00 273/148 R |
| 2016/0206953 A1 | 7/2016 | McCracken | |
| 2017/0068670 A1* | 3/2017 | Orr | G06F 40/40 |
| 2019/0189019 A1* | 6/2019 | Hammersley | G06N 20/00 |
| 2020/0030702 A1* | 1/2020 | Benedetto | A63F 13/79 |
| 2020/0368616 A1* | 11/2020 | Delamont | A63F 13/213 |
| 2021/0134285 A1 | 5/2021 | Santiago | |
| 2021/0283497 A1* | 9/2021 | Gullicksen | G06T 19/20 |
| 2021/0350660 A1* | 11/2021 | Steelman | G07F 17/3276 |
| 2021/0379489 A1* | 12/2021 | Thorborg | A63F 13/56 |

OTHER PUBLICATIONS

The Examiner's attention is hereby drawn to the specification and file history of co-pending U.S. Appl. No. 16/914,688, entitled "Natural Language Configuration and Operation for Tangible Games", filed Jun. 29, 2020, which may contain information relevant to the present application.

Voice-Command Chess Board Powered By Alexa by: Lewin Day (https://hackaday.com/2020/06/22/ voice-command-chess-board-powered-by-alexa/) (Year: 2020).

Game Changer: Accessible Audio and Tactile Guidance for Board and Card Games; https://dl.acm.org/doi/abs/10.1145/ 3371300. 3383347 (Year: 2020).

* cited by examiner

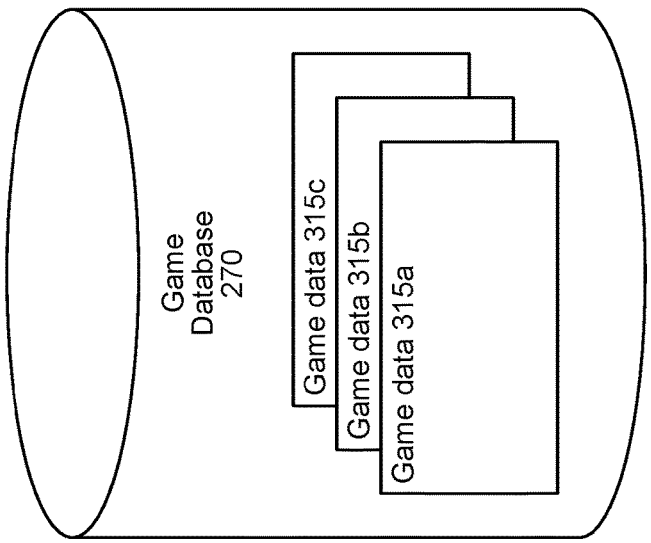
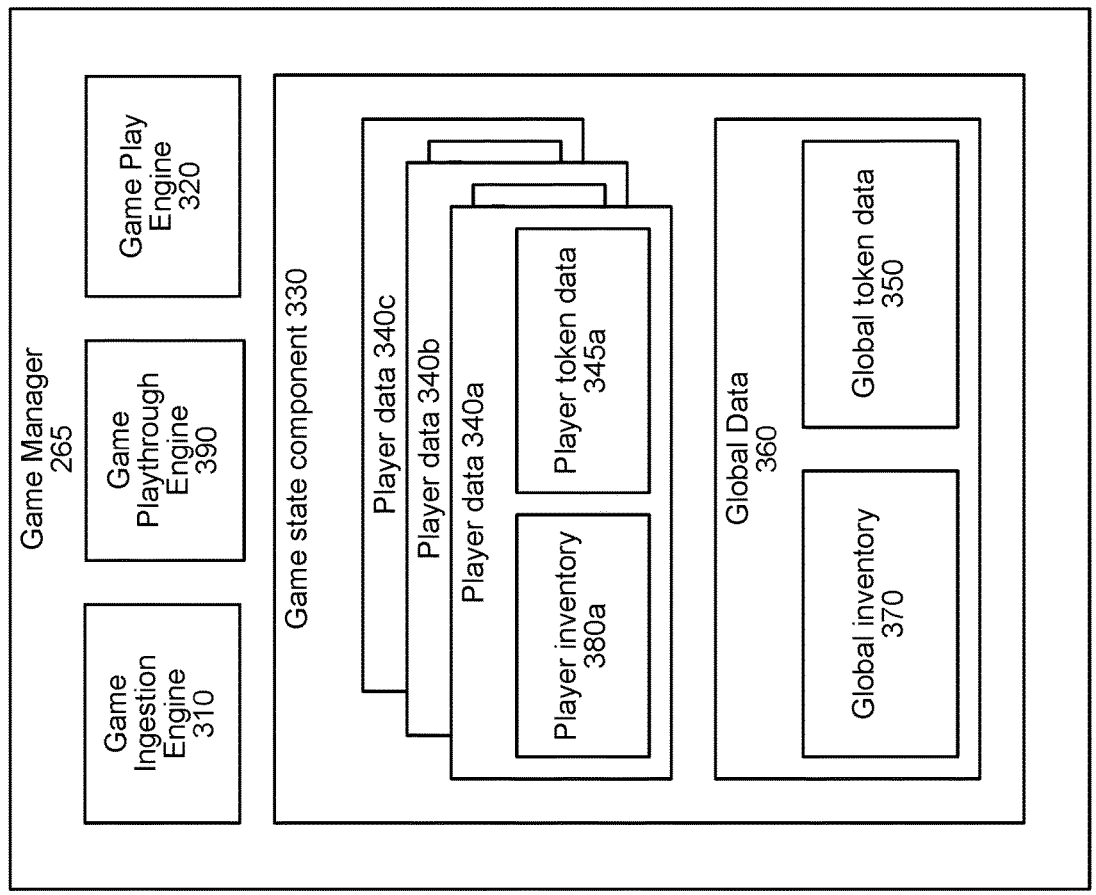
FIG. 3

FIG. 19

| Content Source | Topic | Content Text Data |
|---|---|---|
| Game Instructions | Setup | Game Setup Data |
| Game Instructions | Winning | Game Objective Data |
| Game Instructions | Game End | Game Objective Data |
| Game Instructions | Player | Player Data |
| Game Board Text | Token | Token Data |
| Game Board Text | Randomizer | Randomizer Data |

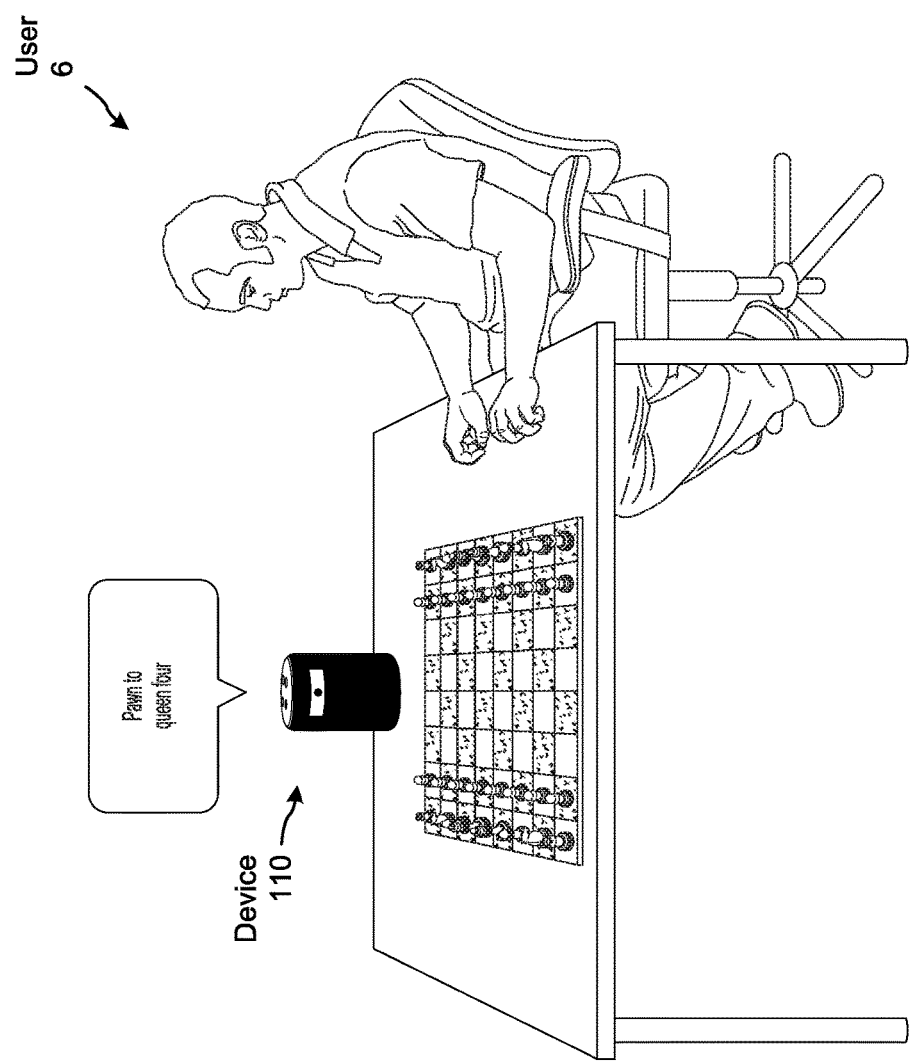

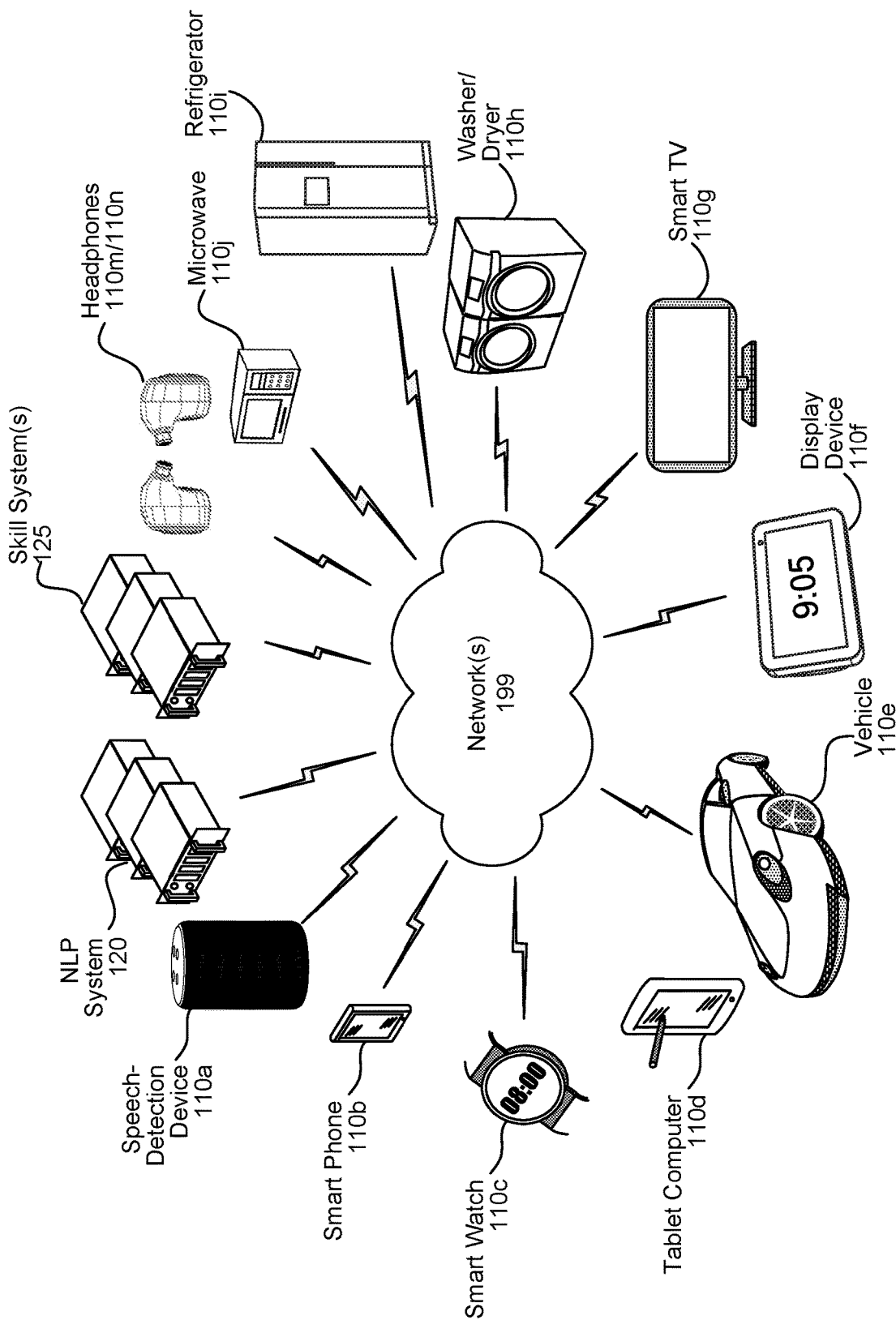

NATURAL LANGUAGE CONFIGURATION AND OPERATION FOR TANGIBLE GAMES

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 3 is a conceptual diagram of a game manager and a game database, according to embodiments of the present disclosure.

FIG. 19 illustrates stored and associated content data and metadata for easy recall in response to receiving a spoken command according to embodiments of the present disclosure.

FIG. 32 illustrates the system using natural language to dictate a move of a computerized player to a human player, according to embodiments of the present disclosure.

FIG. 38 illustrates an example of a computer network for use with the overall system, according to embodiments of the present disclosure.

DETAILED DESCRIPTION

Figure 1:
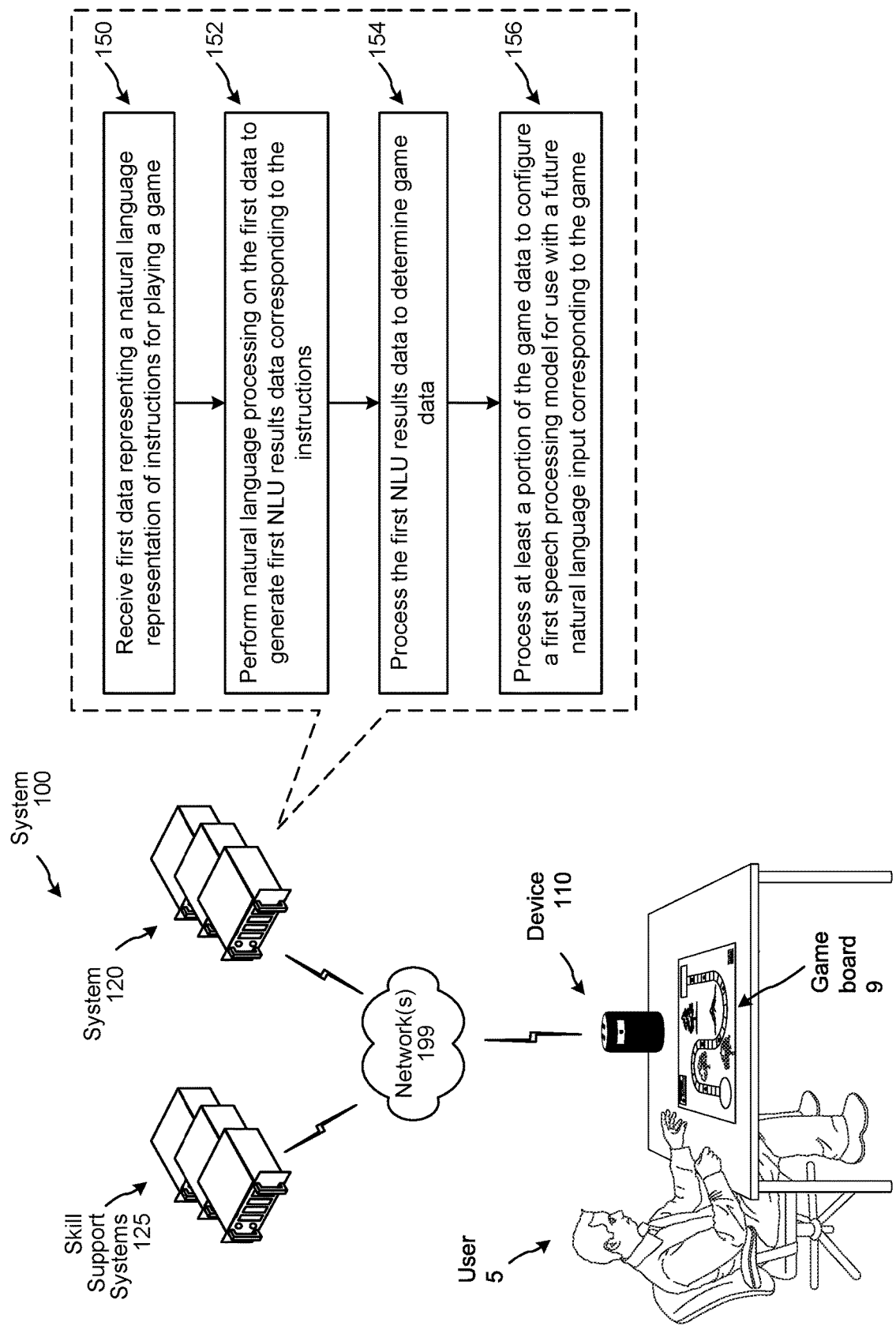
FIG. 1 is a conceptual diagram illustrating a system for natural language configuration of a tabletop/tangible game assistant, according to embodiments of the present disclosure.

Tabletop gaming (for example playing games with a board, cards, or other tangible tokens) represent a large and growing field. New board games, card games, and dice games are authored every year. With the number and complexity of games growing, the burden of reading and understanding game instructions reduces actual playing time and limits the number of new games players can learn. Meanwhile, advances in speech processing and computerized speech generation have made it possible for users to interact with computing devices by voice using natural language. A voice-enabled device/system, sufficiently configured, could act as an assistant, guiding players through tangible game setup and gameplay, possibly answering questions about game rules, detecting invalid moves, and suggesting moves to a frustrated player. In some cases, such a system may be able to act as an additional player or players as well with the system capable of determining what is happening with the tangible game through inputs such as image data and audio data (such as through processing a user's spoken input) and comparing the inputs with game data to participate in the game and/or assist with user play.

Configuring such assistant system presents additional challenges. Guiding and/or participating in a tabletop game may require sophisticated programming that traditionally may have been input as code by a trained programmer or team of programmers. A game developer may not have sufficient programming skill to configure such a system themselves, nor the resources to hire a programmer or programmers.

The following therefore describes systems and methods that leverage speech processing, computer vision, natural language generation, and other techniques, to configure a voice-enabled gaming system. This disclosure describes ingesting data (e.g., receiving, processing, and storing) representing natural language rules for a tabletop game system that can guide, referee, and/or participate in a game through spoken interactions and/or a camera and projector/screen interface. The tabletop game system may include features that enable a game developer to "teach" the system the rules of a game using natural language inputs to reduce or eliminate the need for providing dedicated code to train the system. For example, the developer can provide the system with instructions for the game in the form of a data file (for example through an application programming interface (API) or other mechanism) including text data or image data corresponding to images of a printed instruction booklet. For board games, the developer can additionally provide image data or other data representing the board. The developer can also input data about tokens such as game pieces and/or cards. The system can build a logical model of the game and refer to the model to guide human players of the game and, in some cases, participate as a player itself.

The system may be configured to incorporate user permissions and may only perform activities disclosed herein if approved by a user. As such, the systems, devices, other types of components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Further described is a tabletop game system that can participate in (e.g., referee) a game through spoken interactions and/or a camera and projector/screen interface. The system may include features for guiding players of the game and/or participating as a player in the game. The system can receive data describing a logical model of the game and guide human players on game setup. The system can describe rules verbally (for example through a text-to-speech interface), and follow play by, e.g., microphone and/or camera to ensure compliance with rules. For games in which a token, such as a card or other type of game piece, is standard in function but varies in appearance, the system can ask a player to "show" the token to the camera (e.g., place into the camera's field of view) so the system can learn how to recognize the token through image data captured by the camera. In some implementations, the system may include a projector for using light to show on a physical surface moves, a game piece, game board, etc. The system may also make use of user recognition and/or user sentiment detection to customize game play for a particular user and/or customize a response for a user who may be, for example, happy or frustrated.

The system can leverage different computerized voice-enabled technologies. Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of computer science concerning transforming textual and/or other data into audio data that is synthesized to resemble human speech. ASR, NLU, and TTS may be used together as part of the speech-processing system.

Categories of tabletop games can include games of strategy and chance, generally falling into several categories with overlap between them; for example, board games, card games, and dice games. Games can include a game board that can set out game spaces with relationships between them that can be defined by the rules of the game. A game board can be represented logically, for example by data representing to a graph where the spaces are nodes and the relationships are indicated by edges. Each edge and/or node can be assigned certain properties. In some cases, the graph may represent a grid, with interconnected squares, triangles, hexagons, etc. In some cases, a directed graph may represent a linear progression of spaces and possibly include shortcuts between non-adjacent spaces. Other examples of graphical representations are possible. Games can include tokens such as one or more game pieces or cards. Other tokens can include other objects used to indicate additional properties of a player, a space on a board, or another token. Games can include inventories such as a global and/or "house" (e.g., user-specific, special edition, custom, damaged) inventory and/or player inventories. Inventories can include game pieces, tokens, money, points, or other quantity.

At each point in time, a game can have a state that describes information about the game such as game piece positions (e.g., with reference to nodes on the graph), inventories, whose turn it is, and/or a current stage of a game (e.g., which rules are in effect if the rules change over the course of the game). For example, a game can begin with an initial state described by the instructions and taking into account the number of players and any rule modifications adopted by the players, game player difficulty adjustments, etc. A game progression may be divided into different portions. For the purpose of the description herein, a game may be divided into stages, with different rules applying to each stage. A game may be divided into rounds, with a round consisting of one turn taken by each player and, in some cases, the house. Each turn may include one or more events, described further below. Each event changes the game state. An event can include engaging a random output generator, or "randomizer" for short; for example, rolling dice, drawing card from a shuffled deck, flipping a coin, or spinning a spinner. An event can include an action, such as discretionary or mandatory, taken by a player or players and/or the house (which may include a discretionary use of the randomizer). An action may include moving or placing a piece, drawing a token, trading money for a token, etc. Actions may be dictated or limited by a randomizer output. An event can include performing a calculation and/or applying one or more conditions at some point during a turn, at some point during a round, or at a transition between stages. The game conditions such as rounds, turns, etc. may be defined in game data stored and processed by the system.

A game may be subject to one or more conditions that, when met, result in a progressing to a next stage or ending the game. The conditions may identify any winning and/or losing players. In some cases, a condition may be imposed at certain times; for example, based on a calculation performed only at the end of a turn or round. In some cases, a condition may be imposed at all times, and cause a specified result at the instant the condition is met.

Each player may be able to perform an action for an event in a turn. An action may be governed by a rule describing an option with one or more constraints. Example options can include invoking a randomizer, moving one or more pieces, and/or drawing or playing one or more cards. An option may be subject to one or more constraints that limit how the option may be exercised based on a current game state. For example, a constraint may dictate that an otherwise valid move for a piece cannot result in that piece landing on the same space as another piece. Another constraint may prevent a player from drawing a specified number of cards if it results in the player exceeding a specified maximum number of cards in their inventory. Another constraint may prevent a player from making an otherwise permitted purchase if they do not have enough money.

FIG. 1 is a conceptual diagram illustrating a system 100 for natural language configuration of a tabletop game system, according to embodiments of the present disclosure. As shown in FIG. 1, the system 100 may include a voice-enabled device 110 local to a user 5, a natural language command processing system 120 (abbreviated "system 120"), and one or more skill support systems 125 connected across one or more networks 199. While the user 5 is illustrated as being a human, other types of users (e.g., computing systems) may exist. In some implementations, the user 5 may be a tabletop game developer or an individual tasked with "teaching" or otherwise guiding ingestion of a game into the system 100. In some implementations, the user 5 may be a tabletop game player, playing the game with, against, or with guidance from the system 100. In some cases, there may be multiple developer users 5 and/or multiple player users 5. The particular tabletop game may include a game board 9; however, various tabletop games played with cards, dice, or other media are contemplated. Although the figures and discussion of the present disclosure illustrate certain steps in a particular order, the steps described may be performed in a different order (as well as certain steps removed or added) without departing from the present disclosure.

The device 110 may receive audio corresponding to a spoken natural language input originating from the user 5. The device 110 may record audio following detection of a wakeword. The device 110 may generate audio data corresponding to the audio, and may send the audio data to the system 120. The device 110 may send the audio data to the system 120 via an application that is installed on the device 110 and associated with the system 120. An example of such an application is the Amazon Alexa application that may be installed on a smart phone, tablet, or the like. In some implementations, the device 110 may receive text data corresponding to a natural language input originating from the user 5, and send the text data to the system 120. The device 110 may also receive output data from the system 120, and generate a spoken-word audio output. The device 110 may include a camera for capturing image and/or video data for processing by the system 120. In some implementations, the device 110 may receive text files or files representing scanned text and/or images for transmission to the system 120 and subsequent natural language processing. Examples of various devices 110 are further illustrated in FIG. 38.

The following describes example operations for natural language configuration of a tabletop game system. The system 120 can receive first data representing a natural language representation of instructions for playing a game (150). The system 120 can perform natural language processing on the first data to generate first NLU results data corresponding to the instructions (152). The system 120 can process the first NLU results data to determine game data (154). The system 120 can process at least a portion of the game data to configure a first speech processing model for use with a future natural language input corresponding to the game (156).

The system 120 can receive first data representing a natural language representation of instructions for playing a game (150). The user 5 may provide a representation of the instructions to the system 120 directly as a data file including text and/or images presented to the device 110 or other device 110, and later processed, for example, by optical character recognition (OCR). For example, the user may provide the system with images of an instruction manual of a book, for example taken by another device (e.g., smart phone, tablet, etc.). Alternatively the user may perform optical scanning on a physical rulebook and may send the scanned images to a destination associated with the system for processing. Alternatively, the user may hold up the rulebook in a field of view of a camera of device 110 so that the device 110 may capture image date for the rulebook. In some implementations, the input can be supplemented based on voice input by the user 5. For example, the user may read a rulebook (or portions thereof) to the device 110 which may capture the audio data and process it to convert it into text or other machine operable format. The system 120 may also obtain data representing the rulebook (for example in a natural language data form) from a game developer or game seller. Combinations of the above may also be used. For example the user may scan portions of a rulebook, read portions, and/or take images of other portions while other portions may be received from a game developer.

The system 120 can perform natural language processing on the first data to generate first NLU results data corresponding to the instructions (152). Following any OCR on image data or automatic speech recognition (ASR) on spoken input, the system 120 can perform NLU processing on the text data. ASR is described in further detail below with regard to FIG. 14. NLU is described in further detail below with regard to FIGS. 15 and 16.

The system 120 can process the first NLU results data to determine game data (154). The system 120 may identify words in the NLU results data that may be new or may be used differently outside of the context of the game, such as words that describe features of the game and actions that can be performed within the game. The system 120 may parse the NLU results data to identify information related to different aspects of game data. For example, game instructions may describe game setup, a structure of game progression, rules, and conditions for ending the game and declaring any winners or losers. The system 120 may identify portions of the instructions related to different aspects of the games through topic headings or by recognizing words generic to tabletop gaming such as "setup," "begin," "turn," "roll," "move," "draw," "end," "win," etc. The system 120 can thus process the NLU results to determine, from the interpretation of the natural language of the information provided in the rulebook (or other data), at least first state data representing an initial state of the game, first condition data representing at least a first condition that results in ending the game, first player data representing at least one player of the game, and first event data representing at least one action available during at least a first player's turn. The system 120 can then generate a model of the game by determining game data including at least the first state data, first condition data, first player data and first event data. A game manager including game ingestion engine configured to process the input data is described below with regard to FIGS. 2 and 3. Example conceptual diagrams of game data for various types of games are described below with regard to FIGS. 4-7. An example framework for importing and integrating game instructions with a speech-controlled system is described below with regard to FIGS. 17 through 22.

In some implementations, the system 120 can identify a random output generator such as one or more die, spinners, coin flips, or card shuffling represented in the instructions. The system 120 process the NLU results data describing the random output generator to determine a type, a use, and an expected output. The system 120 can use this to build randomizer data for each random output generator described by the instructions. The randomizer data may include one or more parameters describing a format of the expected output of the randomizer. For example, rolling two six-sided dice can be described with the parameters:

type: random_integer
    range: [1, 6]
    num_values: 2
    output: sum(value1, value2)

Thus, an invocation of this randomizer will return two random integers between 1 and 6 (or a sum of the two random integers).

In another example, a randomizer might include a spinner used to randomly pick one of six colors: red, orange, yellow, green, blue, or purple. Additionally, the spaces corresponding to each of red and green may be twice as large, respectively, as each of orange, yellow, blue, and purple (such that red represents 90 degrees of arc, orange 45 degrees of arc, etc.). In this case, the randomizer parameters may be as follows:

type: random_color
    range: [1, 8]
    num_values: 1
    output: value=1→red
    value=2→red
    value=3→orange
    value=4→yellow
    value=5→green
    value=6→green
    value=7→blue
    value=8→purple In some cases, the system 120 may not be able to generate a complete definition for a randomizer based on the NLU results data. In such cases, the system 120 may prompt the user 5 with a question; for example, "How many spaces are there on the spinner?", "Is each space on the spinner the same size?", "How many sides does the die have?", "How many dice are rolled per invocation?", etc. The system 120 can process a natural language response to generate the missing parameters for the randomizer, and add the randomizer definition to the game data.

In some implementations, the system 120 can determine one or more rules based on the NLU results data. A rule can describe, for example movement of a game piece. The rule may be associated with token data for that game piece. The rule may consist of one or more options and one or more constraints. Example options can include invoking a randomizer, moving one or more pieces, and/or drawing or playing one or more cards. An option may be subject to one or more constraints that limit how the option may be exercised based on a current game state. For example, a constraint may dictate that an otherwise valid move for a piece cannot cause the piece to leave the game board. Another constraint may set a specified maximum number of cards in a player's inventory, and prevent the player from drawing a number of cards dictated by the corresponding option if doing so would cause the number of cards in the player's inventory to exceed the specified maximum. Another constraint may prevent a player from making an otherwise permitted purchase if they do not have enough money.

The system 120 can process at least a portion of the game data to configure a first speech processing model for use with a future natural language input corresponding to the game (156). The system 120 can use the resulting game data to configure a speech-enabled system to guide and/or participate in the game. Game ingestions and guiding/participating are controlled by a game manager with game data stored in a game database. The game manager and game databased are introduced below with regard to FIG. 2 and described in additional detail with regard to FIGS. 3 through 7. FIGS. 17 through 22 describe an example framework for importing and integrating game instructions with a speech-controlled system. The system 120 can use the game data generated during the ingestion process to guide and/or participate in the game with one or more players. The system 120 can, for example, guide the player(s) through game setup, provide verbal instruction regarding the rules, answer frequently asked questions, provide utilities for game play such as maintaining inventories and providing random outputs (e.g., dice rolls), detect illegal moves, suggest moves or offer congratulations based on sentiment detection signals, and participating in the game as the "house" or as an ally or opponent player. Game participation by the system 120 is described in additional detail below with regard to FIG. 27.

In some implementations, the system 120 can employ image recognition in game ingestion. For example, the device 110 may be used to capture an image of a game board and transmit it to the system 120. The system 120 may process the image to detect game spaces and connections between them, and generate a corresponding graph representing the game board. The system 120 may store the graph as part of the game data. In some implementations, the system 120 may employ additional image processing to detect background graphics of the game board and differentiate them from visual features directly implicating game play. The image processing capabilities of the system 120 are described in additional detail below with regard to FIG. 13.

In some implementations, the system 120 can employ image capture and processing to ingest game tokens. The game tokens can be game pieces, cards, or other objects. The system 120 may determine based on the NLU results from processing the game instructions that the game includes one or more tokens. The system 120 can use text-to-speech (TTS) capabilities to cause the device 110 to output a request that a token be positioned within a field of view of the device's 110 camera. The system 120 can receive the image data from the device 110 and perform image processing on the image data to generate representational data of the token. In some implementations, the system 120 can output additional prompts to rotate or move the token so additional images may be captured. The representational data can be used to allow a camera to recognize the token in play during a game.

Figure 31:
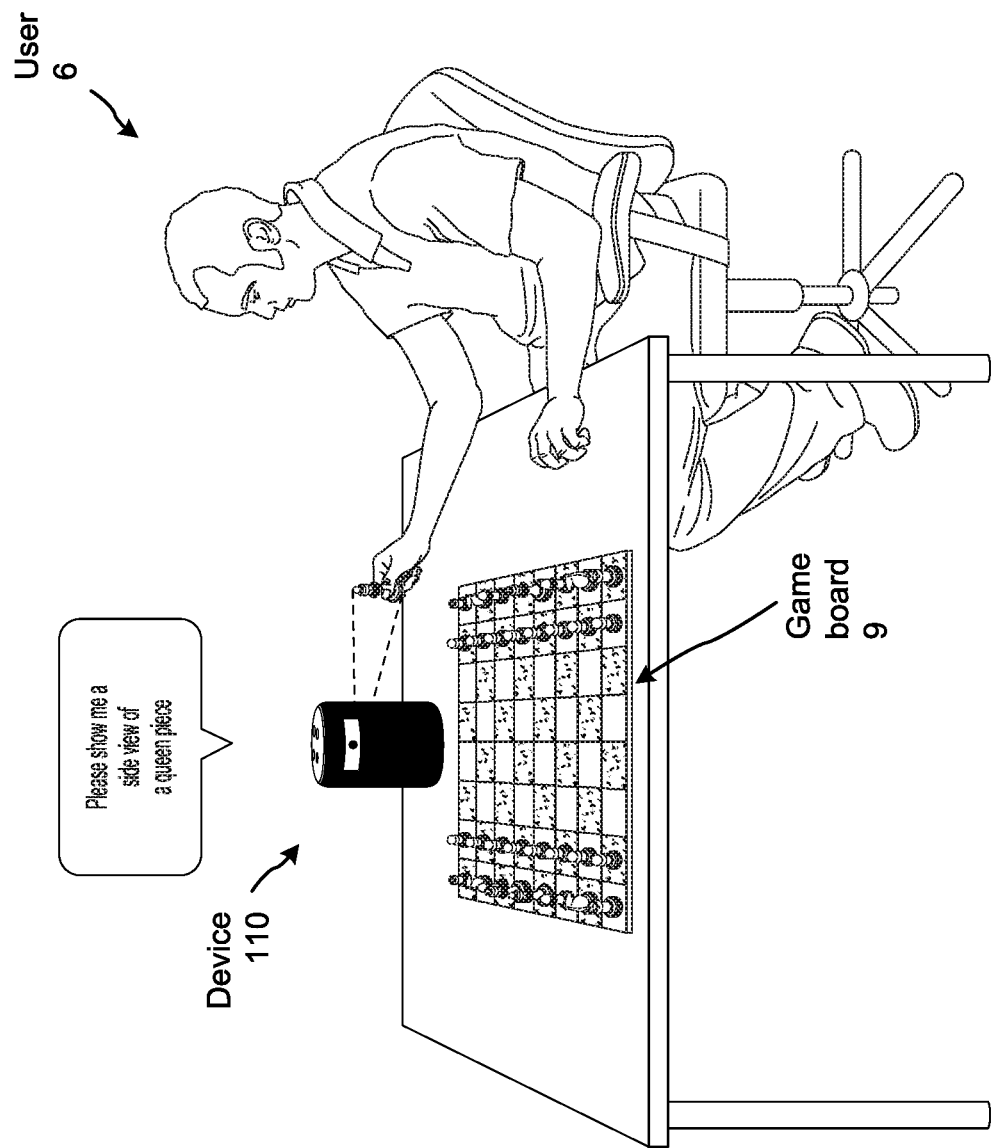
FIG. 31 illustrates the system learning the appearance of a game piece whose definition is standard across game sets but whose appearance may vary, according to embodiments of the present disclosure.

Some games may use pieces with standard properties (that is, the tokens are associated with the same options and constraints) but whose appearance varies. For example, chess pieces and playing cards can include, for example, kings and queens whose properties are the same but whose appearance may be different from set to set and deck to deck. Thus, during a game setup, the system 120 may "learn" to recognize the particular tokens being used. In such cases, the system 120 can, after receiving a request to play a game that may include such variable tokens, output a request that an object corresponding to the first token be positioned within a field of view of the camera so that an image may be captured. FIG. 31 shows an example interaction in which a user 6 is showing a game piece to the device 110. In some implementations, the system 120 may output prompts requesting additional views of the token. The system 120 can process the image data to generate second representational data of the token for use by the system during game play. The data obtained by the system 120 related to appearance of the token may be stored in a manner associated with the user 6 and/or may be stored in a manner usable for games with other users who may use the same token.

Figure 11:
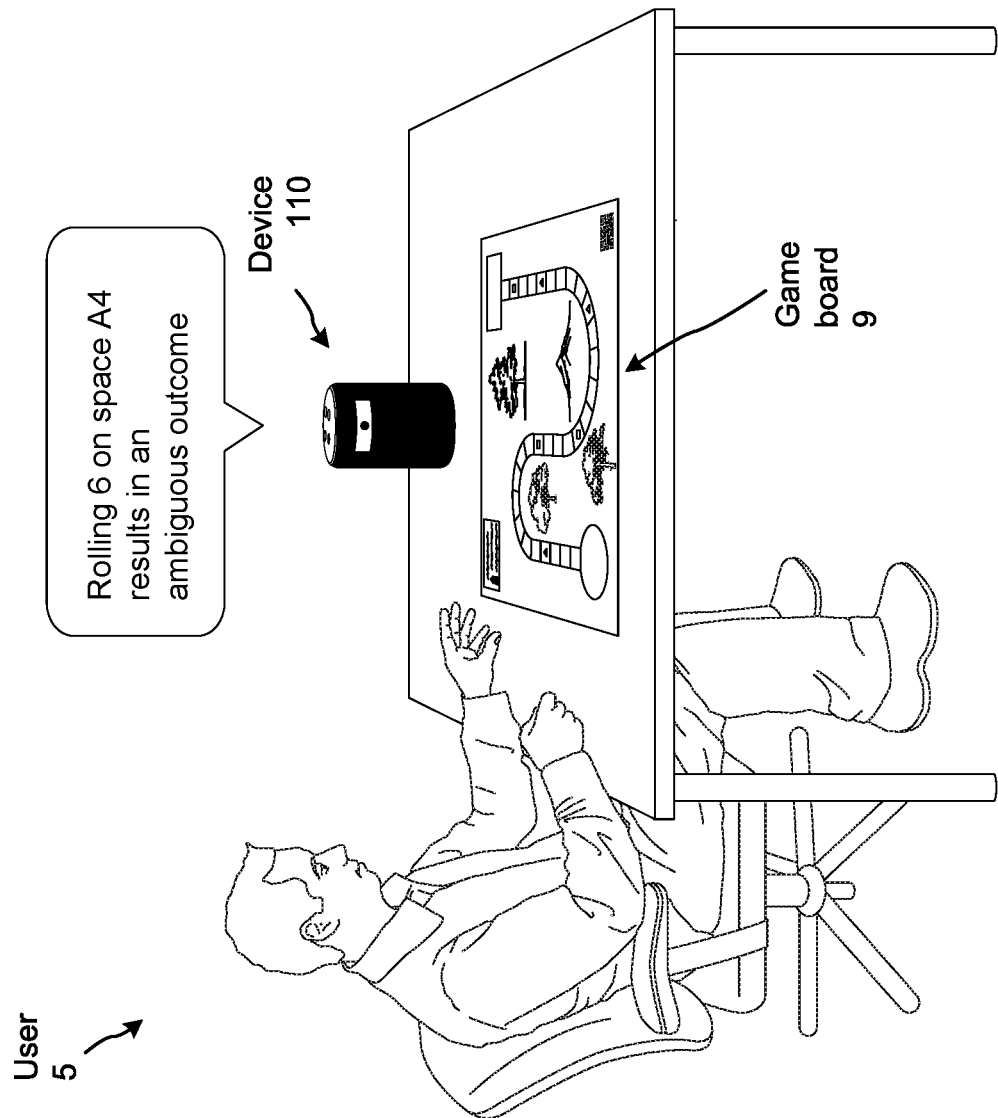
FIG. 11 illustrates an example interaction between a user and the system in which the system identifies a flaw in the game data, according to embodiments of the present disclosure.

In some implementations, the system 120 may detect flaws in the game data. Flaws can represent one or more ambiguities, contradictions, or unidentified states in the game data. The system 120 may include a game playthrough engine that simulate a hypothetical game with or without human players, and detect situations where playing the game according to the current game data results in a situation in which, for example, a rule or condition become ambiguous or contradictory in its application, or where the game reaches a state where no path forward is defined; that is, a dead end. In some implementations, the system 120 can output data indicating the flaw in the game data, and process a natural language response, by the user 5 or based in additional textual input, to determine a modification of the game data. FIG. 11 illustrates an example interaction between a user 5 and the device 110 in which the system 120 identifies a flaw in the game data. The system 120 can then generate second game data based on the game data and the modification.

Figure 12:
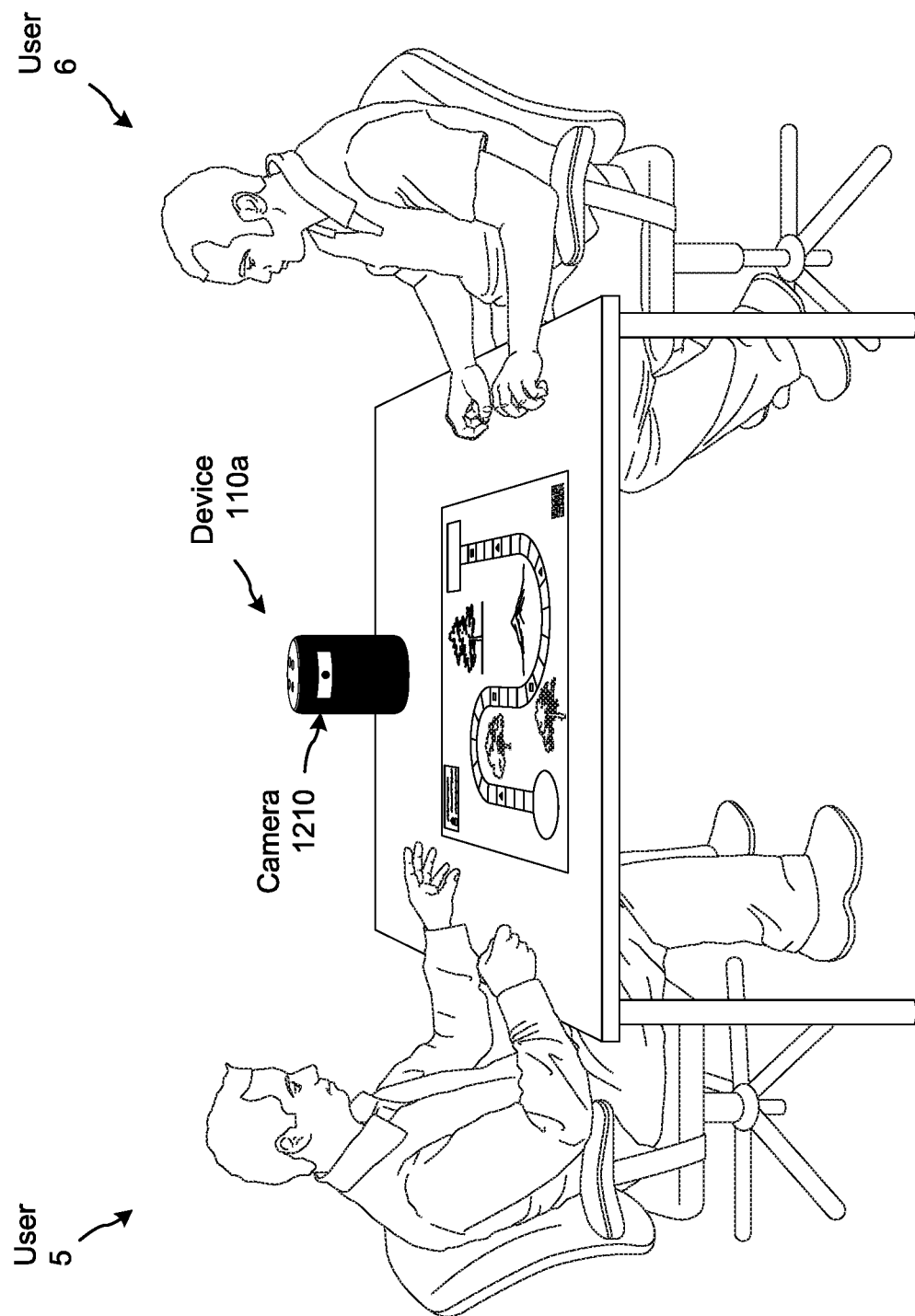
FIG. 12 illustrates an example of the system observing a first player and a second player playing a game via a camera of the device.

In some implementations, the system 120 may augment game data by observing games being played. The system 120 may observe games instead of or in addition to playing through its own games using its internal playthrough engine. FIG. 12 illustrates the system 120 observing a first user 5 and a second user 6 playing a game via a camera 1210 of the device 110. The system 120 may use the observations to resolve apparent ambiguities in the game data if the players consistently choose one course of action when more than one course of action seems acceptable under the rules. The system 120 may use the observations to resolve apparent contradictions in the game data if the players consistently choose a course of action when the rules seem to forbid it. Having made such an observation, the system 120 may output a request for clarification of the rule. The system 120 may observe that certain strategies are more effective than others during different stages of a game, and can thus recommend certain moves or actions to novice players. This may be particularly useful for games with decision trees complex enough to prevent complete searching.

Figure 2:
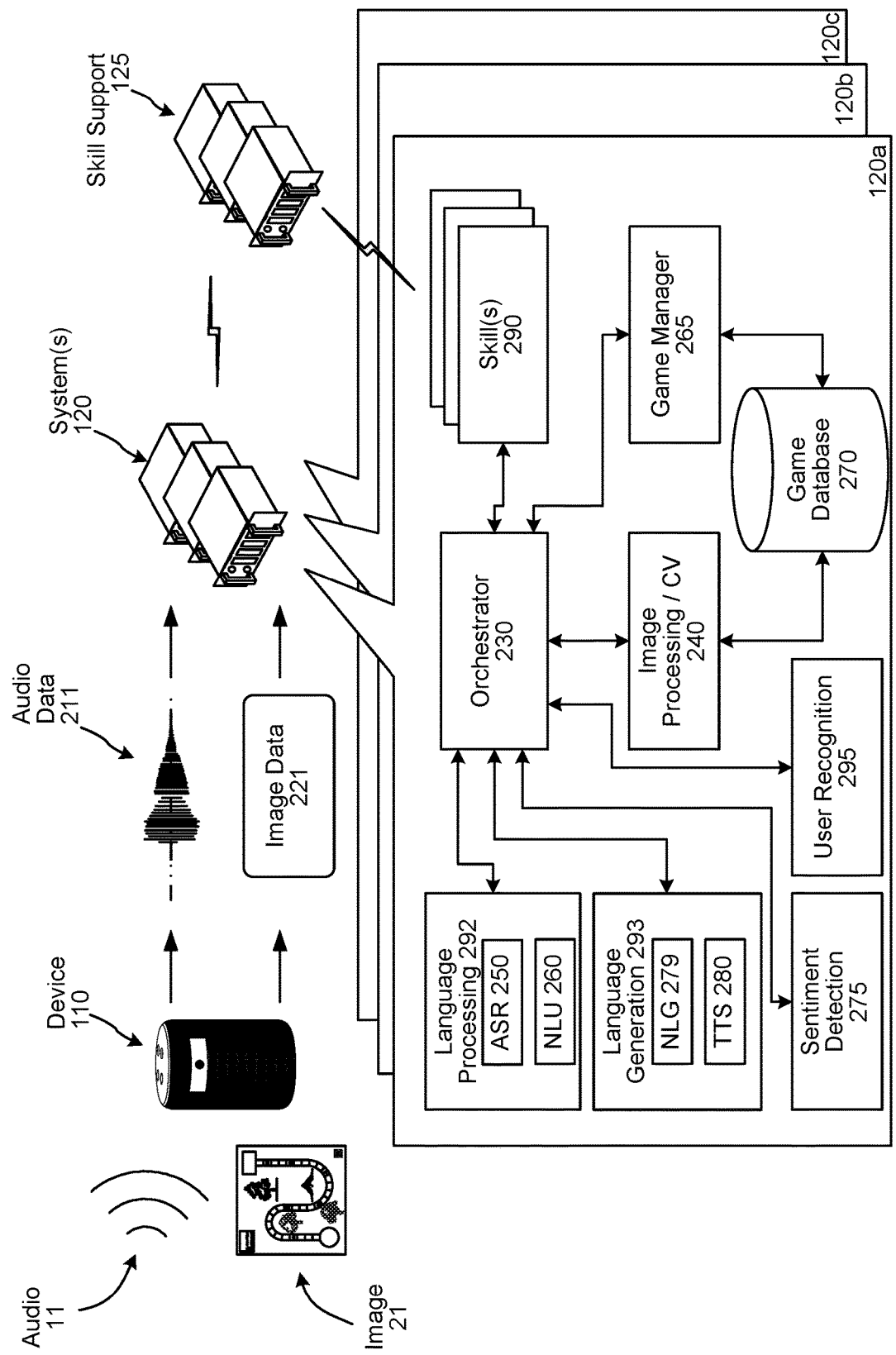
FIG. 2 is a conceptual diagram of components of the system, according to embodiments of the present disclosure.

The system 100 may operate using various components as described in FIG. 2. The various components may be located on same or different physical devices. Communication between various components may occur directly or across a network(s) 199. The device 110 may include audio capture component(s), such as a microphone or array of microphones of a device 110, captures audio 11 and creates corresponding audio data. A wakeword detector of the device 110 may process the audio data, representing the audio 11, to determine whether speech is represented therein. The device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once the wakeword is detected by the wakeword detector and/or input is detected by an input detector, the device 110 may wake and begin transmitting audio data 211, representing the audio 11, to the system(s) 120. The audio data 211 may include data corresponding to the wakeword; in other embodiments, the portion of the audio corresponding to the wakeword is removed by the device 110 prior to sending the audio data 211 to the system(s) 120. In the case of touch input detection, the audio data may not include a wakeword.

In some implementations, the system 100 may include more than one system 120. The systems 120 may respond to different wakewords and/or perform different categories of tasks. Each system 120 may be associated with its own wakeword such that speaking a certain wakeword results in audio data be sent to and processed by a particular system. For example, detection of the wakeword "Alexa" by the wakeword detector may result in sending audio data to system 120a for processing while detection of the wakeword "Computer" by the wakeword detector may result in sending audio data to system 120b for processing. The system may have a separate wakeword and system for game play (e.g., "Dungeon Master"/120c) and/or game play may be coordinated by one or more skill(s) 290 of one or more systems 120.

Upon receipt by the system(s) 120, the audio data 211 may be sent to an orchestrator component 230. The orchestrator component 230 may include memory and logic that enables the orchestrator component 230 to transmit various pieces and forms of data to various components of the system, as well as perform other operations as described herein.

The orchestrator component 230 may send the audio data 211 to a language processing component 292. The language processing component 292 includes an automatic speech recognition (ASR) component 250 and a natural language understanding (NLU) component 260. The ASR component 250 may transcribe the audio data 211 into text data. The text data output by the ASR component 250 represents one or more than one (e.g., in the form of an N-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., acoustic units such as phonemes, senons, phones, etc.) and sequences of sounds to identify words that match the sequence of sounds of the speech represented in the audio data 211. The ASR component 250 sends the text data generated thereby to an NLU component 260, via, in some embodiments, the orchestrator component 230. The text data sent from the ASR component 250 to the NLU component 260 may include a single top-scoring ASR hypothesis or may include an N-best list including multiple top-scoring ASR hypotheses. An N-best list may additionally include a respective score associated with each ASR hypothesis represented therein. The ASR component 250 is described in greater detail below with regard to FIG. 14.

The language processing component 292 may further include a NLU component 260. The NLU component 260 may receive the text data from the ASR component. The NLU component 260 may attempts to make a semantic interpretation of the phrase(s) or statement(s) represented in the text data input therein by determining one or more meanings associated with the phrase(s) or statement(s) represented in the text data. The NLU component 260 may determine an intent representing an action that a user desires be performed and may determine information that allows a device (e.g., the device 110, the system(s) 120, a skill component 290, a skill support system(s) 125, etc.) to execute the intent. For example, if the text data corresponds to "play Forest Magic by Dark Arts," the NLU component 260 may determine an intent that the system provide a game and may identify "Dark Arts" as a game publisher and "Forest Magic" as the game. For further example, if the text data corresponds to "what is a night beacon," the NLU component 260 may determine an intent that the system output information associated with a night beacon token. In another example, if the text data corresponds to "roll for damage," the NLU component 260 may determine an intent that the system invoke a random output generator such as a virtual die.

The NLU component 260 may return NLU results data (which may include tagged text data, indicators of intent, etc.) back to the orchestrator component 230. The orchestrator component 230 may forward the NLU results data to a skill component(s) 290. If the NLU results data includes a single NLU hypothesis, the NLU component 260 and the orchestrator component 230 may direct the NLU results data to the skill component(s) 290 associated with the NLU hypothesis. If the NLU results data includes an N-best list of NLU hypotheses, the NLU component 260 and the orchestrator component 230 may direct the top scoring NLU hypothesis to a skill component(s) 290 associated with the top scoring NLU hypothesis. The NLU component 260 is described in greater detail below with regard to FIGS. 15 and 16.

The NLU component 260 can further be configured to process input related to the ingestion of a game or the playing of a game. For example, the NLU component 260 can include recognizers, grammars, and/or lexicons related to games and gaming. In addition, the entity resolution component 1670 can be similarly configured to resolve entities related to games and gaming. The NLU component 260 can therefore be configured to recognize language related to game states, structure (e.g., stages, turns, and/or events), constraints, tokens, rules, etc. For natural language inputs corresponding to a game being ingested or participated in by the system(s) 120, the NLU component 260 can provide the NLU results data, via the orchestrator component 230, to the game manager 265. The game manager 265 can use the NLU results data for generating game data representing the game and/or participating in a game in progress. The game manager 265 can feed back words and phrases used in the game instructions as additional catalogs for use by the NLU component 260. The game manager 265 and the game database 270 are described in greater detail below with regard to FIG. 3. Examples of game data for different types of games are described in greater detail below with regard to FIGS. 4 through 7.

A "skill component" may be software running on the system(s) 120 that is akin to a software application. That is, a skill component 290 may enable the system(s) 120 to execute specific functionality in order to provide data or produce some other requested output. The system(s) 120 may be configured with more than one skill component 290. For example, a weather service skill component may enable the system(s) 120 to provide weather information, a car service skill component may enable the system(s) 120 to book a trip with respect to a taxi or ride sharing service, a restaurant skill component may enable the system(s) 120 to order a pi27 with respect to the restaurant's online ordering system, etc. A skill component 290 may operate in conjunction between the system(s) 120 and other devices, such as the device 110, in order to complete certain functions. Inputs to a skill component 290 may come from speech processing interactions or through other interactions or input sources. A skill component 290 may include hardware, software, firmware, or the like that may be dedicated to a particular skill component 290 or shared among different skill components 290.

A skill support system(s) 125 may communicate with a skill component(s) 290 within the system(s) 120 and/or directly with the orchestrator component 230 or with other components. A skill support system(s) 125 may be configured to perform one or more actions. An ability to perform such action(s) may sometimes be referred to as a "skill." That is, a skill may enable a skill support system(s) 125 to execute specific functionality in order to provide data or perform some other action requested by a user. For example, a weather service skill may enable a skill support system(s) 125 to provide weather information to the system(s) 120, a car service skill may enable a skill support system(s) 125 to book a trip with respect to a taxi or ride sharing service, an order pi27 skill may enable a skill support system(s) 125 to order a pi27 with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system(s) 120 may be configured with a skill component 290 dedicated to interacting with the skill support system(s) 125. Unless expressly stated otherwise, reference to a skill, skill device, or skill component may include a skill component 290 operated by the system(s) 120 and/or skill operated by the skill support system(s) 125. Moreover, the functionality described herein as a skill or skill may be referred to using many different terms, such as an action, bot, app, or the like. The skill 290 and or skill support system(s) 125 may return output data to the orchestrator component 230.

The system 120 includes a language generation component 293. The language generation component includes a natural language generation (NLG) component 279 and a text-to-speech (TTS) component 280. The NLG component 279 can generate text for purposes of TTS output to a user. For example the NLG component 279 may generate text corresponding to instructions for gameplay (e.g., "move piece forward two squares," etc.) corresponding to a particular action for the user to perform. The NLG component 279 may generate appropriate text for various outputs as described herein. The NLG component 279 may include one or more trained models configured to output text appropriate for a particular input related to the game play. The text output by the NLG component 279 may become input for the TTS component 280 (e.g., input text data 2310 discussed below). Alternatively or in addition, the TTS component 280 may receive text data from a skill 290 or other system component for output. The TTS component 280 may generate audio data (e.g., synthesized speech) from text data using one or more different methods. Text data input to the TTS component 280 may come from a skill component 290, the orchestrator component 230, or another component of the system.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The device 110 may include still image and/or video capture components such as a camera or cameras to capture one or more images 21. The device 110 may include circuitry for digitizing the images and/or video for transmission to the system(s) 120 as image data 221. The device 110 may further include circuitry for voice command-based control of the camera, allowing a user 5 to request capture of image or video data. The device 110 may process the commands locally or send audio data 211 representing the commands to the system(s) 120 for processing, after which the system(s) 120 may return output data that can cause the device 110 to engage its camera.

Upon receipt by the system(s) 120, the image data may be sent to an orchestrator component 230. The orchestrator component 230 may send the image data to an image processing component/computer vision 240. The image processing component/computer vision 240 can perform computer vision functions such as object recognition, modeling, reconstruction, etc. For example, the image processing component/computer vision 240 can receive image data 221 representing a game board of a game, recognize spaces—that is, possible discrete locations of one or more tokens—and connections between them. In some cases, the image processing/computer vision component 240 can attempt to differentiate between functional objects on the game board and background graphics. The image processing/computer vision component 240 can send the resulting processed image data, via the orchestrator component 230, to the game manager 265, which can use the processed image data to generate game data representing the game.

In some implementations, the image processing/computer vision component 240 can detect the presence of text in an image. In such implementations, the image processing/computer vision component 240 can recognize the presence of text, convert the image data to text data, and send the resulting text data via the orchestrator component 230 to the language processing component 292 for processing by the NLU component 260. The NLU component 260 may return NLU results data, which the game manager 265 can use for generating game data representing the game.

In some implementations, the image processing/computer vision component 240 can attempt to determine the location of one or more tokens during game play. The image processing/computer vision component 240 can send the processed image data to the game manager 265. The game manager 265 may, based on the game data, determine whether the position and/or movement of the token complies with the rules of the game. The image processing/computer vision component 240 is described in greater detail below with regard to FIG. 13.

The system(s) 120 may also include a game manager 265. The game manager 265 may process input to generate game data representing a model of the game, and use the game data for later guiding of and/or participating in the game. The game manager 265 can store the game data in the game database 270. The game database 270 can store game data corresponding to one or more game models, and, in some implementations, store state data for one or more games in progress. The game manager 265 can retrieve the game data from the game database 270 for guiding and/or participating in a game. The game manager 265 and the game database 270 are described in greater detail below with regard to FIG. 3. Examples of game data for different types of games are described in greater detail below with regard to FIGS. 4 through 7.

Figure 24:
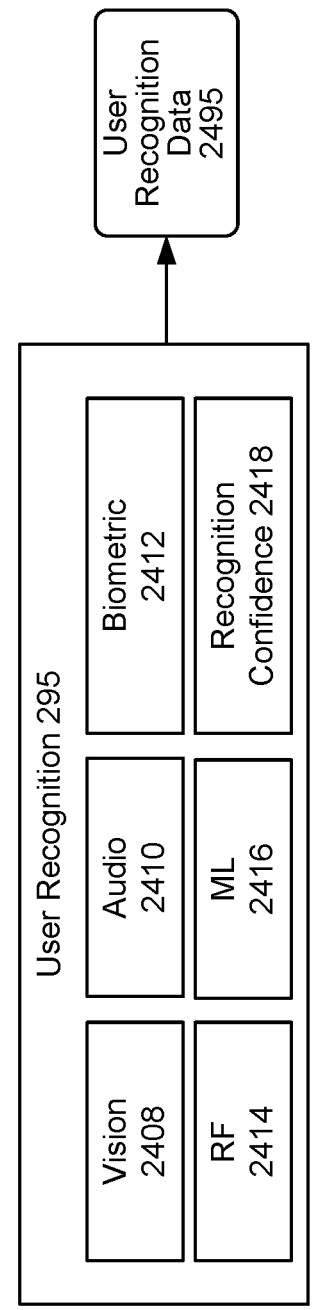
FIG. 24 is a schematic diagram of an illustrative architecture in which sensor data is combined to recognize one or more users according to embodiments of the present disclosure.

The system(s) 120 may include a user recognition component 295 that recognizes one or more users using a variety of data, as described in greater detail below with regard to FIGS. 24-25. However, the disclosure is not limited thereto, and the device 110 may include a user recognition component 295 instead of and/or in addition to the system(s) 120 without departing from the disclosure.

The user-recognition component 295 may take as input the audio data 211 and/or text data output by the ASR component 250. The user-recognition component 295 may perform user recognition by comparing audio characteristics in the audio data 211 to stored audio characteristics of users. The user-recognition component 295 may also perform user recognition by comparing biometric data (e.g., fingerprint data, iris data, etc.), received by the system in correlation with the present user input, to stored biometric data of users assuming user permission and previous authorization. The user-recognition component 295 may further perform user recognition by comparing image data (e.g., including a representation of at least a feature of a user), received by the system in correlation with the present user input, with stored image data including representations of features of different users. The user-recognition component 295 may perform additional user recognition processes, including those known in the art.

The user-recognition component 295 determines scores indicating whether user input originated from a particular user. For example, a first score may indicate a likelihood that the user input originated from a first user, a second score may indicate a likelihood that the user input originated from a second user, etc. The user-recognition component 295 also determines an overall confidence regarding the accuracy of user recognition operations.

Output of the user-recognition component 295 may include a single user identifier corresponding to the most likely user that originated the user input. Alternatively, output of the user-recognition component 295 may include an N-best list of user identifiers with respective scores indicating likelihoods of respective users originating the user input. The output of the user-recognition component 295 may be used to inform NLU processing as well as processing performed by other components of the system.

The user-recognition component 295 may include profile storage for storing a variety of information related to individual users, groups of users, devices, etc. that interact with the system. A "profile" refers to a set of data associated with a user, device, etc. The data of a profile may include preferences specific to the user, device, etc.; input and output capabilities of the device; internet connectivity information; user bibliographic information; subscription information, as well as other information. The profile storage may include one or more user profiles, with each user profile being associated with a different user identifier. Each user profile may include various user identifying information. Each user profile may also include preferences of the user and/or one or more device identifiers, representing one or more devices of the user. When a user logs into to an application installed on a device 110, the user profile (associated with the presented login information) may be updated to include information about the device 110. The profile storage may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. The profile storage may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The system(s) 120 may also include a sentiment detection component 275 that may be configured to detect a sentiment of a user from audio data representing speech/utterances from the user, image data representing an image of the user, and/or the like as described in greater detail below with regard to FIG. 26. The sentiment detection component 275 may be included in system(s) 120, as illustrated in FIG. 2, although the disclosure is not limited thereto and the sentiment detection component 275 may be included in other components without departing from the disclosure. For example the sentiment detection component 275 may be included in the device 110, as a separate component, etc. The system 120 may use the sentiment detection component 275 to, for example, customize a response for a user based on an indication that the user is happy or frustrated.

Although the components of FIG. 2 may be illustrated as part of system(s) 120, device 110, or otherwise, the components may be arranged in other device(s) (such as in device 110 if illustrated in system(s) 120 or vice-versa, or in other device(s) altogether) without departing from the disclosure.

FIG. 3 is a conceptual diagram of a game manager 265 and a game database 270, according to embodiments of the present disclosure. The game manager 265 can include components for both the ingestion and playing of games. The game manager 265 may include a game ingestion engine 310, a game play engine 320, and a game state component 330. In some implementations, the game manager 265 can additionally include a game playthrough engine 390. The game database 270 may store game data 315*a*, 315*b* and 315*c*, etc. (collectively "game data 315") for one or more different games. Examples of game data 315 for different types of games are discussed in additional detail below with regard to FIGS. 4 through 7.

The game ingestion engine 310 may receive the NLU results data from the language processing component 292—for example, following natural language processing of printed game instructions and possibly supplemented with natural language spoken inputs—and ingest them into the game data. Game ingestion may include learning words and phrases that may be new or may be used differently outside of the context of the game, such as words that describe features of the game and actions that can be performed within the game. In some implementations the game ingestion engine 310 may feed the vocabulary data back into the language processing component 292 to augment grammars, catalogs, and lexicons of the ASR and NLU components. FIGS. 17 through 22 describe an example framework for importing and integrating game instructions with a speech-controlled system.

The game ingestion engine 310 may parse the NLU results data to identify information related to different aspects of the game. For example, game instructions may describe game setup, a structure of game progression, rules, and conditions for ending the game and declaring any winners or losers. The game ingestion engine 310 may identify portions of the instructions related to different aspects of the games through topic headings or by the language used; for example, describing rules related to game setup, random elements (e.g., dice), definition of a turn, conditions for ending the game, etc. The game ingestion engine 310 can process the NLU results data to identify data related to various features typical of tabletop gaming; for example, an initial state of a game, one or more conditions that results in ending the game, descriptions of players and their abilities, descriptions of a turn, etc. The game ingestion engine 310 can generate a model of the game by determining game data based on the identified features. The game ingestion engine 310 can store the game model in the form of game data 315 in the game database 270. The game ingestion engine 310 may process at least a portion of the game data to configure one or more speech processing models for use with first natural language input corresponding to the game; for example, domain-specific libraries for ASR, NLU, entity resolution, etc. The game ingestion engine 310 may ingest multiple games, and store the resulting respective game data 315a, 315b, 315c, etc. in the game database 270. A generic example of game data 315 is described below with regard to FIG. 4. Examples of game data 315a, 315b, and 315c for different example game types are described with regard to FIGS. 4 through 7. The game data in these figures may be used by the game play manager 265. For example, the game data of these figures may be configured using a game ingestion engine 310, may be used by a game playthrough engine 390 to play test games, may be used by a game play engine 320 to play instances of games involving users, etc.

Figure 4:
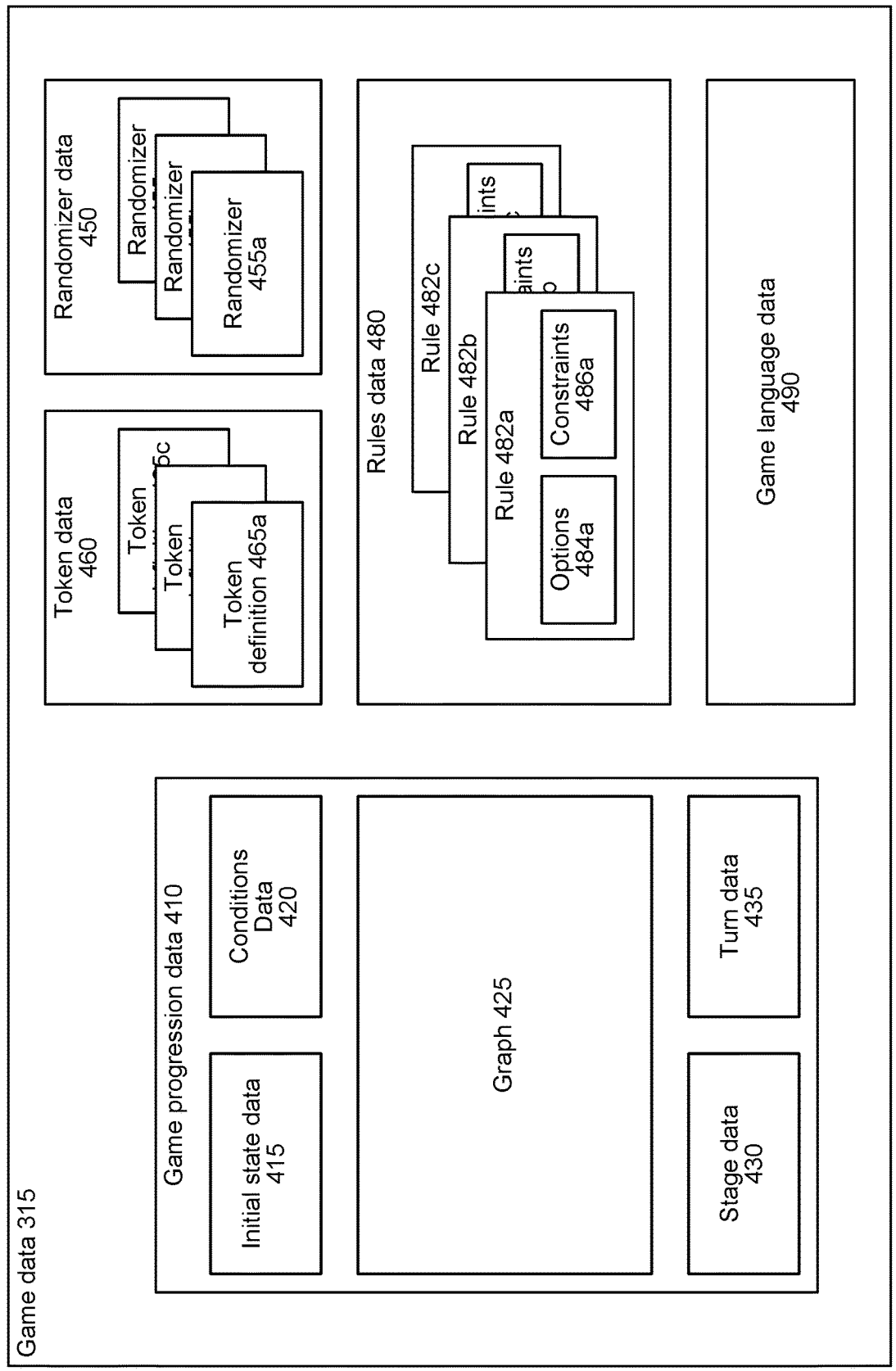
FIG. 4 is a conceptual diagram of a generic representation of game data stored in the game database, according to embodiments of the present disclosure.

FIG. 4 is a conceptual diagram of a generic representation of game data 315 stored in the game database, according to embodiments of the present disclosure. The game data 315 can represent a game model generated by, for example, the game ingestion engine 310. The game data 315 may include game progression data 410, token data 460, randomizer data 450, and rules data 480. The game progression data 410 can include data relating to beginning a game, ending a game, and the structure of the game in between. More specifically, the game progression data 410 may include initial state data 415, conditions data 420, one or more graphs 425, stage data 430, and/or turn data 435. The initial state data 415 can describe game setup. The initial state data 415 can describe, for a specified number of players, initial inventories and token positions, as well as information related to how to commence game play; for example, engaging any randomizers and/or selecting a first player to take a turn.

The conditions data 420 can describe one or more conditions that, when met, cause a game to progress to a next stage or end. For a condition, the conditions data 420 can include information about when and how that condition is applied, such as at any time, at the end of a turn, at the end of a round (e.g., of each player taking one turn), etc. A condition may specify how to identify the winner(s). An example condition may be in the form of: GameEnd=<PieceLocation=Postion24>, and state that the game ends when a token reaches the 24th position in the game graph. Another example condition may be in the form of: GameEnd=<TotalCredits=10000>, and state that the game ends when the first player reaches 10,000 credits in an inventory. Yet another example condition may be in the form of: GameEnd=<#PlayersRemaining=1>, and state that that, as players get eliminated, the game ends when there is only one player remaining.

The graph 425 can describe a game environment in mathematical terms. For example, the graph 425 can include a logical representation of all game spaces on a game board as well as the relationships between them. One example graph 425 can be a directed graph describing a game with sequential spaces. Another example graph 425 may be a two-dimensional array representing a grid of adjacent spaces. A graph 425 may also represent a game progression; for example, an example graph may represent different stages a game may progress through, such as various drawing and betting stages in a game of poker.

The stage data 430 may include data describing various stages of a game. For some games, for example chess or checkers, the same rules may apply throughout. Other games, for example poker, may have distinct stages; e.g., a first betting stage, a draw stage, a second betting stage, etc. Accordingly, the stage data 430 can describe the various stages of multi-stage games including, for example and without limitation, when different conditions, tokens, rules or graphs apply, and whether the structure of a turn or round changes.

The token data 460 can include one or more token definitions 465a, 465b, 465c, etc. (collectively, "token definitions 465"). A token definition 465 can describe aspects of a token including a name, an appearance, and properties, including which particular rules apply to the token. A token definition 465 can describe—for example, for a game piece—information regarding a starting position, options (e.g., movement capabilities), and constraints (e.g., cannot move to an occupied space). In some implementations, a token definition 465 can include two-dimensional or three-dimensional representational data that can be used by an image processing component of the system 120 to recognize the token in an image captured with a camera of a device 110. The representational data can include image data in raster and/or vector formats. In some implementations, a token definition 465 can include representational data that can allow the system 120 to reproduce an image of the token using a display, light emitting diode (LED), projector, screen, or other visual output component.

The rules data 480 can include data representing one or more rules 482a, 482b, 482c, etc. (collectively, "rules 482"). A rule 482 can be described according to one or more options 484a, 484b, 484c, etc. (collectively, "options 484") and one or more constraints 486a, 486b, 486c, etc. (collectively, "constraints 486"). Example options 484 can include invoking a randomizer, moving one or more pieces, and/or drawing or playing one or more cards. An option 484 may be subject to one or more constraints 486 that limit how the option 484 may be exercised based on a current game state. For example, a constraint 486 may dictate that an otherwise valid move for a token cannot cause the token to leave the game board. Another constraint may set a specified maximum number of tokens in a player's inventory, and prevent the player from drawing a number of tokens dictated by the corresponding option 484, if doing so would cause the number of tokens in the player's inventory to exceed the maximum. Another constraint 486 may prevent a player from making an otherwise permitted purchase if they do not have enough money in their inventory.

The game language data 490 can include game instructions and other natural language input regarding the game. The game ingestion engine 310 can import and integrate this natural language input according to, for example, the framework set forth in FIGS. 17-22. The game language data 490 can include a domain-specific libraries including a domain-specific language model (e.g., the language model 1454-X described herein), a domain-specific named entity resolution (NER) component (e.g., the NER component 1562-X), and/or a domain-specific intent classification (IC) component (e.g., the IC component 1564-X). In some implementations, the game language data 490 may additionally or alternatively include data for inclusion in one or more general purpose libraries. The game language data 490 may include natural language generation data that may be used by the NLG component 279 component and/or text-to-speech data that may be used by the TTS component 280 to generate speech in the context of the game; for example, words and/or phrases unique to the game.

The randomizer data 450 can describe one or more randomizers 455*a*, 455*b*, 455*c*, etc. (collectively "randomizers 455"). Each randomizer 455 can include parameters for generating a random output such as a coin flip, a die roll, a spinner, or a card draw from a shuffled deck. The parameters can define output type (e.g., integer, color, etc.), an output range (e.g., 1-6 for a six-sided die), and how many values to output (e.g., roll two dice).

Returning to FIG. 3, in some implementations, the game manager 265 can additionally include the game playthrough engine 390. The game playthrough engine 390 can simulate hypothetical games to detect flaws the game data 315. For example the game playthrough engine 390, based on simulating one or more hypothetical games, may detect situations in which, for example, a rule or condition become ambiguous or contradictory in its application, or where the game reaches a state where no valid action is available; that is to say, a possible dead end. The game playthrough engine 390 can determine that the game data does not address such a state. In some implementations, the game playthrough engine 390 can output data indicating the flaw in the game data 315, causing the system 120 to output a request for clarification or correction and process a natural language response to determine a modification of the game data 315. The game playthrough engine 390 can determine that the modification resolves the potential flaw. The system 120 can then generate second, revised game data 315 based on the game data 315 and the modification. FIG. 11 illustrates an example interaction between the user 5 and the system 120 in which the system 120 identifies a flaw in the game data, and causes the device 110 to output an indication of the flaw. In the example shown in FIG. 11, the game playthrough engine 390 may have simulated one or many hypothetical games using the game data. The game playthrough engine 390 has identified a situation in which a die roll of 6 while a player token is on a space A4 results in an ambiguous outcome. The user 5 can respond to the system 120 with natural language speech to with a rule clarification. In some implementations, the system 120 may also engage the game playthrough engine 390 to act as one or more computerized players participating in a game with one or more human users 5.

The game play engine 320 may perform aspects game guidance on behalf of the system 120. The game play engine 320 may, based on NLU results data for a spoken utterance, retrieve game data 315 for a requested game from the game database 270. The game play engine 320 may, for example based on NLU results data for a spoken utterance, begin a game session. The game play engine 320 can receive information regarding the number of players participating in the game, including any computerized players to be managed by the game manager 265. The game play engine 320 may determine the identity of player(s) in the game (for example based on data provided by user recognition component 295). The game play engine 320 may determine a level of difficulty of the game for each player (for example as a result of a user selection or spoken input to device 110 or other device). The game play engine 320 can use the game data 315 to set an initial state of the game in the game state component 330 (described further below) based on the game data 315 and the number of players. The game play engine 320 can also determine which rules to use for a particular game instance based on difficult level, house rules, game expansions, or the like. The game play engine 320 can generate output data describing an initial game setup, which the language generation component 293 can convert into verbal instructions. The game play engine 320 may also process questions about the rules, and generate verbal answers. The guidance can include instructions on how to perform an initial setup of the physical game board and/or physical tokens such as playing pieces, cards, etc., both globally and for each player. The game play engine 320 can guide the players through turns, rounds, and stages of the game based on the stage data 430 and turn data 435. The game play engine 320 can apply rules data 480, and notify players of invalid moves or other actions. The game play engine 320 may generate random outputs according to the randomizer data 450. Each action can change the game state, and the game play engine 320 can perform a corresponding update to the game state component 330. The game play engine 320 can monitor aspects of the game to determine if and when conditions data 420 may be invoked. In some implementations, the game play engine 320 may suggest moves, such as upon request of a player, following a certain period of inaction, or based on a sentiment detection signal from the sentiment detection component 275. In some implementations, the game play engine 320 may offer kudos or congratulations based on a sentiment detection signal of happiness following a particular event or end of the game. Sentiment detection is described in additional detail below with regard to FIG. 26.

The game manager 265 can include a game state component 330. The game state component 330 can keep track of state data such as values for various parameters and/or variables related to a game in progress. The state data can include positional data regarding what pieces are in what game spaces; for example, which tokens are associated with which nodes of the graph. The state data can include inventory data regarding tokens and/or points/money that are in the possession of each player, the house, and/or in play or in reserve globally; for example, which playing cards are in which players' hands and which are in a draw pile and/or a discard pile. The state data can include turn data regarding the current position within a game progression; for example, that it is the beginning of Player1's turn.

The game state component 330 can include player data 340*a*, 340*b*, and 340*c* (collectively "player data 340") and global data 360. Each player of the game may be associated with an instance of the player data 340. The player data 340 may also include an identifier for the player, which may be linked to a specific identified individual (for example using user recognition component 295) or may simply identify the user anonymously (e.g., Player1, Player2, etc.). The player data 340 may include a proper name and/or avatar for the player. If the system(s) 120 is acting as an additional player, for example a co-player, an opponent, or the house, there may be an additional player data 340 associated with the player representing the system. Player data 340 may be initially defined for players generally in the game data 315, and then change over the course of the game based on, for example, user decisions and in-game events. The player data 340 can include a player inventory 380*a*, 380*b*, and 380*c* (collectively "player inventories 380") and player token data 345*a*, 345*b*, and 345*c* (collectively "player token data 345"). The player inventories 380 can maintain an amount of various player possessions such as points, money, counters, etc. The player token data 345 can store position and other state information for tokens in play; for example, token modifiers such as counters or flags associated with individual tokens, which play is associated with which token, etc.

The global data 360 can further include global token data 350 and global inventory 370. Similar to the player token data 345, the global token data 350 can store position and other state information for tokens in play yet not associated with individual players; for example, a draw pile and/or other dynamic objects of a board game such as a roving hazard. The global token data 350 may additionally maintain information related to any token modifiers and/or counters or flags associated with individual tokens. The global inventory 370 can maintain total available inventories for the game, or remaining inventories less items and amounts belonging to individual player inventories 380. In some implementations, the game state component 330 may reside in the game database 270.

Figure 5:
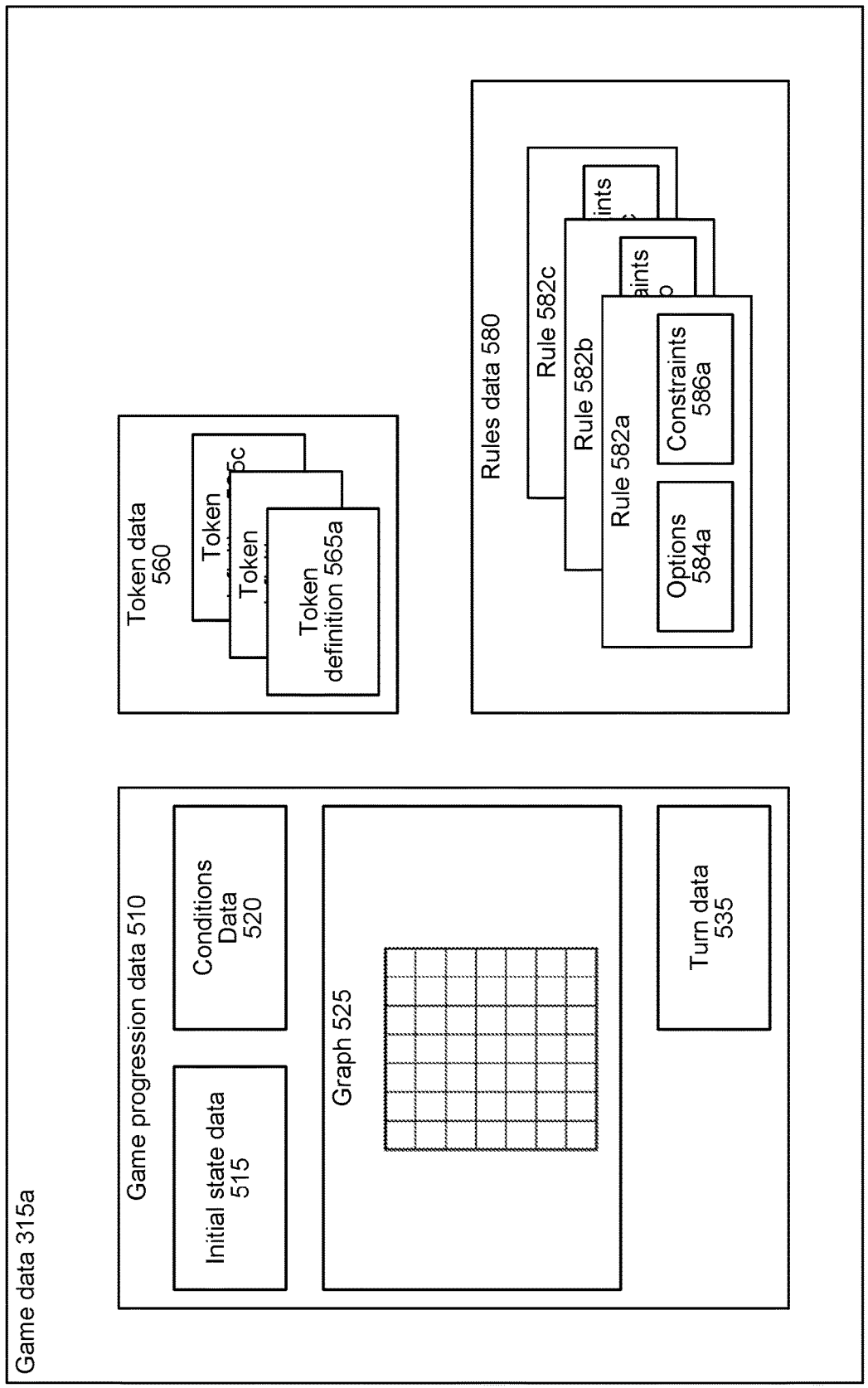
FIG. 5 is a conceptual diagram of a first example representation of game data stored in the game database, according to embodiments of the present disclosure.
Figure 6:
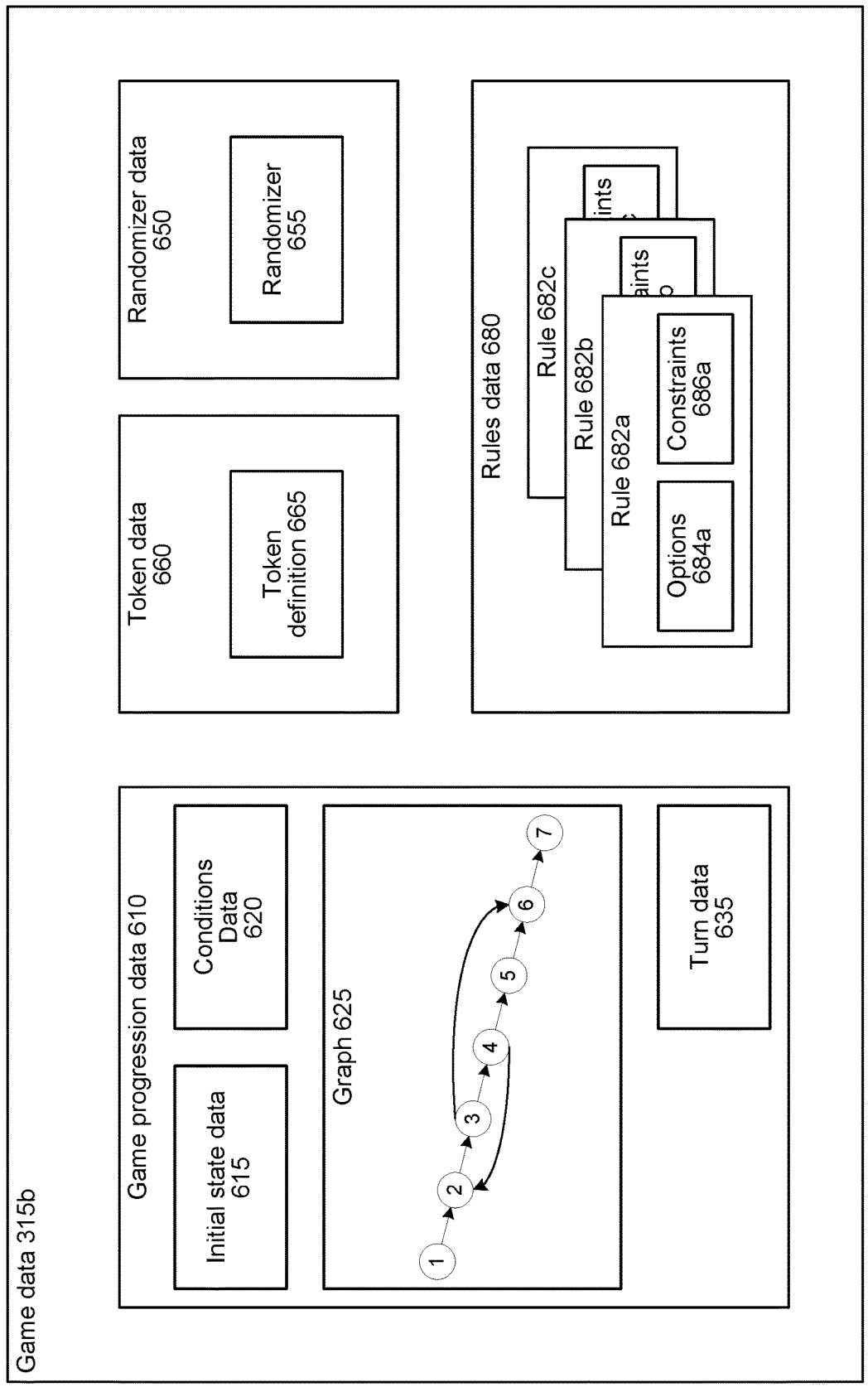
FIG. 6 is a conceptual diagram of a second example representation of game data stored in the game database, according to embodiments of the present disclosure.
Figure 7:
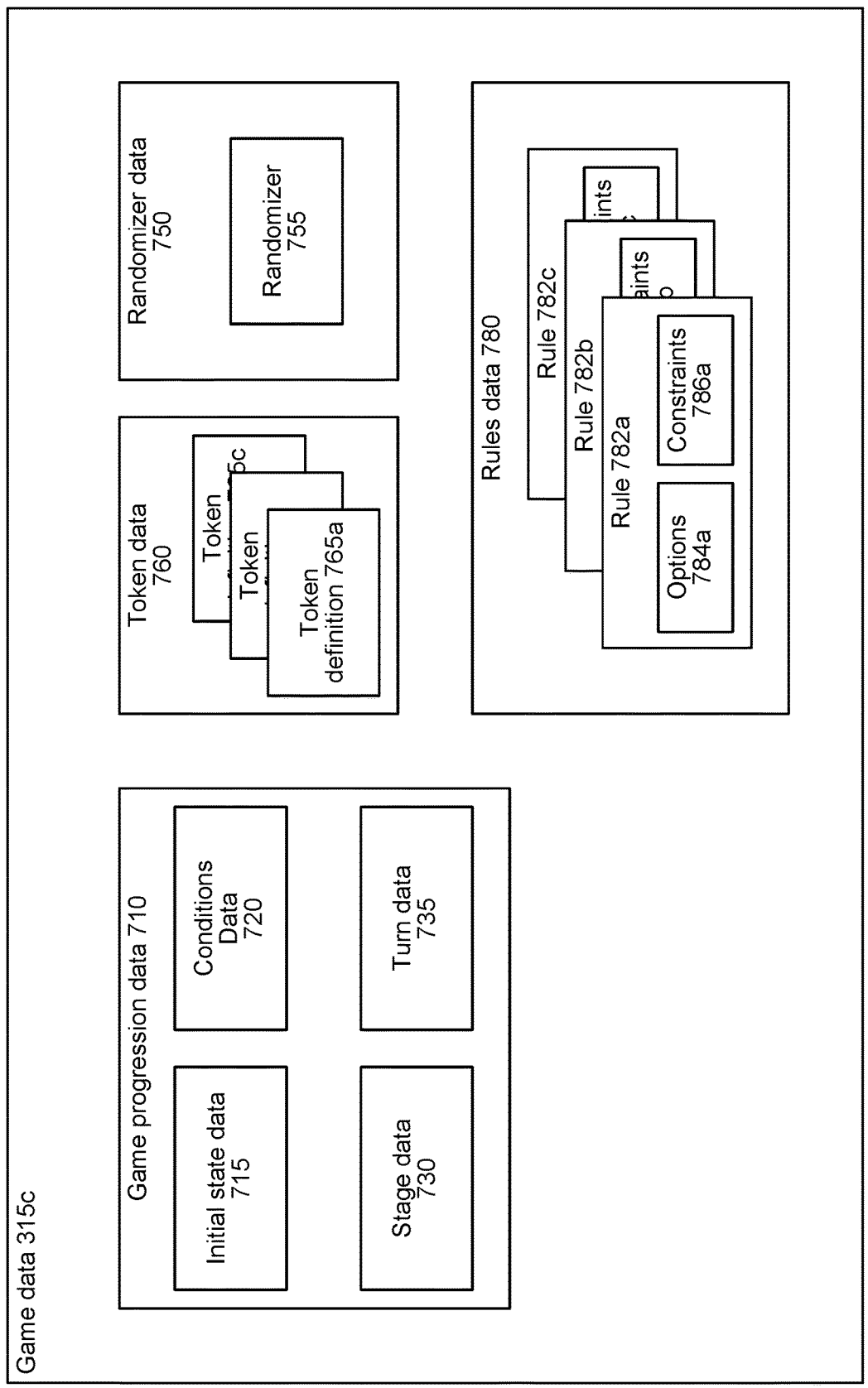
FIG. 7 is a conceptual diagram of a third example representation of game data stored in the game database, according to embodiments of the present disclosure.

FIGS. 5 through 7 are conceptual diagrams of various examples of game data stored in the game database, according to embodiments of the present disclosure. FIG. 5 illustrates example game data 315 generated by the game ingestion engine 310 for a game played with pieces on a game board with game spaces distributed in a rectangular grid, such as could be used for a game of chess or checkers. Accordingly, the game graph 525 may be represented in the form of a two-dimensional array. The game graph 525 may have directionality. The directionality may be different for each player; for example, north to south may be forward for a first player while south to north may be forward for a second player. In this example, the token data 560 may specify multiple token definitions 565a, 565b, 565c, etc. (collectively "token definitions 565"). For a game of checkers, however, the token data 560 may only include one or two token definitions 565 to define a normal piece and one that has, for example, become a king by virtue of reaching the far side of the board. The token definition 565 may include representational data that can allow for recognition of the piece via a camera of the device 110. The game progression data 510 may include initial state data 515 describing an initial layout of the game board, initial player inventories (e.g., how many pieces each player starts with, for example on the board or in reserve) and dictating which player moves first. The conditions data 520 may dictate various ends of the game (e.g., a draw if no player has a move available, a win/loss if a player loses all pieces or a key piece). Turn data 535 may specify what may occur during each player's turn; for example, a player may move a single piece according to its corresponding rule 582. The rules data 580 may store rules 582a, 582b, 582c, etc. (collectively "rules 582"). Each rule may consist of one or more options 584a, 584b, 584c, etc. (collectively "options 584") and one or more constraints 586a, 586b, 586c, etc. (collectively "constraints 586"). For example, an option 584 may dictate that a particular piece may move forward one space and attack diagonally forward one space. A corresponding constraint 586 may dictate that the piece may move forward to an occupied space, and may not attack an empty space. In some implementations, the option 584 may be associated with more than one constraint 586.

FIG. 6 illustrates example game data 315b generated by the game ingestion engine 310 for a game played with pieces on a game board having a linear and incremental distribution of spaces, with possible links forwards and/or backwards between non-adjacent spaces. Accordingly, the game graph 625 may be represented by a directed graph such as the graph 625. In some cases, each node in the graph 625 may have additional information such as properties of the node. For example, each node may be assigned a color, and the game may progress by players moving based on a color randomly selected by a virtual spinner according randomizer data. Each player may have a single token representing her or his position on the game board. Accordingly, the token data 660 may include only a single token definition 665 describing the properties of the game piece (e.g., representational data corresponding to its appearance so the system 120 can observe the position of the piece on the game board). The game may be played with a spinner that a user may spin to a random_color. Accordingly, the randomizer data 650 may include a randomizer definition 655 for only a single randomizer. The randomizer definition 655 may include parameters for generating an integer value between 1 and a number equal to the number of possible colors, plus a lookup table for mapping the resulting integer to a color. A TTS component 280 of the system 120 may be engaged to verbally announce the result of a spin. The rules data 680 may include one or more rules 682a, 682b, 682c, etc. (collectively "rules 682") of the game that may, for example, dictate that a player's move may blocked if the output of the spin results in the player's token landing on an occupied space; that is, a space already occupied another player's token or other token of the game. The game progression data 610 may include the graph 625, initial state data 615, conditions data 620, and turn data 635. The initial state data 615 may state that the game starts with each player's token positioned on a first space (possibly represented by a "0" or "1" space in the graph 625), and that the youngest player goes first. The turn data 635 may describe each turn of the game, specifying, for example, that a turn starts with a spin and then a player moving their token to the next space of that color. The conditions data 620 may specify that the first player to get their token to an ultimate space of the game board—e.g., a final node in the graph 625, is the winner.

FIG. 7 illustrates example game data 315c generated by the game ingestion engine 310 for a game played with only a deck of cards; for example, a variant of poker. Accordingly, the game data 315c may not include a graph. In some implementations, however, the game data 315c may include positional data indicating relative positions of played cards (for example, runs and triples in Rummy), a draw pile, a discard pile, etc. The token data 760 may include token definitions 765a, 765b, 765c, etc. (collectively "token definitions 765"). A token definition 765 may describe a card in the deck, including its appearance and rank, and, when applicable, its suit. The game data 315c may include randomizer data 750 having a randomizer 755. The randomizer 755 may describe shuffling the deck. For example, for a 52-card deck, the randomizer 755 may include parameters for outputting fifty-two random integers between 1 and 52 (without repeats) assigning those values sequentially to the cards, and then ordering those cards into a stack (e.g., a virtual shoe) in order of the randomly assigned value. The initial state data 715 may specify how many cards are assigned to each player's inventory at the beginning of the game, as well as any cards that may be in play. The stage data 730 may specify different stages of the game; for example, one or more betting and/or drawing stages. The turn data 735 may specify the actions a player may take during a betting stage turn and/or a drawing stage turn. The rules data 780 may include rules 782a, 782b, 782c, etc. (collectively "rules 782") that may describe, for example, how a player may respond to another player's bet, how many cards may be discarded and/or drawn during a draw phase, etc. The conditions data 720 may include conditions for deciding winner(s) and/or loser(s) at the end of a game. For example, the conditions data 720 may state that at the end of so many stages and/or rounds, any player who has not folded must show their cards. The conditions data 720 may include information for scoring a player's hand. The conditions data 720 may state that the player having the hand with the highest score wins.

Figure 8:
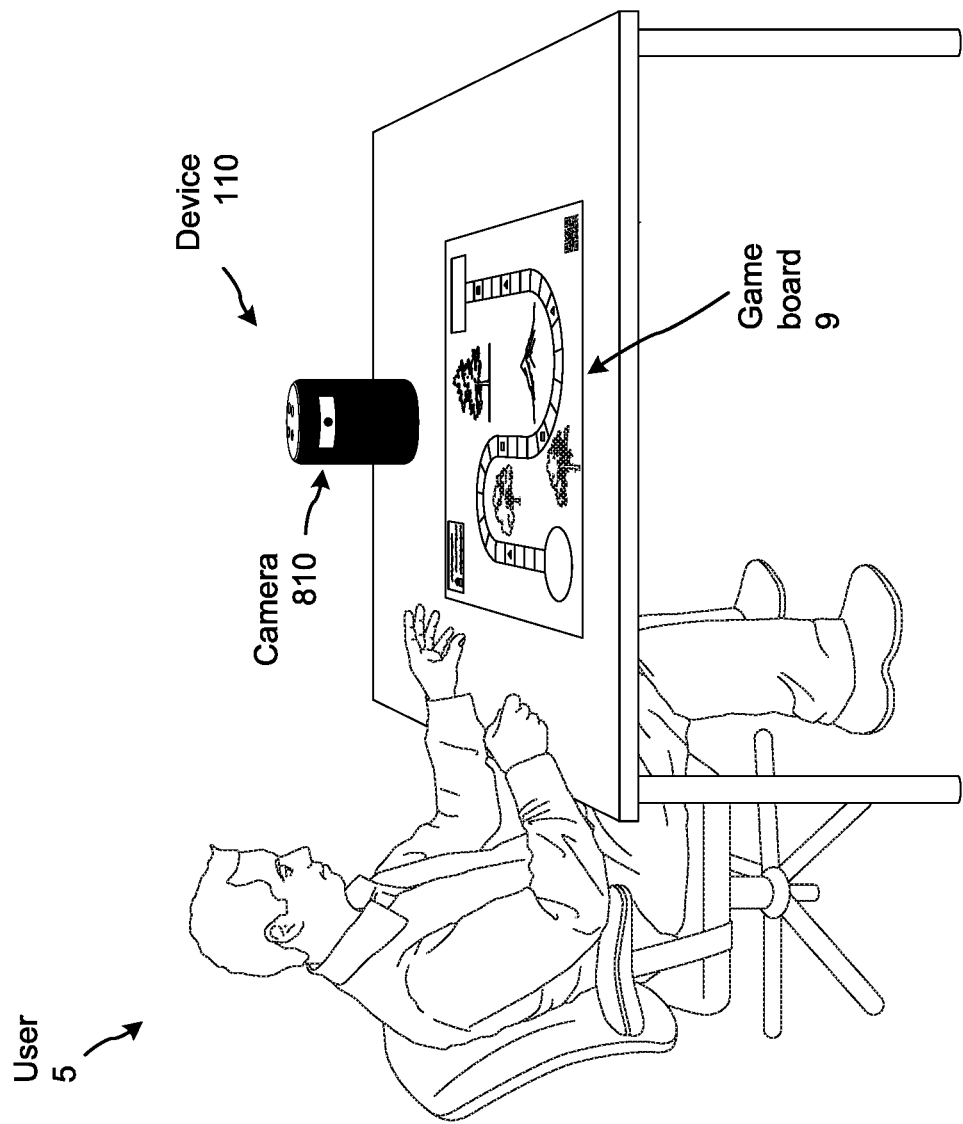
FIG. 8 illustrates a user guiding ingestion of a game by the system, according to embodiments of the present disclosure.

FIG. 8 illustrates a user 5 guiding ingestion of a game by the system 120, according to embodiments of the present disclosure. The user 5 (which may be a tabletop game developer during the ingestion phase, but an actual player during game play) can provide the system 120 with information representing the text of the game instructions. The developer may, via the device 110 and a camera 810 of the device 110, provide images of a game board 9 of the game to the system 120. In doing so, the user 5 may use verbal and visual cues (such as hand gestures) to indicate which portions of the game board 9 are spaces for purposes of the game, which include information such as a legend, which represent locations for tokens such as a stack of cards, and which features merely represent background graphics. The user 5 may be able to interact with the system 120 using spoken natural language to answer questions regarding flaws the system 120 may detect in game data generated from the instructions and images provided to it. A framework for importing and integrating the natural language game input is described in additional detail below with regard to FIGS. 17-22.

Figure 9:
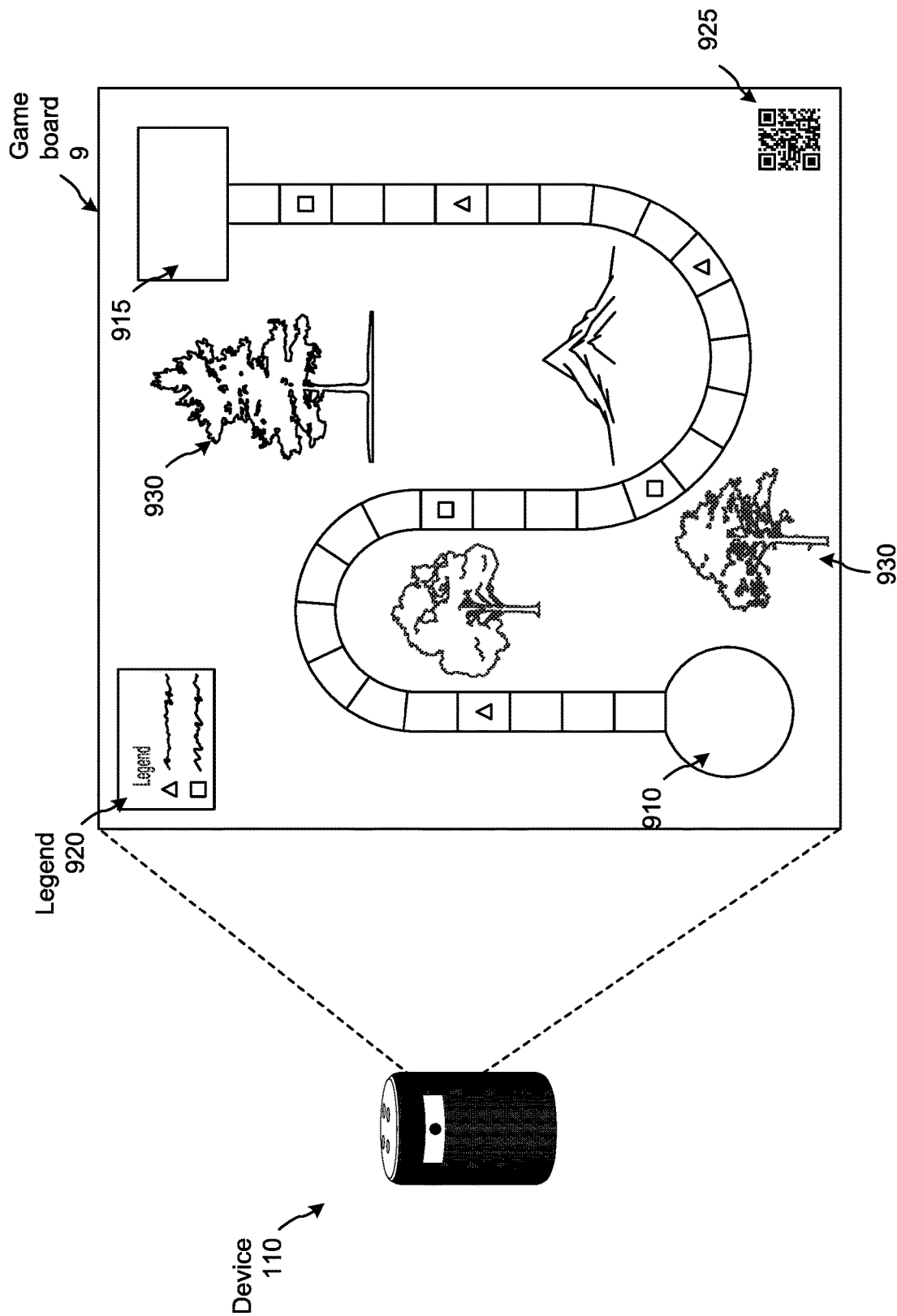
FIG. 9 illustrates a device capturing images of a game board, according to embodiments of the present disclosure.

FIG. 9 illustrates a device 110 capturing images of a game board 9, according to embodiments of the present disclosure. The game board 9 has various features including a starting space 910 and an end space 915 connected by a linear progression of spaces. Some of the spaces are marked with symbols (e.g., a square or triangle) indicating additional properties of the space. A legend 920 in the upper right includes a description of the symbols. The game board 9 includes a matrix bar code 925 such as a QR code. The system 120 can use the matrix bar code 925 to simplify identification of the game; e.g., without performing more complicated computer vision/image processing. The game board 9 may include background graphics 930. The system 120 may use image processing to distinguish background graphics 930 from visual features of the game board 9 related to game play. In some implementations, the system 120 may request the user 5 to indicate relevant and non-relevant graphics; for example, by pointing or using other hand gestures in combination with spoken input. Depending on system permissions, data obtained by the system 120 during this process may be stored with regard to the particular user 6 and/or may be stored in a manner so that the game data may be used with regard to other users who may operate the same game.

Figure 10:
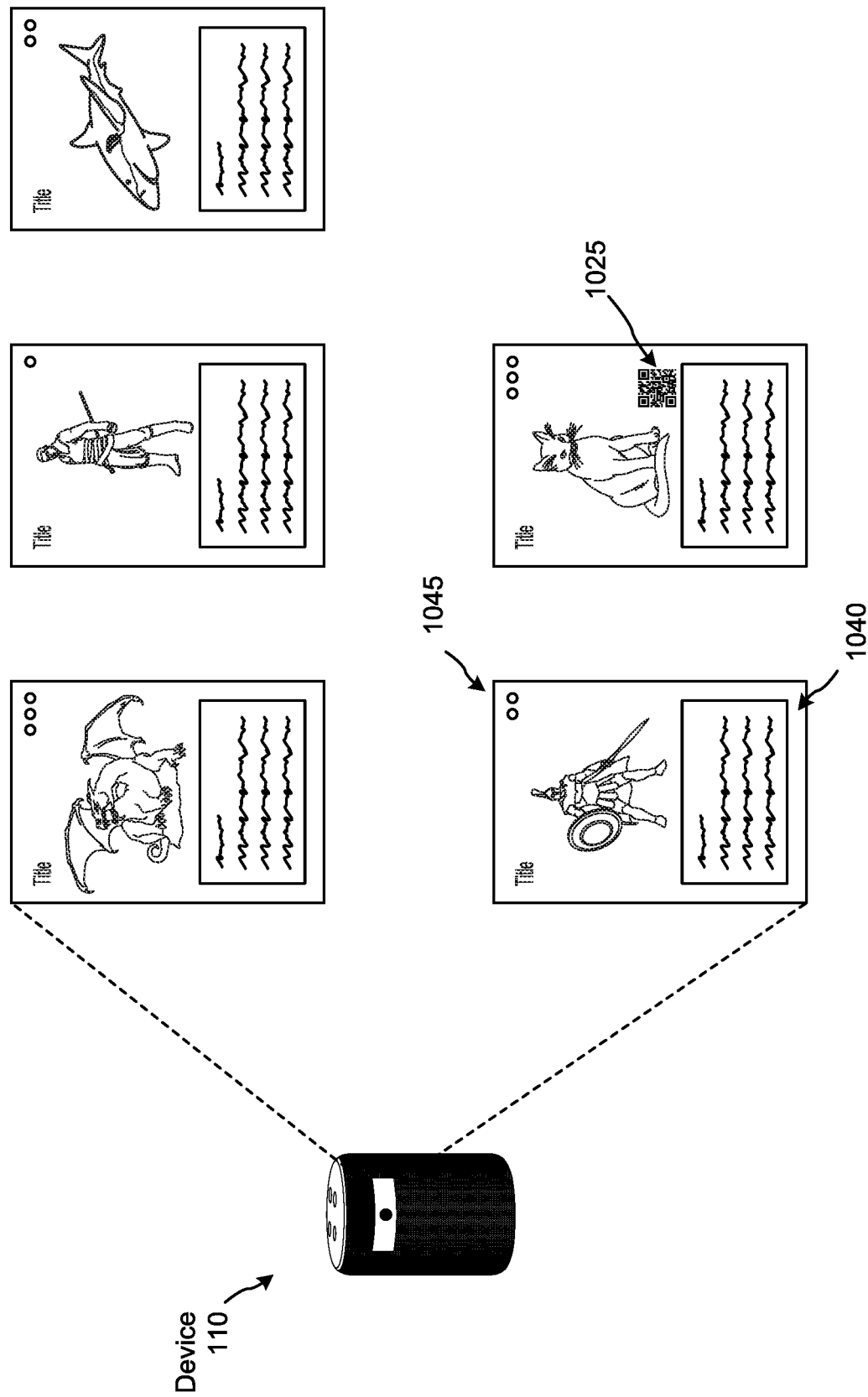
FIG. 10 illustrates a device capturing images of game tokens, according to embodiments of the present disclosure.

FIG. 10 illustrates a device 110 capturing images of game tokens, according to embodiments of the present disclosure. In FIG. 10, the tokens are cards that can represent different creatures, artifacts, and/or powers. An image data ingestion component 1310 of the image processing/computer vision component 240 may coordinate ingestion of image data and creating data that can then be used for later recognition of objects, for example, game pieces. The image processing/computer vision component 240 is described in additional detail below with regard to FIG. 13. The system 120 can process the image of the tokens to learn the appearance of each and process the accompanying text 1040 and/or symbols 1045. The system 120 can generate token definitions 465 based on the captured images. In some implementations, the user 5 can supplement the input with verbal descriptions of the cards and their properties. The system 120 may be able to learn, through guidance, the meaning of the different symbols. For example, if the user 5 describes the symbols with regard to one card, the system 120 may be able to apply that description to cards with similar symbols. In some cases, the cards may include a code 1025 for easier recognition by the system 120. The matrix bar codes 925/1025 may be a code that is recognizable through quick computer vision/image processing techniques (e.g., a QR code, UPC code, or other code). The matrix bar code 925/1025 may be recognized by the system and may be associated with a unique identifier such that the system can determine the unique identifier upon recognizing the code. The system can then identify the card associated with the unique identifier within the appropriate game data 315. The system can then use game data according to the aspects described herein. Although the code 1025 is shown with regard to a card, such a code 1025 can be used with a variety of other game play components such as a board (as shown above with code 925), board segment (e.g., a board may have multiple codes 925), game play token, game piece, etc. thus allowing quick computer recognition of the game aspect including the code 1025.

The system(s) 120 may include image processing/computer vision component 240. The image processing/computer vision component 240 may located across different physical and/or virtual machines. The image processing/computer vision component 240 may receive and analyze image data (which may include single images or a plurality of images such as in a video feed). The image processing/computer vision component 240 may work with other components of the system 120 to perform various operations. For example the image processing/computer vision component 240 may work with user recognition component 295 to assist with user recognition using image data. The image processing/computer vision component 240 may also work with game manager 265 to assist with game play based on image data, for example identifying pieces/cards, board configuration, card position, or a variety of other image based operations. The image processing/computer vision component 240 may be configured to add data to and/or operate on data available through game database 270. The image processing/computer vision component 240 may also include or otherwise be associated with image data storage 1370 which may store aspects of image data used by image processing/computer vision component 240. The image data may be of different formats such as JPEG, GIF, BMP, MPEG, and the like.

Image data ingestion component 1310 may coordinate ingestion of image data and creating data that can then be used for later recognition of objects, for example, game pieces. In certain configurations image data may be pre-provided by a game manufacturer and may be accompanied by tags or other metadata for automated ingestion by image data ingestion component 1310 to populate the game database 270 with information about game play components. In other situations, for example, as discussed in reference to FIGS. 8 through 12, the system may guide the user through providing images of a game that may be ingested by the system. The system may walk the user through obtaining different images of game components along with descriptions thereof (which may be obtained through optical character recognition (OCR) operations, spoken descriptions processed by language processing component 292, or otherwise). For example, several images of a particular object may be taken from multiple points of view (for example, left view, right view, top view, bottom view, etc.). The system 120 may guide the user through the process of obtaining these images by knowing how many points of view are desired and asking the user to present each one. The user may also identify the point of view when showing a game piece to the system for image capture/analysis. These images from the multiple points of view may then be used to train a planar recognizer or other component for later recognition. During later operations geometric verification techniques may then be used (for example by object detection component 1330) to confirm that an object in a query image matches an object in a stored database image. In this manner, recognition of 3D objects may be performed in the absence of a 3D model.

Image matching algorithms, such as those used by image processing/computer vision component 240, may take advantage of the fact that an image of an object or scene contains a number of feature points. Feature points are specific points in an image which are robust to changes in image rotation, scale, viewpoint or lighting conditions. This means that these feature points will often be present in both the images to be compared, even if the two images differ. These feature points may also be known as "points of interest." Therefore, a first stage of the image matching algorithm may include finding these feature points in the image. An image pyramid may be constructed to determine the feature points of an image. An image pyramid is a scale-space representation of the image, e.g., it contains various pyramid images, each of which is a representation of the image at a particular scale. The scale-space representation enables the image matching algorithm to match images that differ in overall scale (such as images taken at different distances from an object). Pyramid images may be smoothed and downsampled versions of an original image.

To build a database of object images, with multiple objects per image, a number of different images of an object may be taken from different viewpoints. From those images, feature points may be extracted and pyramid images constructed. Multiple images from different points of view of each particular object may be taken and linked within the database (for example within a tree structure described below). The multiple images may correspond to different viewpoints of the object sufficient to identify the object from any later angle that may be included in a user's query image. For example, a shoe may look very different from a bottom view than from a top view than from a side view. For certain objects, this number of different image angles may be 6 (top, bottom, left side, right side, front, back), for other objects this may be more or less depending on various factors, including how many images should be taken to ensure the object may be recognized in an incoming query image. With different images of the object available, it is more likely that an incoming image from a user may be recognized by the system and the object identified, even if the user's incoming image is taken at a slightly different angle.

This process may be repeated for multiple objects. For large databases, such as an online shopping database where a user may submit an image of an object to be identified, this process may be repeated thousands, if not millions of times to construct a database of images and data for image matching. The database also may continually be updated and/or refined to account for a changing catalog of objects to be recognized.

When configuring the database, pyramid images, feature point data, and/or other information from the images or objects may be used to cluster features and build a tree of objects and images, where each node of the tree will keep lists of objects and corresponding features. The tree may be configured to group visually significant subsets of images/features to ease matching of submitted images for object detection. Data about objects to be recognized may be stored by the system in image data storage 1370, game database 270, or other storage component.

Figure 13:
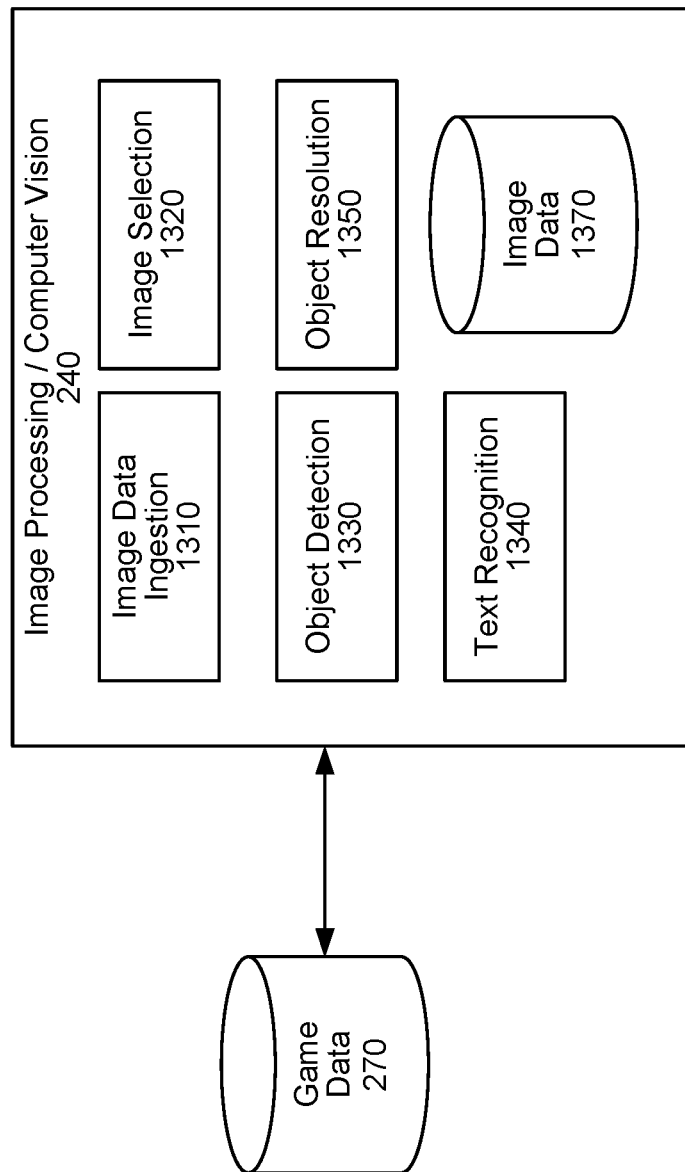
FIG. 13 is a conceptual diagram of an image processing component, according to embodiments of the present disclosure.

Image selection component 1320 may select desired images from input image data to use for image processing at runtime. For example, input image data may come from a series of sequential images, such as a video stream where each image is a frame of the video stream. These incoming images need to be sorted to determine which images will be selected for further object recognition processing as performing image processing on low quality images may result in an undesired user experience. To avoid such an undesirable user experience, the time to perform the complete recognition process, from first starting the video feed to delivering results to the user, should be as short as possible. As images in a video feed may come in rapid succession, the image processing/computer vision component 240 may be configured to select or discard an image quickly so that the system can, in turn, quickly process the selected image and deliver results to a user. The image selection component 1320 may select an image for object recognition by computing a metric/feature for each frame in the video feed and selecting an image for processing if the metric exceeds a certain threshold. While FIG. 13 illustrates image selection component 1320 as part of system 120, it may also be located on device 110 so that the device may select only desired image(s) to send to system 120, thus avoiding sending too much image data to system 120 (thus expending unnecessary computing/communication resources). Thus the device may select only the best quality images for purposes of image analysis.

The metrics used to select an image may be general image quality metrics (focus, sharpness, motion, etc.) or may be customized image quality metrics. The metrics may be computed by software components or hardware components. For example, the metrics may be derived from output of device sensors such as a gyroscope, accelerometer, field sensors, inertial sensors, camera metadata, or other components. The metrics may thus be image based (such as a statistic derived from an image or taken from camera metadata like focal length or the like) or may be non-image based (for example, motion data derived from a gyroscope, accelerometer, GPS sensor, etc.). As images from the video feed are obtained by the system, the system, such as a device, may determine metric values for the image. One or more metrics may be determined for each image. To account for temporal fluctuation, the individual metrics for each respective image may be compared to the metric values for previous images in the image feed and thus a historical metric value for the image and the metric may be calculated. This historical metric may also be referred to as a historical metric value. The historical metric values may include representations of certain metric values for the image compared to the values for that metric for a group of different images in the same video feed. The historical metric(s) may be processed using a trained classifier model to select which images are suitable for later processing.

For example, if a particular image is to be measured using a focus metric, which is a numerical representation of the focus of the image, the focus metric may also be computed for the previous N frames to the particular image. N is a configurable number and may vary depending on system constraints such as latency, accuracy, etc. For example, N may be 30 image frames, representing, for example, one second of video at a video feed of 30 frames-per-second. A mean of the focus metrics for the previous N images may be computed, along with a standard deviation for the focus metric. For example, for an image number X+1 in a video feed sequence, the previous N images, may have various metric values associated with each of them. Various metrics such as focus, motion, and contrast are discussed, but others are possible. A value for each metric for each of the N images may be calculated, and then from those individual values, a mean value and standard deviation value may be calculated. The mean and standard deviation (STD) may then be used to calculate a normalized historical metric value, for example STD(metric)/MEAN(metric). Thus, the value of a historical focus metric at a particular image may be the STD divided by the mean for the focus metric for the previous N frames. For example, historical metrics (HIST) for focus, motion, and contrast may be expressed as:

$$HIST_{Focus} = \frac{STD_{Focus}}{MEAN_{Focus}}$$

$$HIST_{Motion} = \frac{STD_{Motion}}{MEAN_{Motion}}$$

$$HIST_{Contrast} = \frac{STD_{Contrast}}{MEAN_{Contrast}}$$

In one embodiment the historical metric may be further normalized by dividing the above historical metrics by the number of frames N, particularly in situations where there are small number of frames under consideration for the particular time window. The historical metrics may be recalculated with each new image frame that is received as part of the video feed. Thus each frame of an incoming video feed may have a different historical metric from the frame before. The metrics for a particular image of a video feed may be compared historical metrics to select a desirable image on which to perform image processing.

Image selection component 1320 may perform various operations to identify potential locations in an image that may contain recognizable text. This process may be referred to as glyph region detection. A glyph is a text character that has yet to be recognized. If a glyph region is detected, various metrics may be calculated to assist the eventual optical character recognition (OCR) process. For example, the same metrics used for overall image selection may be re-used or recalculated for the specific glyph region. Thus, while the entire image may be of sufficiently high quality, the quality of the specific glyph region (e.g., focus, contrast, intensity, etc.) may be measured. If the glyph region is of poor quality, the image may be rejected for purposes of text recognition.

Image selection component 1320 may generate a bounding box that bounds a line of text. The bounding box may bound the glyph region. Value(s) for image/region suitability metric(s) may be calculated for the portion of the image in the bounding box. Value(s) for the same metric(s) may also be calculated for the portion of the image outside the bounding box. The value(s) for inside the bounding box may then be compared to the value(s) outside the bounding box to make another determination on the suitability of the image. This determination may also use a classifier.

Additional features may be calculated for determining whether an image includes a text region of sufficient quality for further processing. The values of these features may also be processed using a classifier to determine whether the image contains true text character/glyphs or is otherwise suitable for recognition processing. To locally classify each candidate character location as a true text character/glyph location, a set of features that capture salient characteristics of the candidate location is extracted from the local pixel pattern. Such features may include aspect ratio (bounding box width/bounding box height), compactness ($4*\pi*$candidate glyph area/(perimeter)$^2$), solidity (candidate glyph area/bounding box area), stroke-width to width ratio (maximum stroke width/bounding box width), stroke-width to height ratio (maximum stroke width/bounding box height), convexity (convex hull perimeter/perimeter), raw compactness ($4*\pi*$(candidate glyph number of pixels)/(perimeter)$^2$), number of holes in candidate glyph, or other features. Other candidate region identification techniques may be used. For example, the system may use techniques involving maximally stable extremal regions (MSERs). Instead of MSERs (or in conjunction with MSERs), the candidate locations may be identified using histogram of oriented gradients (HoG) and Gabor features.

If an image is sufficiently high quality it may be selected by image selection component 1320 for sending to another component (e.g., from device to system 120) and/or for further processing, such as text recognition, object detection/resolution, etc.

The feature data calculated by image selection component 1320 may be sent to other components such as text recognition component 1340, object detection component 1330, object resolution component 1350, etc. so that those components may use the feature data in their operations. Other preprocessing operations such as masking, binarization, etc. may be performed on image data prior to recognition/resolution operations. Those preprocessing operations may be performed by the device prior to sending image data or by system 120.

Object detection component 1330 may be configured to analyze image data to identify one or more objects represented in the image data. Various approaches can be used to attempt to recognize and identify objects, as well as to determine the types of those objects and applications or actions that correspond to those types of objects, as is known or used in the art. For example, various computer vision algorithms can be used to attempt to locate, recognize, and/or identify various types of objects in an image or video sequence. Computer vision algorithms can utilize various different approaches, as may include edge matching, edge detection, recognition by parts, gradient matching, histogram comparisons, interpretation trees, and the like.

The object detection component 1330 may process at least a portion of the image data to determine feature data. The feature data is indicative of one or more features that are depicted in the image data. For example, the features may be game pieces, board pieces, or other objects, for example as represented by stored data in game database 270. Other examples of features may include shapes of body parts or other such features that identify the presence of a human. Other examples of features may include edges of doors, shadows on the wall, texture on the walls, portions of artwork in the environment, and so forth to identify a space. The object detection component 1330 may compare detected features to stored data (e.g., in game database 270, image data storage 1370, or other storage) indicating how detected features may relate to known objects for purposes of object detection.

Various techniques may be used to determine the presence of features in image data. For example, one or more of a Canny detector, Sobel detector, difference of Gaussians, features from accelerated segment test (FAST) detector, scale-invariant feature transform (SIFT), speeded up robust features (SURF), color SIFT, local binary patterns (LBP), trained convolutional neural network, or other detection methodologies may be used to determine features in the image data. A feature that has been detected may have an associated descriptor that characterizes that feature. The descriptor may comprise a vector value in some implementations. For example, the descriptor may comprise data indicative of the feature with respect to many (e.g., 256) different dimensions.

One statistical algorithm that may be used for geometric matching of images is the Random Sample Consensus (RANSAC) algorithm, although other variants of RANSAC-like algorithms or other statistical algorithms may also be used. In RANSAC, a small set of putative correspondences is randomly sampled. Thereafter, a geometric transformation is generated using these sampled feature points. After generating the transformation, the putative correspondences that fit the model are determined. The putative correspondences that fit the model and are geometrically consistent and called "inliers." The inliers are pairs of feature points, one from each image, that may correspond to each other, where the pair fits the model within a certain comparison threshold for the visual (and other) contents of the feature points, and are geometrically consistent (as explained below relative to motion estimation). A total number of inliers may be determined. The above mentioned steps may be repeated until the number of repetitions/trials is greater than a predefined threshold or the number of inliers for the image is sufficiently high to determine an image as a match (for example the number of inliers exceeds a threshold). The RANSAC algorithm returns the model with the highest number of inliers corresponding to the model.

To further test pairs of putative corresponding feature points between images, after the putative correspondences are determined, a topological equivalence test may be performed on a subset of putative correspondences to avoid forming a physically invalid transformation. After the transformation is determined, an orientation consistency test may be performed. An offset point may be determined for the feature points in the subset of putative correspondences in one of the images. Each offset point is displaced from its corresponding feature point in the direction of the orientation of that feature point. The transformation is discarded based on orientation of the feature points obtained from the feature points in the subset of putative correspondences if any one of the images being matched and its offset point differs from an estimated orientation by a predefined limit. Subsequently, motion estimation may be performed using the subset of putative correspondences which satisfy the topological equivalence test.

Motion estimation (also called geometric verification) may determine the relative differences in position between corresponding pairs of putative corresponding feature points. A geometric relationship between putative corresponding feature points may determine where in one image (e.g., the image input to be matched) a particular point is found relative to that potentially same point in the putatively matching image (e.g., a database image). The geometric relationship between many putatively corresponding feature point pairs may also be determined, thus creating a potential map between putatively corresponding feature points across images. Then the geometric relationship of these points may be compared to determine if a sufficient number of points correspond (that is, if the geometric relationship between point pairs is within a certain threshold score for the geometric relationship), thus indicating that one image may represent the same real-world physical object, albeit from a different point of view. Thus, the motion estimation may determine that the object in one image is the same as the object in another image, only rotated by a certain angle or viewed from a different distance, etc.

The above processes of image comparing feature points and performing motion estimation across putative matching images may be performed multiple times for a particular query image to compare the query image to multiple potential matches among the stored database images. Dozens of comparisons may be performed before one (or more) satisfactory matches that exceed the relevant thresholds (for both matching feature points and motion estimation) may be found. The thresholds may also include a confidence threshold, which compares each potential matching image with a confidence score that may be based on the above processing. If the confidence score exceeds a certain high threshold, the system may stop processing additional candidate matches and simply select the high confidence match as the final match. Or if, the confidence score of an image is within a certain range, the system may keep the candidate image as a potential match while continuing to search other database images for potential matches. In certain situations, multiple database images may exceed the various matching/confidence thresholds and may be determined to be candidate matches. In this situation, a comparison of a weight or confidence score may be used to select the final match, or some combination of candidate matches may be used to return results. The system may continue attempting to match an image until a certain number of potential matches are identified, a certain confidence score is reached (e.g., individually with a single potential match or among multiple matches), or some other search stop indicator is triggered. For example, a weight may be given to each object of a potential matching database image. That weight may incrementally increase if multiple query images (for example, multiple frames from the same image stream) are found to be matches with database images of a same object. If that weight exceeds a threshold, a search stop indicator may be triggered and the corresponding object selected as the match.

Once an object is detected by object detection component 1330 the system may determine which object is actually seen using object resolution component 1350. Thus one component, such as object detection component 1330, may detect if an object is represented in an image while another component, object resolution component 1350 may determine which object is actually represented. Although illustrated as separate components, the system may also be configured so that a single component may perform both object detection and object resolution.

For example, when a database image is selected as a match to the query image, the object in the query image may be determined to be the object in the matching database image. An object identifier associated with the database image (such as a product ID or other identifier) may be used to return results to a user, along the lines of "I see you holding piece X" along with other information, such giving the user information about the piece or giving the user the description of how a game component is used in game play. If multiple potential matches are returned (such as when the system can't determine exactly what object is found or if multiple objects appear in the query image) the system may indicate to the user that multiple potential matching objects are found and may return information/options related to the multiple objects.

In another example, object detection component 1330 may determine that a type of object is represented in image data and object resolution component 1350 may then determine which specific object is represented, for example performing specific operations to determine which game piece is shown that goes with a specific game, or which specific card that has which attributes, etc. The object resolution component 1350 may also make available specific data about a recognized object to further components such as game manager 265, etc. so that further operations may be performed with regard to the resolved object.

If an object is detected in image data, the image processing/computer vision component 240 may determine position data within an image that identifies the location of the object within the image. The system 120 may then determine (using image processing/computer vision component 240, game manager 265, or other component) position data relative to the game playing environment in which the object is located. The system 120 may then make that data available to other components (e.g., game manager 265, etc.) to take operations relative to the object. For example, if a certain game piece is detected in image data by the image processing/computer vision component 240, the game manager 265 may determine the piece should be illuminated for some game playing purposes such as suggesting a move. The system 120 may determine where the piece is in the environment of the game relative to device 110, and may then instruct the light projection component 3330 to project a certain color light on the piece's location in the environment to highlight the piece to the user.

Object detection component 1330 may be configured to process image data to detect a representation of an approximately two-dimensional (2D) object (such as a flat card) or a three-dimensional (3D) object (such as a game piece). Such recognition may be based on available stored data (e.g., in the game database 270, the image data storage 1370, etc.) which in turn may have been provided through an image data ingestion process managed by image data ingestion component 1310. Various techniques may be used to determine the presence of features in image data. For example, one or more of a Canny detector, Sobel detector, difference of Gaussians, features from accelerated segment test (FAST) detector, scale-invariant feature transform (SIFT), speeded up robust features (SURF), color SIFT, local binary patterns (LBP), trained convolutional neural network, or other detection methodologies may be used to determine features in the image data. A feature that has been detected may have an associated descriptor that characterizes that feature. The descriptor may comprise a vector value in some implementations. For example, the descriptor may comprise data indicative of the feature with respect to many (e.g., 256) different dimensions.

Figure 14:
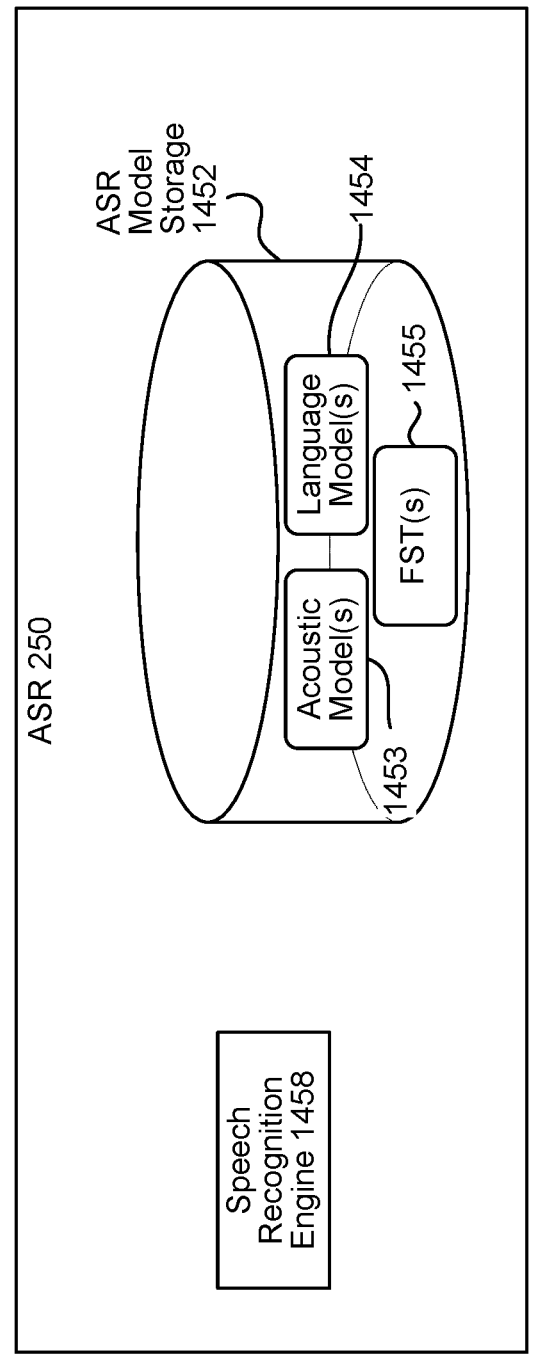
FIG. 14 is a conceptual diagram of an ASR component, according to embodiments of the present disclosure.

FIG. 14 is a conceptual diagram of an ASR component 250, according to embodiments of the present disclosure. The ASR component 250 may interpret a spoken natural language input based on the similarity between the spoken natural language input and pre-established language model(s) 1454 stored in an ASR model storage 1452. For example, the ASR component 250 may compare the audio data with models for sounds (e.g., subword units or phonemes) and sequences of sounds to identify words that match the sequence of sounds spoken in the natural language input. The language model(s) 1454 can include domain-specific language model(s), such as a language model 1454-X generated for a particular game as described further below with regard to FIGS. 17-22. Alternatively, the ASR component 250 may use a finite state transducer (FST) 1455 to implement the language model functions.

The ASR component 250 may generate ASR output data 1405 in the form of one or more ASR hypotheses. When the ASR component 250 generates more than one ASR hypothesis for a single spoken natural language input, each ASR hypothesis may be assigned a score (e.g., probability score, confidence score, etc.) representing a likelihood that the corresponding ASR hypothesis matches the spoken natural language input (e.g., representing a likelihood that a particular set of words matches those spoken in the natural language input). The score may be based on a number of factors including, for example, the similarity of the sound in the spoken natural language input to models for language sounds (e.g., an acoustic model 1453 stored in the ASR model storage 1452), and the likelihood that a particular word, which matches the sounds, would be included in the sentence at the specific location (e.g., using a language or grammar model 1454). Based on the considered factors and the assigned confidence score, the ASR component 250 may output an ASR hypothesis that most likely matches the spoken natural language input, or may output multiple ASR hypotheses in the form of a lattice or an N-best list, with each ASR hypothesis corresponding to a respective score.

The ASR component 250 may include a speech recognition engine 1458. The ASR component 250 receives audio data 211 (for example, received from a local device 110 having processed audio detected by a microphone by an acoustic front end (AFE) or other component). The speech recognition engine 1458 compares the audio data 211 with acoustic models 1453, language models 1454, FST(s) 1455, and/or other data models and information for recognizing the speech conveyed in the audio data. The audio data 211 may be audio data that has been digitized (for example by an AFE) into frames representing time intervals for which the AFE determines a number of values, called features, representing the qualities of the audio data, along with a set of those values, called a feature vector, representing the features/qualities of the audio data within the frame. In at least some embodiments, audio frames may be 10 ms each. Many different features may be determined, as known in the art, and each feature may represent some quality of the audio that may be useful for ASR processing. A number of approaches may be used by an AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 1458 may process the audio data 211 with reference to information stored in the ASR model storage 1452. Feature vectors of the audio data 211 may arrive at the system 120 encoded, in which case they may be decoded prior to processing by the speech recognition engine 1458.

Figure 15:
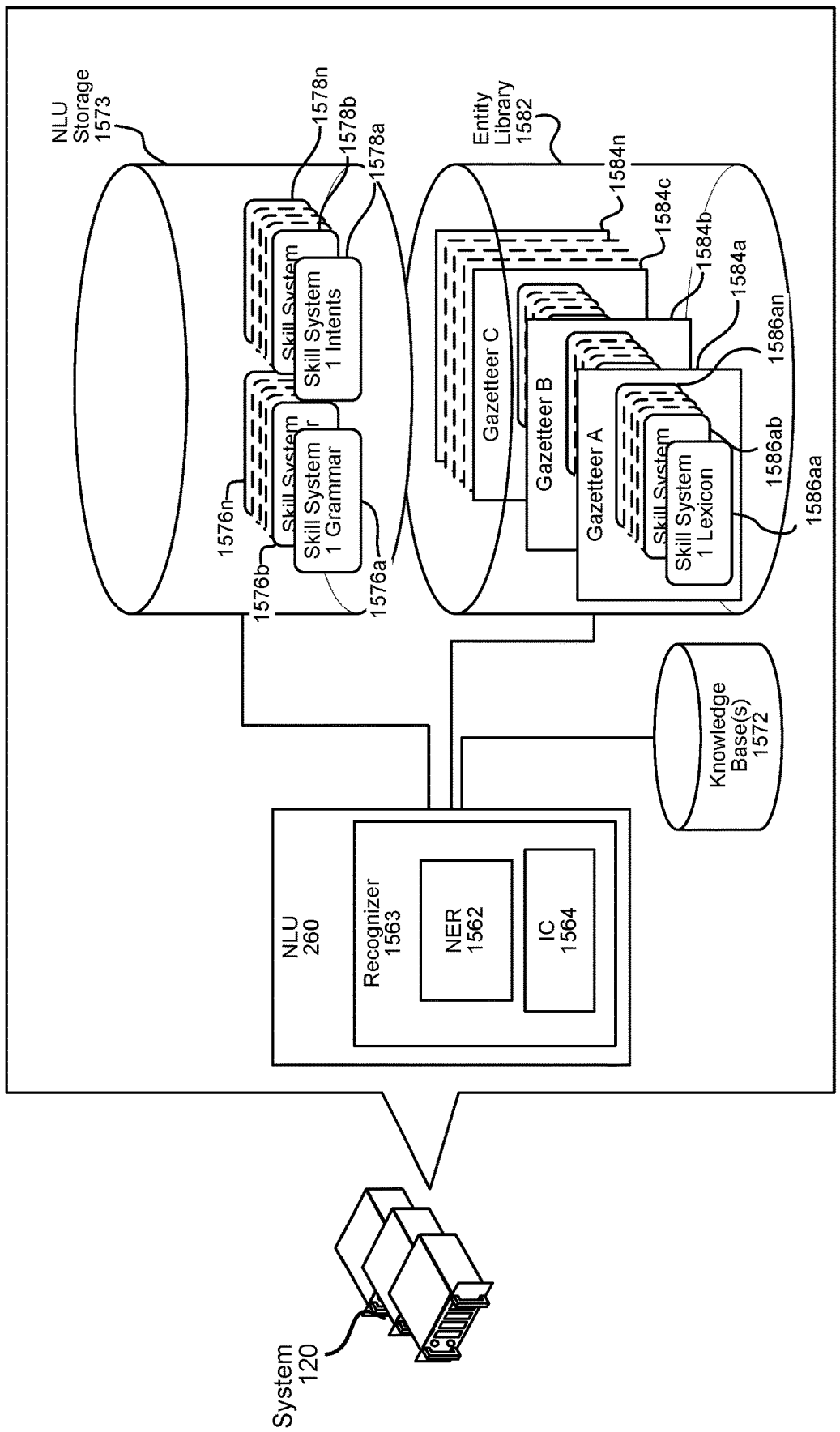
FIG. 15 is a conceptual diagram of how natural language processing is performed, according to embodiments of the present disclosure.
Figure 16:
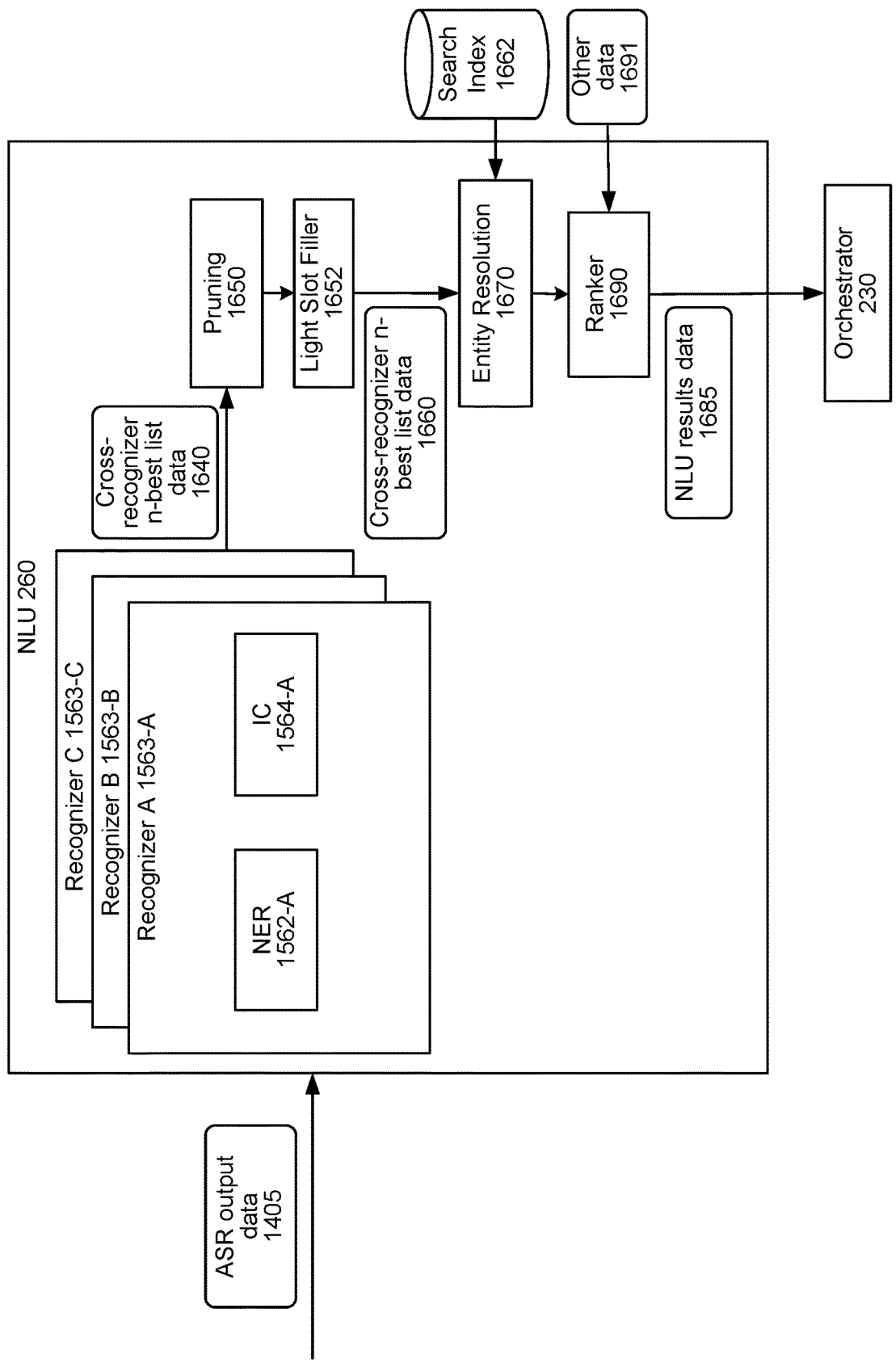
FIG. 16 is a conceptual diagram of how natural language processing is performed, according to embodiments of the present disclosure.

FIGS. 15 and 16 illustrates how the NLU component 260 may perform NLU processing. FIG. 15 is a conceptual diagram of how natural language processing is performed, according to embodiments of the present disclosure. And FIG. 16 is a conceptual diagram of how natural language processing is performed, according to embodiments of the present disclosure. The NLU component 260 may include one or more recognizers 1563. In at least some embodiments, a recognizer 1563 may be associated with a skill system 125 (e.g., the recognizer may be configured to interpret text data to correspond to the skill system 125). In at least some other examples, a recognizer 1563 may be associated with a domain (e.g., the recognizer may be configured to interpret text data to correspond to the domain).

Recognizers 1563 may process text data in parallel, in series, partially in parallel, etc. For example, a recognizer corresponding to a first domain may process text data at least partially in parallel to a recognizer corresponding to a second domain. For further example, a recognizer corresponding to a first skill system may process text data at least partially in parallel to a recognizer corresponding to a second skill system.

The NLU component 260 may communicate with various storages. The NLU component 260 may communicate with an NLU storage 1573, which includes skill system grammars (1576a-1576n), representing how natural language inputs may be formulated to invoke skill systems 125, and skill system intents (1578a-1578n) representing intents supported by respective skill systems 125.

Each recognizer 1563 may be associated with a particular grammar 1576, a particular intent(s) 1578, and a particular personalized lexicon 1586 (stored in an entity library 1582). A gazetteer 1584 may include skill system-indexed lexical information associated with a particular user. For example, Gazetteer A (1584a) may include skill system-indexed lexical information 1586aa to 1586an. A user's music skill system lexical information might include album titles, artist names, and song names, for example, whereas a user's contact list skill system lexical information might include the names of contacts. Since every user's music collection and contact list is presumably different, this personalized information may improve entity resolution.

Each recognizer 1563 may include a NER component 1562 that attempts to identify grammars and lexical information that may be used to construe meaning with respect to text data input therein. A NER component 1562 identifies portions of text data that correspond to a named entity that may be recognizable by the system 120. A NER component 1562 may also determine whether a word refers to an entity that is not explicitly mentioned in the text, for example "him," "her," "it" or other anaphora, exophora or the like.

A NER component 1562 applies grammar models 1576 and lexical information 1586 associated with one or more skill systems 125 to determine a mention of one or more entities in text data input therein. In this manner, a NER component 1562 identifies "slots" (e.g., particular words in text data) that may be needed for later processing. A NER component 1562 may also label each slot with a type (e.g., noun, place, city, artist name, song name, etc.).

Each grammar model 1576 may include the names of entities (e.g., nouns) commonly found in speech about a particular skill system 125 to which the grammar model 1576 relates, whereas lexical information 1586 may be personalized to the user identifier output by a user recognition component 295 for the natural language input. For example, a grammar model 1576 associated with a shopping skill system may include a database of words commonly used when people discuss shopping.

A downstream process called named entity resolution actually links a portion of text data (identified by a NER component 1562) to a specific entity known to the system 120. To perform named entity resolution, the NLU component 260 may use gazetteer information (1584a-1584n) stored in the entity library storage 1582. The gazetteer information 1584 may be used to match text data (identified by a NER component 1562) with different entities, such as song titles, contact names, etc. Gazetteers may be linked to users (e.g., a particular gazetteer may be associated with a specific user's music collection), may be linked to certain skill systems 125 (e.g., a shopping skill system, a music skill system, a video skill system, a communications skill system, etc.), or may be organized in another manner.

Each recognizer 1563 may also include an IC component 1564 that processes text data input thereto to determine an intent(s) of a skill system(s) 125 that potentially corresponds to the natural language input represented in the text data. An intent corresponds to an action to be performed that is responsive to the natural language input represented by the text data. An IC component 1564 may communicate with a database 1578 of words linked to intents. For example, a music intent database may link words and phrases such as "quiet," "volume off," and "mute" to a <Mute> intent. A game intent database may link words and phrases such as "draw," "roll," and "move." An IC component 1564 identifies potential intents by comparing words and phrases in text data to the words and phrases in an intents database 1578 associated with the skill system(s) 125 that is associated with the recognizer 1563 implementing the IC component 1564.

The intents identifiable by a specific ICIC component 1564 may be linked to one or more skill system-specific grammar frameworks 1576 with "slots" to be filled. Each slot of a grammar framework 1576 corresponds to a portion of text data that a NER component 1562 believes corresponds to an entity. For example, a grammar framework 1576 corresponding to a <PlayMusic> intent may correspond to text data sentence structures such as "Play {Artist Name}," "Play {Album Name}," "Play {Song name}," "Play {Song name} by {Artist Name}," etc. A grammar framework 1576 corresponding to a <PlayGame> intent may correspond to text data sentence structures such as "Play {Game Title}," "Play {Game Publisher}," "Play {Saved Game Instance}," "Play {Game Title} by {Game Publisher}," etc. However, to make resolution more flexible, grammar frameworks 1576 may not be structured as sentences, but rather based on associating slots with grammatical tags.

For example, a NER component 1562 may identify words in text data as subject, object, verb, preposition, etc. based on grammar rules and/or models prior to recognizing named entities in the text data. An ICIC component 1564 (implemented by the same recognizer 1563) may use the identified verb to identify an intent. The NER component 1562 may then determine a grammar model 1576 associated with the identified intent. For example, a grammar model 1576 for an intent corresponding to <PlayMusic> may specify a list of slots applicable to play the identified "object" and any object modifier (e.g., a prepositional phrase), such as {Artist Name}, {Album Name}, {Song name}, etc. A grammar model 1576 for an intent corresponding to <PlayGame> may specify a list of slots such as {Game Title}, {Game Publisher}, {Saved Game Instance}, etc. The NER component 1562 may then search corresponding fields in a lexicon 1586, attempting to match words and phrases in the text data the NER component 1562 previously tagged as a grammatical object or object modifier with those identified in the lexicon 1586.

A NER component 1562 may perform semantic tagging, which is the labeling of a word or combination of words according to their type/semantic meaning. A NER component 1562 may parse text data using heuristic grammar rules, or a model may be constructed using techniques such as hidden Markov models, maximum entropy models, log linear models, conditional random fields (CRF), and the like. For example, a NER component 1562, implemented by a music skill system or music domain recognizer 1563, may parse and tag text data corresponding to "play mother's little helper by the rolling stones" as {Verb}: "Play," {Object}: "mother's little helper," {Object Preposition}: "by," and {Object Modifier}: "the rolling stones." The NER component 1562 may identify "Play" as a verb based on a word database associated with the music skill system or music domain, which an IC component 1564 may determine corresponds to a <PlayMusic> intent. At this stage, no determination has been made as to the meaning of "mother's little helper" and "the rolling stones," but based on grammar rules and models, the NER component 1562 has determined that the text of these phrases relates to the grammatical object (e.g., entity). Similarly, an NER component 1562 specific to a game domain may parse additional commands related to playing a game, such as {Verb}: "Move," {Object}: "green piece," {Object Preposition}: "forward," and {Object Modifier}: "two spaces."

The frameworks linked to the intent are then used to determine what database fields should be searched to determine the meaning of these phrases, such as searching a user's gazetteer 1584 for similarity with the framework slots. For example, a framework for a <PlayGame> intent may attempt to resolve the identified object based on {Game Title}, {Game Publisher}, and {Saved Game Instance}. Similarly, a framework for a <PlayMusic> intent might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 1584 does not resolve a slot/field using gazetteer information, the NER component 1562 may search a database of generic words (in the knowledge base 1572). For example, if the text data corresponds to "play songs by the rolling stones," after failing to determine an album name or song name called "songs" by "the rolling stones," the NER component 1562 may search a music skill system vocabulary for the word "songs." In the alternative, generic words may be checked before the gazetteer information, or both may be tried, potentially producing two different results.

A recognizer 1563 may tag text data to attribute meaning thereto. For example, a recognizer 1563 may tag "play mother's little helper by the rolling stones" as: {skill system} Music, {intent} Play Music, {artist name} rolling stones, {media type} SONG, and {song title} mother's little helper. For further example, a recognizer 1563 may tag "play songs by the rolling stones" as: {skill system} Music, {intent} Play Music, {artist name} rolling stones, and {media type} SONG.

As described above, more than one recognizer 1563 may process with respect to text data representing a single natural language input. In such instances, each recognizer 1563 may output NLU hypothesis data including at least one NLU hypothesis including an intent indicator (determined by an IC component 1564 of the recognizer 1563) and at least one tagged named entity (determined by a NER component 1562 of the recognizer 1563).

The NLU component 260 may compile the NLU hypotheses (output by multiple recognizers 1563) into cross-recognizer N-best list data 1640. Each NLU hypothesis may be associated with a respective score indicating a likelihood that the NLU hypothesis corresponds to the domain, one or more skill systems 125, etc. associated with the recognizer 1563 from which the NLU hypothesis was output. For example, for a <PlayMusic> intent, the cross-recognizer N-best list data 1640 may be represented as:

[0.95] Intent: <PlayMusic> ArtistName: Lady Gaga SongName: Poker Face

[0.70] Intent: <PlayVideo> ArtistName: Lady Gaga VideoName: Poker Face

[0.01] Intent: <PlayMusic> ArtistName: Lady Gaga AlbumName: Poker Face

[0.01] Intent: <PlayMusic> SongName: Pokerface with each line of the foregoing corresponding to a different NLU hypothesis and associated score. For a <PlayGame> intent, the N-best list data 1640 may be represented as:

[0.90] Intent: <PlayGame> GameName: Forest Magic PublisherName: Dark Arts

[0.30] Intent: <PlayGame> GameName: Dark Arts PublisherName: Forest Magic

[0.01] Intent: <PlayGame> SavedGameName: Dark Arts GameName: Forest Magic

[0.01] Intent: <PlayGame> SavedGameName: Dark Arts by Forest Magic

The NLU component 260 may send the cross-recognizer N-best list data 1640 to a pruning component 1650, which sorts the NLU hypotheses, represented in the cross-recognizer N-best list data 1640, according to their respective scores. The pruning component 1650 may then perform score thresholding with respect to the cross-recognizer N-best list data 1640. For example, the pruning component 1650 may select NLU hypotheses, represented in the cross-recognizer N-best list data 1640, associated with scores satisfying (e.g., meeting and/or exceeding) a threshold score. The pruning component 1650 may additionally or alternatively perform number of NLU hypothesis thresholding. For example, the pruning component 1650 may select a threshold number of top-scoring NLU hypotheses represented in the cross-recognizer N-best list data 1640.

The pruning component 1650 may generate cross-recognizer N-best list data 1660 including the selected NLU hypotheses. The purpose of the pruning component 1650 is to create a reduced list of NLU hypotheses so that downstream, more resource intensive, processes may only operate on NLU hypotheses that most likely represent the natural language input.

The NLU component 260 may include a light slot filler component 1652 that takes text from slots, represented in the NLU hypotheses output by the pruning component 1650, and alter it to make the text more easily processed by downstream components. The light slot filler component 1652 may perform low latency operations that do not involve heavy operations such as reference to a knowledge base. The purpose of the light slot filler component 1652 is to replace words with other words or values that may be more easily understood by downstream components. For example, if a NLU hypothesis includes the word "tomorrow," the light slot filler component 1652 may replace the word "tomorrow" with an actual date for purposes of downstream processing. Similarly, the light slot filler component 1652 may replace the word "CD" with "album" or the words "compact disc." The replaced words are then included in the cross-recognizer N-best list data 1660.

The cross-recognizer N-best list data 1660 may be sent to an entity resolution component 1670. The entity resolution component 1670 can apply rules or other instructions to standardize labels or tokens in the NLU hypotheses represented in the cross-recognizer N-best list data 1660. The precise transformation may depend on the skill system 125, domain, etc. to which a NLU hypothesis relates. For example, for a travel skill system-specific NLU hypothesis, the entity resolution component 1670 may transform text corresponding to "Boston airport" to the standard BOS three-letter code referring to the airport. The entity resolution component 1670 can refer to a knowledge base that is used to specifically identify the precise entity referred to in each slot of each NLU hypothesis represented in the cross-recognizer N-best list data 1660.

Specific intent/slot combinations may also be tied to a particular source, which may then be used to resolve the text. In the example "play songs by the stones," the entity resolution component 1670 may reference a personal music catalog, Amazon Music account, a user profile, or the like with entity data that the entity resolution component 1670 can leverage to identify entities corresponding to slots or entity mentions in the cross-recognizer N-best list data 1660. The entity resolution component 1670 may refer to one or more search indices 1662. The search index 1662 may be a data structure including one or more lists, tables, catalogs, etc. For example, the search index 1662 may include a catalog built by the game manager 265 for the particular game being ingested or played. Each game may have an associated catalog that includes words and phrases used in a game. The entity resolution component 1670 may output N-best list data, altered from the cross-recognizer N-best list data 1660, that includes more detailed information (e.g., entity IDs) about the specific entities mentioned in the slots and/or more detailed slot data that can eventually be used by a skill system 125 to perform an action responsive to the natural language input. The NLU component 260 may include multiple entity resolution components 1670 that are each specific to one or more different skill systems 125, domains, etc.

The NLU component 260 may include a ranker component 1690 that assigns a particular score to each NLU hypothesis input therein. The score of a particular NLU hypothesis may be affected by whether the NLU hypothesis has unfilled slots. For example, if a first NLU hypothesis includes slots that are all filled/resolved, the ranker component 1690 may assign the first NLU hypothesis a higher score than a second NLU hypothesis including at least one slot that is unfilled/unresolved by the entity resolution component 1670.

The ranker component 1690 may apply re-scoring, biasing, or other techniques. To do so, the ranker component 1690 may consider not only the data output by the entity resolution component 1670, but may also consider other data 1691. The other data 1691 may include a variety of information including information specific to the particular game being ingested or played.

For example, the other data 1691 may include skill system 125 rating or popularity data. For example, if a skill system 125 has a high rating, the ranker component 1690 may increase the score of a NLU hypothesis associated with that skill system 125, and vice versa.

The other data 1691 may additionally or alternatively include information about skill systems 125 that have been enabled by the user that originated the natural language input. For example, the ranker component 1690 may assign higher scores to NLU hypotheses associated with enabled skill systems 125 than NLU hypotheses associated with skill systems 125 that have not been enabled by the user.

The other data 1691 may additionally or alternatively include data indicating system usage history (e.g., specific to the user), such as if the user, that originated the natural language input, regularly invokes a particular skill system 125 or does so at particular times of day. The other data 1691 may additionally or alternatively include data indicating date, time, location, weather, type of device 110, user identifier, context, as well as other information. For example, the ranker component 1690 may consider when any particular skill system 125 is currently active with respect to the present user and/or device 110 (e.g., music being output by the skill system 125, a game being executed by the skill system 125, etc.).

The ranker component 1690 may output NLU results data 1685 including one or more NLU hypotheses. The NLU results data 1685 may include all or a portion of cross-recognizer n-best list data 1640, cross-recognizer n-best list data 1660, entity resolution 1670, ranker 1690, or from other components. For example the NLU results data 1685 may include an indication of an intent, an indication of a portion of the ASR output data 1405/text data that corresponds to an entity mention (e.g., a slot), an identifier of an entity mentioned (e.g., an indicator output by entity resolution component 1670), a user identifier corresponding to the entity, or other information. The NLU component 260 may send the NLU results data 1685 to the orchestrator component 230 which may in turn pass it to another component, for example a skill 290 such as a game skill.

As described above, the system 120 may perform speech processing using two different components (e.g., the ASR component 250 and the NLU component 260). One skilled in the art will appreciate that the system 120, in at least some embodiments, may implement a spoken language understanding (SLU) component that is configured to process audio data 211 to generate NLU results data 1685.

In some examples, the SLU component may be equivalent to the ASR component 250 and the NLU component 260. While the SLU component may be equivalent to a combination of the ASR component 250 and the NLU component 260, the SLU component may process audio data 211 and directly generate the NLU results data 1685, without an intermediate step of generating text data (as does the ASR component 250). As such, the SLU component may take audio data 211 representing speech and attempt to make a semantic interpretation of the speech. That is, the SLU component may determine a meaning associated with the speech and then implement that meaning. For example, the SLU component may interpret audio data 211 representing speech from the user 5 in order to derive a desired action. In some examples, the SLU component outputs NLU hypothesis data including a most likely NLU hypothesis, or multiple NLU hypotheses in the form of a lattice or an N-best list with individual NLU hypotheses corresponding to confidence scores or other scores (such as probability scores, etc.).

Figure 17:
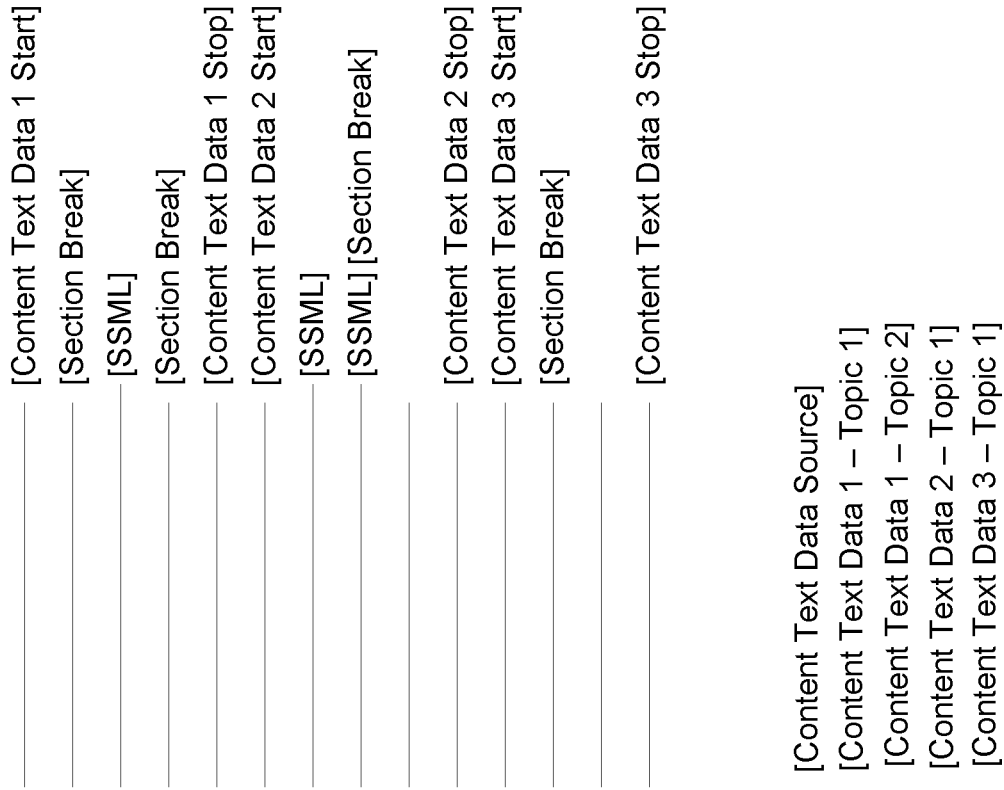
FIG. 17 illustrates a data framework that can be used to import content, according to embodiments of the present disclosure.

FIG. 17 illustrates a data framework that can be pre-established for a system to use with content sources such as textual representations of game instructions to ease the importing and integration of content with a speech-controlled system. A content source may provide the speech processing system with text data corresponding to one or more portions of content (e.g., one or more articles or sets of instructions, etc.). More than one portion of content may grouped into a library of content and a content source may provide multiple libraries of content. Metadata tags (e.g., [Content Text Data 1 Start], [Content Text Data 1 Stop], etc.) may delineate respective portions of content text data. Metadata data tags (e.g., [Section Break]) may indicate start and stop locations of sections of respective content text data. The text data may also be tagged with [SSML] tags indicating how certain words should be pronounced in TTS speech. The metadata tags may be line specific, word specific, or the like. The text data may additionally be tagged to indicate the content source, as well as tagged to indicate topics that, when spoken by a user, trigger selection of respective content text data.

Upon receiving text data from a content source, the system may associate the tagged section breaks, content text data starts/stops with pre-established executable commands/intents (e.g., "skip to next section", "skip to next article", etc.) so the content source does not need to create such associations. This results in text data and associated metadata provided by a content source being linked/associated to pre-established NLU commands/intents of the speech-processing system.

Figure 18:
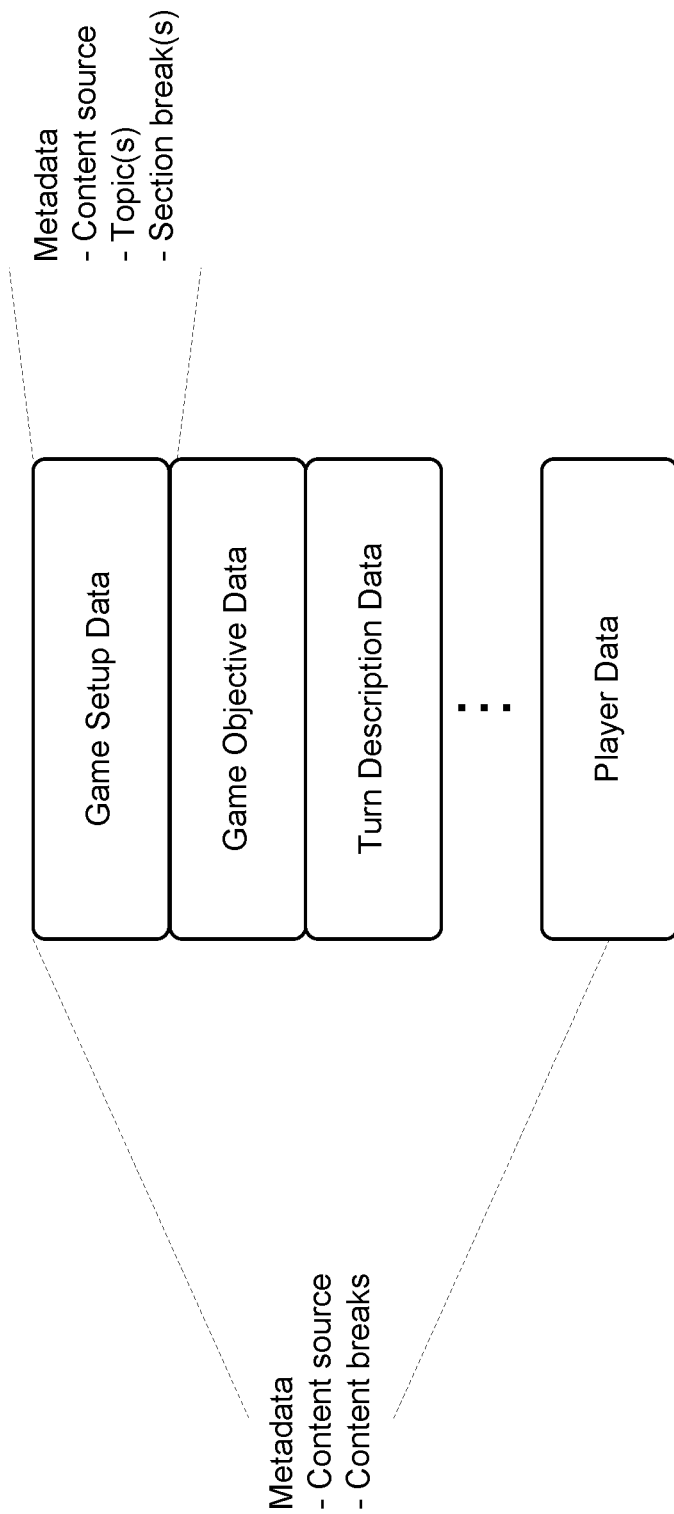
FIG. 18 illustrates received content text data and associated metadata according to embodiments of the present disclosure.

The system(s) 120 may receive text data specific to a single portion of content (e.g., game instructions) in one instance. Alternatively, the system(s) 120 may receive text data specific to a library or group of content (e.g., game instructions, text from a game board or one or more tokens, or other content about the game including articles and the like) in one instance. FIG. 18 illustrates received content text data and associated metadata. In the example shown in FIG. 18, the content text data has been delineated into Game Setup Data, Game Objective Data, Turn Description Data, and Player Data. Other possible content text data sections could include token data, randomizer data, conditions data (e.g., for ending the game), etc. The content text data may not include content break delineations, section break delineations, etc. The content text data may simply be lines of content text, and the metadata may wholly include content break data, section break data, etc. The format of the content text data may be informed by the metadata accompanying the content text data, business rules, etc. If text data specific to multiple portions of content is received, the metadata associated with all of the portions of content may include content source identifying information (e.g., indicating a content source from which the text data was received), as well as content breaks indicating the start and end points of portions of content in the received library.

Text data specific to a single portion of content may be associated with metadata including content source identifying information, one or more topic that may be used to recall the specific content text data, and one or more section breaks indicating the start and end points of sections of a specific portion of content.

Upon receiving content text data from device 110 or elsewhere, the system(s) 120 may associate the received content and metadata in a specific format. FIG. 19 illustrates stored and associated content data and metadata for easy recall in response to receiving a spoken command. As shown in FIG. 19, content items may be received from multiple content sources such as, for example, the game instructions and text on the game board. Each content source may be associated with a content source title (e.g., "Game Instructions" or "Game Board Text") so a user 5 may invoke the content source where desired by speaking the name which will then be recognized in ASR/NLU processing as referring to the particular content source. Each content source may also have a number of content items associated with each source. For example, the Game Instructions has four content items, each having its own section of content text data (e.g., Game Setup Data, Game Objective Data, and Player Data). Each content item may be associated with a tag useable by the NLU system (e.g., <content item>) which identifies the text data as corresponding to a content item. Content items relevant to a game could represent, for example, an initial game setup, a description of a token and its properties, details regarding a random output generator, etc.

Each content item may correspond to one or more topic labels which may be used to identify the content items by a user when speaking a command to receive the content item. For example, the Game Setup Data is associated with Setup such that if a user speaks the name of the topic (e.g., "Please describe game setup.") the system recognizes the Setup as corresponding to the Game Setup Data and can return the Game Setup Data to the user. Each topic may be associated with a tag useable by the NLU system (e.g., <topic>) which identifies the text of the topic name as corresponding to a topic. A single content item may also be associated with multiple topics (e.g., as illustrated in FIG. 19, Game Objective Data is associated both with both topics "Winning" and "Game End"). This allows a single content item to be retrieved using different topic names. In another example, a section on a particular token may be associated with one topic name of "<token name>" and another of "using <token type>."

Depending on system configuration the same topic description may be used for different content items across content sources. For example, topic text "castle" may refer to a section about the rook for the content source "Chess Pieces" but may refer to a section about castling for the content source "Moves." Thus, if a command is received asking for the system to return information about "castle," the NLU module may process information about the content source (e.g., "how do I castle?") to further determine which content item corresponds to the topic text.

The data may be stored in a format similar or identical to how a spoken command may be spoken. For example, the spoken command framework discussed herein may correspond to "<intent> <content source> about <topic>". As such, the system(s) 120 may store the content source data as associated with topic data, since those are portions of the spoken command framework. The system(s) 120 may also associate topic data with content text data to which it relates. Therefore, if a user says "how do I castle?", the system(s) 120 may determine the content source of "Moves", determine the topic "castling" that is associated with the content source "rook", and therefrom determine content text data associated with the topic.

Figure 20:
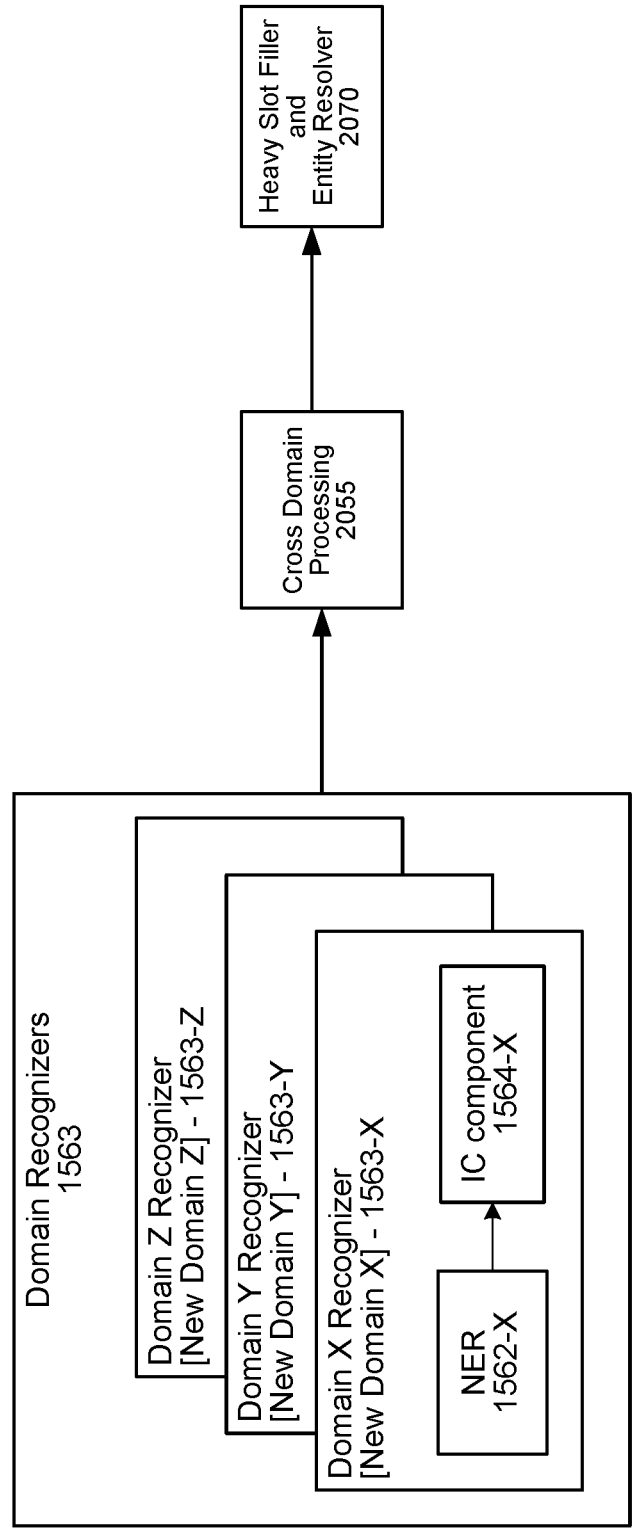
FIG. 20 illustrates the training of new domains specific to content source text data.

Once the speech processing system has content text data from a specific content source, the speech processing system can train particular components to recognize incoming commands that wish to receive or operate on the new incoming content. For example, the system may establish new domains specific to the content text data. This is illustrated in FIG. 20. In particular, the speech processing system can train recognizers 1563, NERs 1562, and IC components 1564, as well as cross domain processing components 2055 and heavy slot filler and entity resolvers 2070 with respect to particular content text data/content sources. For example, for a new content source X, the system may create a new domain X and train an NER 1562-X and/or IC component 1564-X that are configured to process incoming text (such as post ASR text) to recognize text such as content source name, topic label name, intent text, etc. The configured components may recognize such text and associate them with tags corresponding to the established framework (e.g., <intent>, <topic>, <content source>, or the like).

Figure 21:
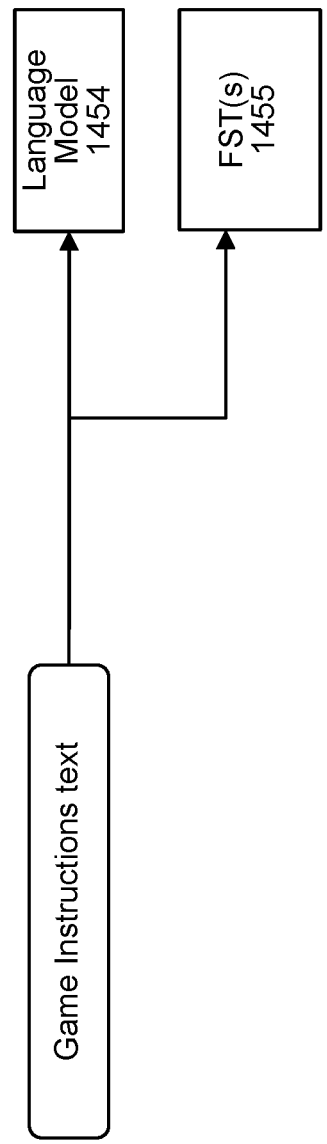
FIG. 21 illustrates a content source's labels may be associated with generalized and specific language model components.

FIG. 21 illustrates a content source's labels/text may be associated with generalized and specific language model components. As illustrated in FIG. 21, a language model component 1454/FST 1455 or other component may be configured to recognize a content source's label text (e.g., a name included in a content source for ASR purposes). For example, a language model component 1454/FST 1455 may be trained to recognize the names/descriptions of game specific operations or pieces or other words that may not otherwise be included in the language model. The language model component 1454/FST 1455 may also be trained on how users may interact with the game to understand the words in context to improve ASR processing. The training may be based on sample utterances received from a game developer and/or may be based on system generated text/sentence constructions, for example as a result of ingesting instructions/game data and constructing potential sentences on how the user may interact with the game, for example using NLG component 279 which may be used to simulate game play. Other information, such as metadata associated with the game information may be used to train the language model 1454/FST 1455 so that an ASR component 250 may properly recognize inputs specific to the game. For example, if the system determines that an input such as "rotarize the dragonmorpher" is a likely input related to a game (for example as resulting from the ingestion/processing of the game data), but that an ASR component 250 as currently configured may not properly recognize such an input if it was received, the system may train a language model 1455/FST 1455 to recognize the potential input so as to improve game play.

Figure 22:
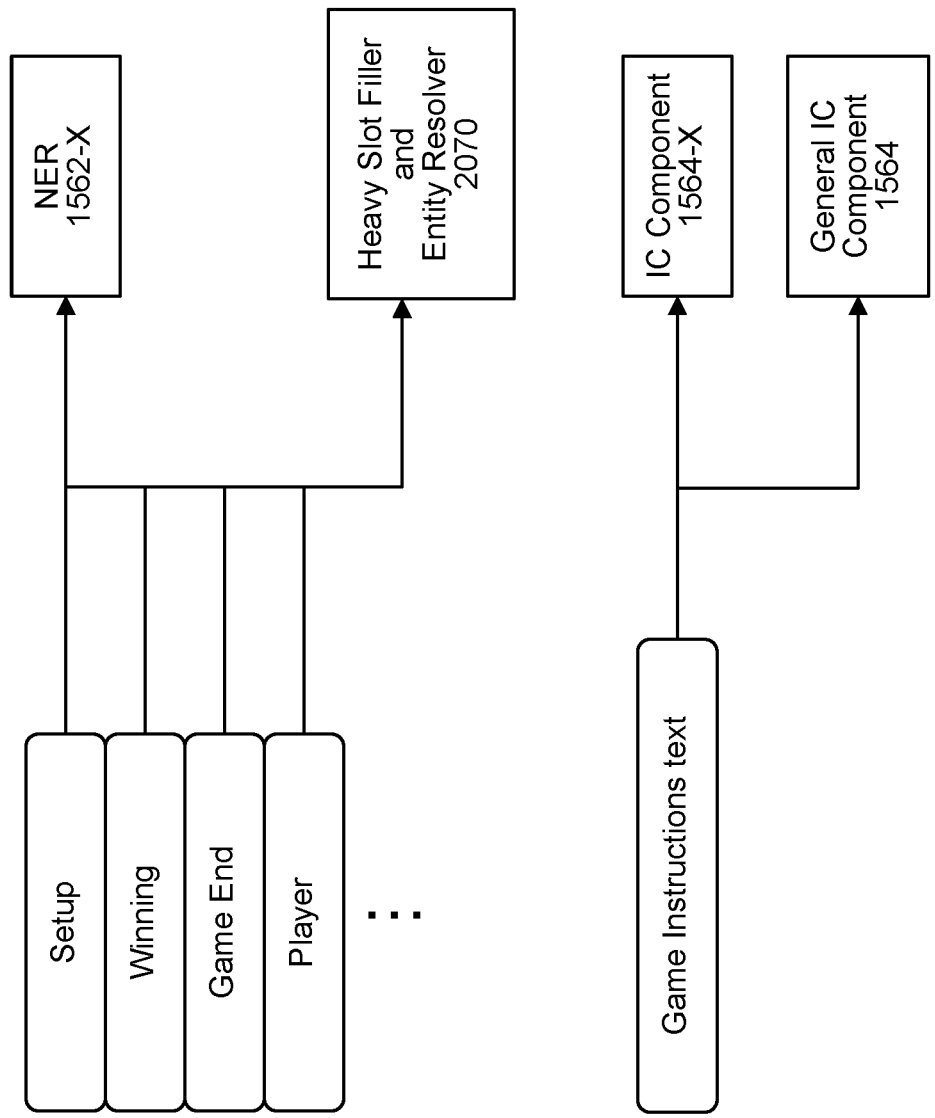
FIG. 22 illustrates a content source's labels may be associated with generalized and specific intent classification (IC) components and NER components.

FIG. 22 illustrates a content source's data may be associated with generalized and specific intent classification (IC) components and NER components. As illustrated in FIG. 22, a domain-specific IC components 1564 may be configured to recognize a content source's text (e.g., the name of a content source, game name, game piece label, game operation description, etc. for NLU recognition purposes). For example, an IC component 1564-X associated with a domain X may be trained to recognize the content source X label text; e.g., Game Instructions label text. Further, a content source's label text may be associated with a general IC component, such as 1564 which may be used with multiple domains. The IC components associated with specific domains and the general IC component 1564 may be trained using metadata. For example, metadata associated with the domain X may be used to train the IC component 1564-X to properly recognize content source X label text.

In addition, a content source's topic label text may be may be used to retain an NER component(s) associated with the content source. For example, an NER component 1562-X associated with a domain X may be trained to recognize the label text for topics associated with content source X (e.g., Setup, Winning, Game End, Player). Further, one or more content source's topic label text may be used to retain other NLU components, for example a generalized heavy slot filler and entity resolver 2070 that can determine tags and other NLU data to properly link text data to NLU data corresponding to the new content source(s).

For example, the framework described herein may be used by a game publisher to efficiently incorporate large amounts of game instruction text data into a speech processing system that would allow a user to verbally search and obtain content from the instructions. Moreover, the framework may be used to allow a user to verbally search the instructions, and, in some implementations, online data such as blogs and articles further describing game play, rules, and strategy. Thus, it should be appreciated that a user 5 may interact with various types of content from various sources using the same commands (e.g., skip, next section, etc.).

A game developer may generate an initial corpus of content based on game instructions, and possibly images of a game board and/or tokens. Alternatively or in addition, content text data can be pushed to the speech processing system by the content source and/or pulled by the speech processing system. The speech processing system may be configured to pull data from additional content sources on a periodic basis (e.g., hourly, daily, weekly, and the like).

Figure 23:
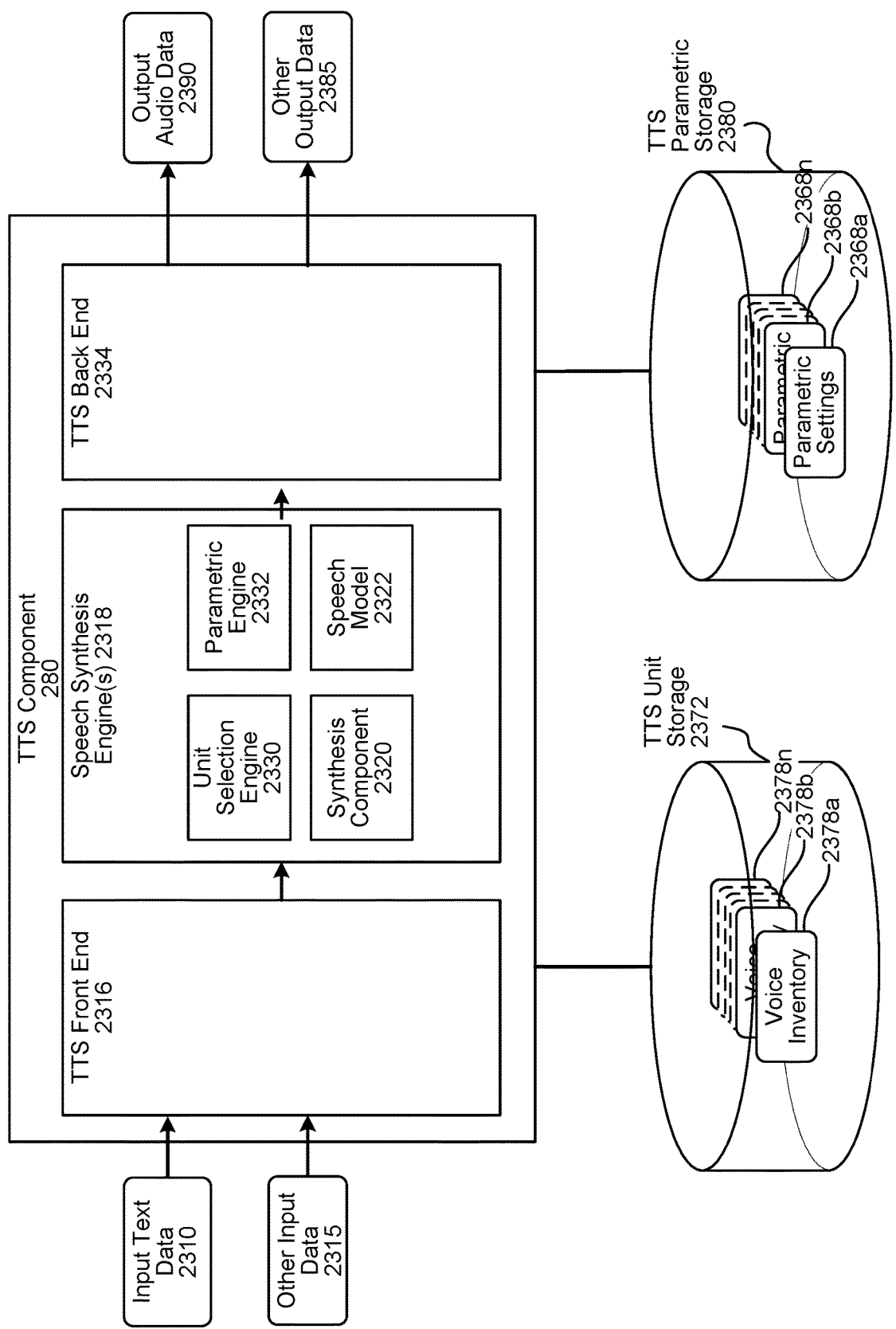
FIG. 23 is a conceptual diagram of text-to-speech components according to embodiments of the present disclosure.

Components of a system that may be used to perform unit selection, parametric TTS processing, and/or model-based audio synthesis are shown in FIG. 23. As shown in FIG. 23, the TTS component 280 may include a TTS front end 2316, a speech synthesis engine 2318, TTS unit storage 2372, TTS parametric storage 2380, and a TTS back end 2334. The TTS unit storage 2372 may include, among other things, voice inventories 2378a-288n that may include pre-recorded audio segments (called units) to be used by the unit selection engine 2330 when performing unit selection synthesis as described below. The TTS parametric storage 2380 may include, among other things, parametric settings 2368a-268n that may be used by the parametric synthesis engine 2332 when performing parametric synthesis as described below. A particular set of parametric settings 2368 may correspond to a particular voice profile (e.g., whispered speech, excited speech, etc.).

In various embodiments of the present disclosure, model-based synthesis of audio data may be performed using by a speech model 2322 and a TTS front end 2316. The TTS front end 2316 may be the same as front ends used in traditional unit selection or parametric systems. In other embodiments, some or all of the components of the TTS front end 2316 are based on other trained models. The present disclosure is not, however, limited to any particular type of TTS front end 2316. The speech model 2322 may be used to synthesize speech without requiring the TTS unit storage 2372 or the TTS parametric storage 2380, as described in greater detail below.

The TTS front end 2316 transforms input text data 2310 (from, for example, an application, user, device, or other text source) into a symbolic linguistic representation, which may include linguistic context features such as phoneme data, punctuation data, syllable-level features, word-level features, and/or emotion, speaker, accent, or other features for processing by the speech synthesis engine 2318. The syllable-level features may include syllable emphasis, syllable speech rate, syllable inflection, or other such syllable-level features; the word-level features may include word emphasis, word speech rate, word inflection, or other such word-level features. The emotion features may include data corresponding to an emotion associated with the input text data 2310, such as surprise, anger, or fear. The speaker features may include data corresponding to a type of speaker, such as sex, age, or profession. The accent features may include data corresponding to an accent associated with the speaker, such as Southern, Boston, English, French, or other such accent.

The TTS front end 2316 may also process other input data 2315, such as text tags or text metadata, that may indicate, for example, how specific words should be pronounced, for example by indicating the desired output speech quality in tags formatted according to the speech synthesis markup language (SSML) or in some other form. For example, a first text tag may be included with text marking the beginning of when text should be whispered (e.g., <begin whisper>) and a second tag may be included with text marking the end of when text should be whispered (e.g., <end whisper>). The tags may be included in the input text data 2310 and/or the text for a TTS request may be accompanied by separate metadata indicating what text should be whispered (or have some other indicated audio characteristic). The speech synthesis engine 2318 may compare the annotated phonetic units models and information stored in the TTS unit storage 2372 and/or TTS parametric storage 2380 for converting the input text into speech. The TTS front end 2316 and speech synthesis engine 2318 may include their own controller(s)/ processor(s) and memory or they may use the controller/ processor and memory of the server 120, device 110, or other device, for example. Similarly, the instructions for operating the TTS front end 2316 and speech synthesis engine 2318 may be located within the TTS component 280, within the memory and/or storage of the server 120, device 110, or within an external device.

Text data 2310 input into the TTS component 280 may be sent to the TTS front end 2316 for processing. The front-end may include components for performing text normalization, linguistic analysis, linguistic prosody generation, or other such components. During text normalization, the TTS front end 2316 may first process the text input and generate standard text, converting such things as numbers, abbreviations (such as Apt., St., etc.), symbols ($, %, etc.) into the equivalent of written out words.

During linguistic analysis, the TTS front end 2316 may analyze the language in the normalized text to generate a sequence of phonetic units corresponding to the input text. This process may be referred to as grapheme-to-phoneme conversion. Phonetic units include symbolic representations of sound units to be eventually combined and output by the system as speech. Various sound units may be used for dividing text for purposes of speech synthesis. The TTS component 280 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in the TTS unit storage 2372. The linguistic analysis performed by the TTS front end 2316 may also identify different grammatical components such as prefixes, suffixes, phrases, punctuation, syntactic boundaries, or the like. Such grammatical components may be used by the TTS component 280 to craft a natural-sounding audio waveform output. The language dictionary may also include letter-to-sound rules and other tools that may be used to pronounce previously unidentified words or letter combinations that may be encountered by the TTS component 280. Generally, the more information included in the language dictionary, the higher quality the speech output.

Based on the linguistic analysis the TTS front end 2316 may then perform linguistic prosody generation where the phonetic units are annotated with desired prosodic characteristics, also called acoustic features, which indicate how the desired phonetic units are to be pronounced in the eventual output speech. During this stage the TTS front end 2316 may consider and incorporate any prosodic annotations that accompanied the text input to the TTS component 280. Such acoustic features may include syllable-level features, word-level features, emotion, speaker, accent, language, pitch, energy, duration, and the like. Application of acoustic features may be based on prosodic models available to the TTS component 280. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, prosodic model with more information may result in higher quality speech output than prosodic models with less information.

Further, a prosodic model and/or phonetic units may be used to indicate particular speech qualities of the speech to be synthesized, where those speech qualities may match the speech qualities of input speech (for example, the phonetic units may indicate prosodic characteristics to make the ultimately synthesized speech sound like a whisper based on the input speech being whispered).

The output of the TTS front end 2316, which may be referred to as a symbolic linguistic representation, may include a sequence of phonetic units annotated with prosodic characteristics. This symbolic linguistic representation may be sent to the speech synthesis engine 2318, which may also be known as a synthesizer, for conversion into an audio waveform of speech for output to an audio output device and eventually to a user. The speech synthesis engine 2318 may be configured to convert the input text into high-quality natural-sounding speech in an efficient manner. Such high-quality speech may be configured to sound as much like a human speaker as possible, or may be configured to be understandable to a listener without attempts to mimic a precise human voice.

The speech synthesis engine 2318 may perform speech synthesis using one or more different methods. In one method of synthesis called unit selection, described further below, a unit selection engine 2330 matches the symbolic linguistic representation created by the TTS front end 2316 against a database of recorded speech, such as a database (e.g., TTS unit storage 2372) storing information regarding one or more voice corpuses (e.g., voice inventories 2378*a*-*n*). Each voice inventory may correspond to various segments of audio that was recorded by a speaking human, such as a voice actor, where the segments are stored in an individual inventory 2378 as acoustic units (e.g., phonemes, diphones, etc.). Each stored unit of audio may also be associated with an index listing various acoustic properties or other descriptive information about the unit. Each unit includes an audio waveform corresponding with a phonetic unit, such as a short .wav file of the specific sound, along with a description of various features associated with the audio waveform. For example, an index entry for a particular unit may include information such as a particular unit's pitch, energy, duration, harmonics, center frequency, where the phonetic unit appears in a word, sentence, or phrase, the neighboring phonetic units, or the like. The unit selection engine 2330 may then use the information about each unit to select units to be joined together to form the speech output.

The unit selection engine 2330 matches the symbolic linguistic representation against information about the spoken audio units in the database. The unit database may include multiple examples of phonetic units to provide the system with many different options for concatenating units into speech. Matching units which are determined to have the desired acoustic qualities to create the desired output audio are selected and concatenated together (for example by a synthesis component 2320) to form output audio data 2390 representing synthesized speech. Using all the information in the unit database, a unit selection engine 2330 may match units to the input text to select units that can form a natural sounding waveform. One benefit of unit selection is that, depending on the size of the database, a natural sounding speech output may be generated. As described above, the larger the unit database of the voice corpus, the more likely the system will be able to construct natural sounding speech.

In another method of synthesis—called parametric synthesis—parameters such as frequency, volume, noise, are varied by a parametric synthesis engine 2332, digital signal processor or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Using parametric synthesis, a computing system (for example, a synthesis component 2320) can generate audio waveforms having the desired acoustic properties. Parametric synthesis may include the ability to be accurate at high processing speeds, as well as the ability to process speech without large databases associated with unit selection, but also may produce an output speech quality that may not match that of unit selection. Unit selection and parametric techniques may be performed individually or combined together and/or combined with other synthesis techniques to produce speech audio output.

The TTS component 280 may be configured to perform TTS processing in multiple languages. For each language, the TTS component 280 may include specially configured data, instructions and/or components to synthesize speech in the desired language(s). To improve performance, the TTS component 280 may revise/update the contents of the TTS parametric storage 2380 based on feedback of the results of TTS processing, thus enabling the TTS component 280 to improve speech recognition.

In some implementations, the TTS component 280 may be configured to generate speech particular to a game. For example, the TTS component 280 may include a voice inventory 2378 and/or parametric settings 2368 specific to gaming, or supplemental voice data particular to gaming for inclusion in an existing voice inventory 2378 and/or parametric settings 2368. The voice and/or parameter data can include information for dialogs related to game ingestion, such as reporting flaws and requesting additional information, as well as game play, such as describing a game setup and answering questions based on natural langue rule data. In some implementations, the TTS component 280 may be configured to for generating speech for a particular game. For example, the game language data 490 may include voice and/or parameter data specific to the game, or supplemental voice data particular to the game for inclusion in an existing voice inventory 2378 and/or parametric settings 2368. For example, the TTS component 280 may be configured to output speech in one voice for the game master/question answering, another voice for one character of the game, still another voice for another character of the game, etc. Similarly the TTS component 280 (and/or NLG component 279) may be configured to include words and phrases unique to the game or particular voice profile (game master, character, etc.), or otherwise unusual in the language more broadly, such as names for tokens, characters, places, actions, etc.

The TTS component 280 may be customized for an individual user based on his/her individualized desired speech output. In particular, the speech unit stored in a unit database may be taken from input audio data of the user speaking. For example, to create the customized speech output of the system, the system may be configured with multiple voice inventories 2378a-2238n, where each unit database is configured with a different "voice" to match desired speech qualities. Such voice inventories may also be linked to user accounts. The voice selected by the TTS component 280 to synthesize the speech. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterances may be spoken by an individual (such as a voice actor) and recorded by the system. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus may match the respective desired speech quality. The customized voice inventory 2378 may then be used during runtime to perform unit selection to synthesize speech having a speech quality corresponding to the input speech quality.

Additionally, parametric synthesis may be used to synthesize speech with the desired speech quality. For parametric synthesis, parametric features may be configured that match the desired speech quality. If simulated excited speech was desired, parametric features may indicate an increased speech rate and/or pitch for the resulting speech. Many other examples are possible. The desired parametric features for particular speech qualities may be stored in a "voice" profile (e.g., parametric settings 2368) and used for speech synthesis when the specific speech quality is desired. Customized voices may be created based on multiple desired speech qualities combined (for unit selection, parametric synthesis or neural network synthesis). For example, one voice may be "shouted" while another voice may be "shouted and emphasized." Many such combinations are possible.

Unit selection speech synthesis may be performed as follows. Unit selection includes a two-step process. First a unit selection engine 2330 determines what speech units to use and then it combines them so that the particular combined units match the desired phonemes and acoustic features and create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well an individual given speech unit matches the features of a desired speech output (e.g., pitch, prosody, etc.). A join cost represents how well a particular speech unit matches an adjacent speech unit (e.g., a speech unit appearing directly before or directly after the particular speech unit) for purposes of concatenating the speech units together in the eventual synthesized speech. The overall cost function is a combination of target cost, join cost, and other costs that may be determined by the unit selection engine 2330. As part of unit selection, the unit selection engine 2330 chooses the speech unit with the lowest overall combined cost. For example, a speech unit with a very low target cost may not necessarily be selected if its join cost is high.

The system may be configured with one or more voice corpuses for unit selection. Each voice corpus may include a speech unit database. The speech unit database may be stored in TTS unit storage 2372 or in another storage component. For example, different unit selection databases may be stored in TTS unit storage 2372. Each speech unit database (e.g., voice inventory) includes recorded speech utterances with the utterances' corresponding text aligned to the utterances. A speech unit database may include many hours of recorded speech (in the form of audio waveforms, feature vectors, or other formats), which may occupy a significant amount of storage. The unit samples in the speech unit database may be classified in a variety of ways including by phonetic unit (phoneme, diphone, word, etc.), linguistic prosodic label, acoustic feature sequence, speaker identity, etc. The sample utterances may be used to create mathematical models corresponding to desired audio output for particular speech units. When matching a symbolic linguistic representation the speech synthesis engine 2318 may attempt to select a unit in the speech unit database that most closely matches the input text (including both phonetic units and prosodic annotations). Generally the larger the voice corpus/speech unit database the better the speech synthesis may be achieved by virtue of the greater number of unit samples that may be selected to form the precise desired speech output.

Vocoder-based parametric speech synthesis may be performed as follows. A TTS component 280 may include an acoustic model, or other models, which may convert a symbolic linguistic representation into a synthetic acoustic waveform of the text input based on audio signal manipulation. The acoustic model includes rules which may be used by the parametric synthesis engine 2332 to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation from the TTS front end 2316.

The parametric synthesis engine 2332 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed by the speech synthesis engine 2318, the state may change or stay the same, based on the processing of the new text. For example, the pronunciation of a previously processed word might change based on later processed words. A Viterbi algorithm may be used to find the most likely sequence of states based on the processed text. The HMMs may generate speech in parameterized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, WORLD vocoder, HNM (harmonic plus noise) based vocoders, CELP (code-excited linear prediction) vocoders, GlottHMM vocoders, HSM (harmonic/stochastic model) vocoders, or others.

In addition to calculating potential states for one audio waveform as a potential match to a phonetic unit, the parametric synthesis engine 2332 may also calculate potential states for other potential audio outputs (such as various ways of pronouncing a particular phoneme or diphone) as potential acoustic matches for the acoustic unit. In this manner multiple states and state transition probabilities may be calculated.

The probable states and probable state transitions calculated by the parametric synthesis engine 2332 may lead to a number of potential audio output sequences. Based on the acoustic model and other potential models, the potential audio output sequences may be scored according to a confidence level of the parametric synthesis engine 2332. The highest scoring audio output sequence, including a stream of parameters to be synthesized, may be chosen and digital signal processing may be performed by a vocoder or similar component to create an audio output including synthesized speech waveforms corresponding to the parameters of the highest scoring audio output sequence and, if the proper sequence was selected, also corresponding to the input text. The different parametric settings 2368, which may represent acoustic settings matching a particular parametric "voice", may be used by the synthesis component 2320 to ultimately create the output audio data 2390.

When performing unit selection, after a unit is selected by the unit selection engine 2330, the audio data corresponding to the unit may be passed to the synthesis component 2320. The synthesis component 2320 may then process the audio data of the unit to create modified audio data where the modified audio data reflects a desired audio quality. The synthesis component 2320 may store a variety of operations that can convert unit audio data into modified audio data where different operations may be performed based on the desired audio effect (e.g., whispering, shouting, etc.).

As an example, input text may be received along with metadata, such as SSML tags, indicating that a selected portion of the input text should be whispered when output by the TTS component 280. For each unit that corresponds to the selected portion, the synthesis component 2320 may process the audio data for that unit to create a modified unit audio data. The modified unit audio data may then be concatenated to form the output audio data 2390. The modified unit audio data may also be concatenated with non-modified audio data depending on when the desired whispered speech starts and/or ends. While the modified audio data may be sufficient to imbue the output audio data with the desired audio qualities, other factors may also impact the ultimate output of audio such as playback speed, background effects, or the like, that may be outside the control of the TTS component 280. In that case, other output data 2385 may be output along with the output audio data 2390 so that an ultimate playback device (e.g., device 110) receives instructions for playback that can assist in creating the desired output audio. Thus, the other output data 2385 may include instructions or other data indicating playback device settings (such as volume, playback rate, etc.) or other data indicating how output audio data including synthesized speech should be output. For example, for whispered speech, the output audio data 2390 may include other output data 2385 that may include a prosody tag or other indicator that instructs the device 110 to slow down the playback of the output audio data 2390, thus making the ultimate audio sound more like whispered speech, which is typically slower than normal speech. In another example, the other output data 2385 may include a volume tag that instructs the device 110 to output the speech at a volume level less than a current volume setting of the device 110, thus improving the quiet whisper effect.

The device 110 and/or the system(s) 120 may include a user recognition component 295 that recognizes one or more users using a variety of data. The system 120 can use user recognition data to, based on who may be detected requesting a game, load customized rules such as "house" rules, set handicaps and/or difficulty settings, and/or load games in progress for a player to resume. Other game settings or system-wide settings may be associated with user recognition data, such as a language used, a preferred avatar, unlocked levels, in-game player inventories, etc. In some implementations, the user recognition data may be used for associating a user with a license (e.g., a paid subscription) to certain games or certain supplemental features of games. As illustrated in FIG. 24, the user recognition component 295 may include one or more subcomponents including a computer vision component 2408, an audio component 2410, a biometric component 2412, a radio frequency (RF) component 2414, a machine learning (ML) component 2416, and a recognition confidence component 2418. In some instances, the user recognition component 295 may monitor data and determinations from one or more subcomponents to determine an identity of one or more users associated with data input to the device 110 and/or the system(s) 120. The user recognition component 295 may output user recognition data 2495, which may include a user identifier associated with a user the user recognition component 295 determines originated data input to the device 110 and/or the system(s) 120. The user recognition data 2495 may be used to inform processes performed by various components of the device 110 and/or the system(s) 120.

The computer vision component 2408 may receive data from one or more sensors capable of providing images (e.g., cameras) or sensors indicating motion (e.g., motion sensors). The computer vision component 2408 can perform facial recognition or image analysis to determine an identity of a user and to associate that identity with a user profile associated with the user. In some instances, when a user is facing a camera, the computer vision component 2408 may perform facial recognition and identify the user with a high degree of confidence. In other instances, the computer vision component 2408 may have a low degree of confidence of an identity of a user, and the user recognition component 295 may utilize determinations from additional components to determine an identity of a user. The computer vision component 2408 can be used in conjunction with other components to determine an identity of a user. For example, the user recognition component 295 may use data from the computer vision component 2408 with data from the audio component 2410 to identify what user's face appears to be speaking at the same time audio is captured by a device 110 the user is facing for purposes of identifying a user who spoke an input to the device 110 and/or the system(s) 120.

The overall system of the present disclosure may include biometric sensors that transmit data to the biometric component 2412. For example, the biometric component 2412 may receive data corresponding to fingerprints, iris or retina scans, thermal scans, weights of users, a size of a user, pressure (e.g., within floor sensors), etc., and may determine a biometric profile corresponding to a user. The biometric component 2412 may distinguish between a user and sound from a television, for example. Thus, the biometric component 2412 may incorporate biometric information into a confidence level for determining an identity of a user. Biometric information output by the biometric component 2412 can be associated with specific user profile data such that the biometric information uniquely identifies a user profile of a user.

The radio frequency (RF) component 2414 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 2414 the strength of the signal (e.g., as a received signal strength indication (RSSI)). The RF component 2414 may use the RSSI to determine an identity of a user (with an associated confidence level). In some instances, the RF component 2414 may determine that a received RF signal is associated with a mobile device that is associated with a particular user identifier.

In some instances, a personal device (such as a phone, tablet, wearable or other device) may include some RF or other detection processing capabilities so that a user who speaks an input may scan, tap, or otherwise acknowledge his/her personal device to the device 110. In this manner, the user may "register" with the system 100 for purposes of the system 100 determining who spoke a particular input. Such a registration may occur prior to, during, or after speaking of an input.

The ML component 2416 may track the behavior of various users as a factor in determining a confidence level of the identity of the user. By way of example, a user may adhere to a regular schedule such that the user is at a first location during the day (e.g., at work or at school). In this example, the ML component 2416 would factor in past behavior and/or trends in determining the identity of the user that provided input to the device 110 and/or the system(s) 120. Thus, the ML component 2416 may use historical data and/or usage patterns over time to increase or decrease a confidence level of an identity of a user.

In at least some instances, the recognition confidence component 2418 receives determinations from the various components 2408, 2410, 2412, 2414, and 2416, and may determine a final confidence level associated with the identity of a user. In some instances, the confidence level may determine whether an action is performed in response to a user input. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 2495.

The audio component 2410 may receive data from one or more sensors capable of providing an audio signal (e.g., one or more microphones) to facilitate recognition of a user. The audio component 2410 may perform audio recognition on an audio signal to determine an identity of the user and associated user identifier. In some instances, aspects of device 110 and/or the system(s) 120 may be configured at a computing device (e.g., a local server). Thus, in some instances, the audio component 2410 operating on a computing device may analyze all sound to facilitate recognition of a user. In some instances, the audio component 2410 may perform voice recognition to determine an identity of a user.

The audio component 2410 may also perform user identification based on audio data 211 input into the device 110 and/or the system(s) 120 for speech processing. The audio component 2410 may determine scores indicating whether speech in the audio data 211 originated from particular users. For example, a first score may indicate a likelihood that speech in the audio data 211 originated from a first user associated with a first user identifier, a second score may indicate a likelihood that speech in the audio data 211 originated from a second user associated with a second user identifier, etc. The audio component 2410 may perform user recognition by comparing speech characteristics represented in the audio data 211 to stored speech characteristics of users (e.g., stored voice profiles associated with the device 110 that captured the spoken user input).

Figure 25:
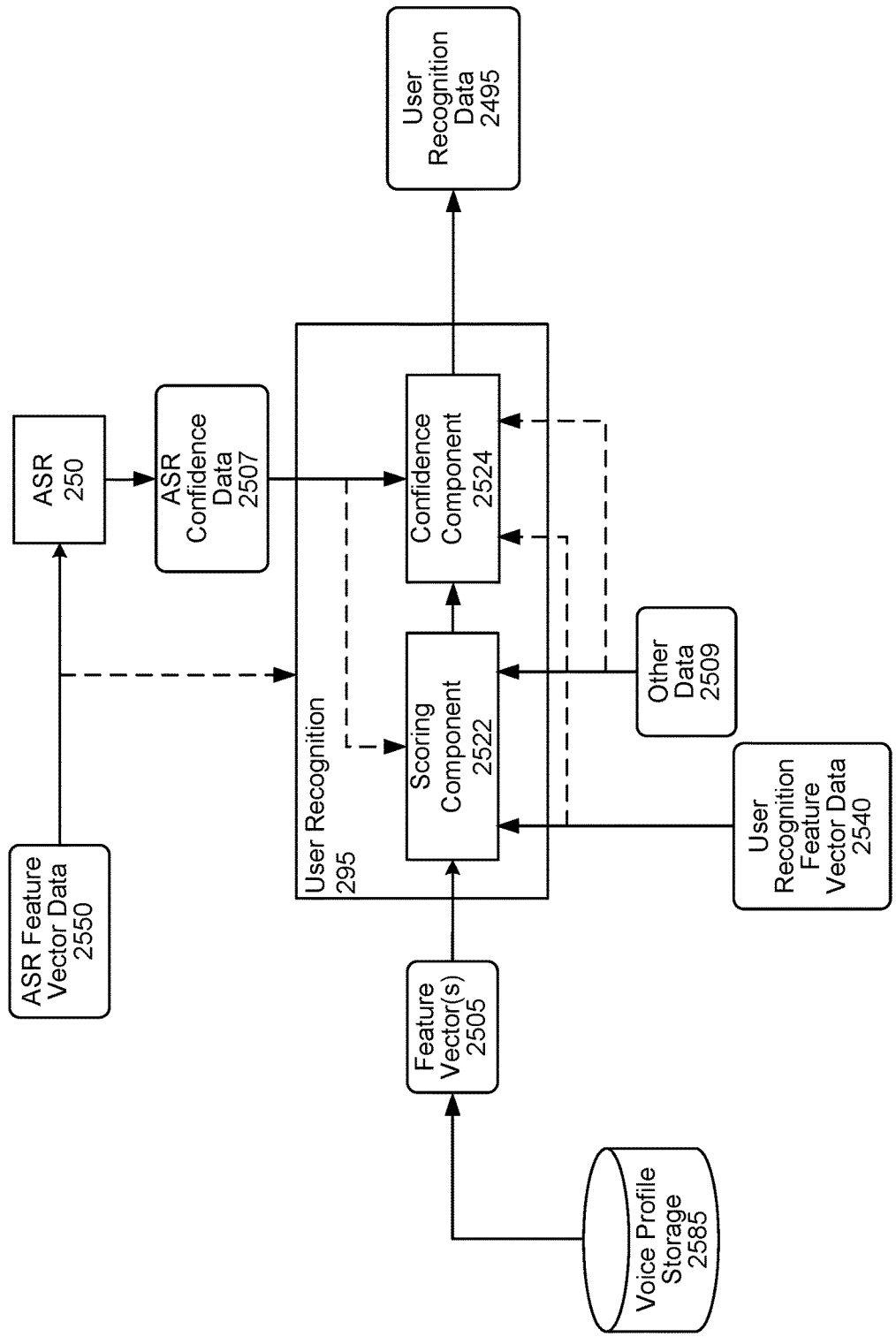
FIG. 25 is a system flow diagram illustrating user recognition according to embodiments of the present disclosure.

FIG. 25 illustrates user recognition processing as may be performed by the user recognition component 295. The ASR component 250 performs ASR processing on ASR feature vector data 2550. ASR confidence data 2507 may be passed to the user recognition component 295.

The user recognition component 295 performs user recognition using various data including the user recognition feature vector data 2540, feature vectors 2505 representing voice profiles of users of the system 100, the ASR confidence data 2507, and other data 2509. The user recognition component 295 may output the user recognition data 2495, which reflects a certain confidence that the user input was spoken by one or more particular users. The user recognition data 2495 may include one or more user identifiers (e.g., corresponding to one or more voice profiles). Each user identifier in the user recognition data 2495 may be associated with a respective confidence value, representing a likelihood that the user input corresponds to the user identifier. A confidence value may be a numeric or binned value.

The feature vector(s) 2505 input to the user recognition component 295 may correspond to one or more voice profiles. The user recognition component 295 may use the feature vector(s) 2505 to compare against the user recognition feature vector data 2540, representing the present user input, to determine whether the user recognition feature vector data 2540 corresponds to one or more of the feature vectors 2505 of the voice profiles. Each feature vector 2505 may be the same size as the user recognition feature vector data 2540.

To perform user recognition, the user recognition component 295 may determine the device 110 from which the audio data 211 originated. For example, the audio data 211 may be associated with metadata including a device identifier representing the device 110. The device 110, the system(s) 120, or other device(s) may generate the metadata. The system 100 may determine a group profile identifier associated with the device identifier, may determine user identifiers associated with the group profile identifier, and may include the group profile identifier and/or the user identifiers in the metadata. The system 100 may associate the metadata with the user recognition feature vector data 2540 produced from the audio data 211. The user recognition component 295 may send a signal to voice profile storage 2585, with the signal requesting only audio data and/or feature vectors 2505 (depending on whether audio data and/or corresponding feature vectors are stored) associated with the device identifier, the group profile identifier, and/or the user identifiers represented in the metadata. This limits the universe of possible feature vectors 2505 the user recognition component 295 considers at runtime and thus decreases the amount of time to perform user recognition processing by decreasing the amount of feature vectors 2505 needed to be processed. Alternatively, the user recognition component 295 may access all (or some other subset of) the audio data and/or feature vectors 2505 available to the user recognition component 295. However, accessing all audio data and/or feature vectors 2505 will likely increase the amount of time needed to perform user recognition processing based on the magnitude of audio data and/or feature vectors 2505 to be processed.

If the user recognition component 295 receives audio data from the voice profile storage 2585, the user recognition component 295 may generate one or more feature vectors 2505 corresponding to the received audio data.

The user recognition component 295 may attempt to identify the user that spoke the speech represented in the audio data 211 by comparing the user recognition feature vector data 2540 to the feature vector(s) 2505. The user recognition component 295 may include a scoring component 2522 that determines respective scores indicating whether the user input (represented by the user recognition feature vector data 2540) was spoken by one or more particular users (represented by the feature vector(s) 2505). The user recognition component 295 may also include a confidence component 2524 that determines an overall accuracy of user recognition processing (such as those of the scoring component 2522) and/or an individual confidence value with respect to each user potentially identified by the scoring component 2522. The output from the scoring component 2522 may include a different confidence value for each received feature vector 2505. For example, the output may include a first confidence value for a first feature vector 2505*a* (representing a first voice profile), a second confidence value for a second feature vector 2505*b* (representing a second voice profile), etc. Although illustrated as two separate components, the scoring component 2522 and the confidence component 2524 may be combined into a single component or may be separated into more than two components.

The scoring component 2522 and the confidence component 2524 may implement one or more trained machine learning models (such as neural networks, classifiers, etc.) as known in the art. For example, the scoring component 2522 may use probabilistic linear discriminant analysis (PLDA) techniques. PLDA scoring determines how likely it is that the user recognition feature vector data 2540 corresponds to a particular feature vector 2505. The PLDA scoring may generate a confidence value for each feature vector 2505 considered and may output a list of confidence values associated with respective user identifiers. The scoring component 2522 may also use other techniques, such as GMMs, generative Bayesian models, or the like, to determine confidence values.

The confidence component 2524 may input various data including information about the ASR confidence data 2507, speech length (e.g., number of frames or other measured length of the user input), audio condition/quality data (such as signal-to-interference data or other metric data), fingerprint data, image data, or other factors to consider how confident the user recognition component 295 is with regard to the confidence values linking users to the user input. The confidence component 2524 may also consider the confidence values and associated identifiers output by the scoring component 2522. For example, the confidence component 2524 may determine that a lower ASR confidence 2507, or poor audio quality, or other factors, may result in a lower confidence of the user recognition component 295. Whereas a higher ASR confidence 2507, or better audio quality, or other factors, may result in a higher confidence of the user recognition component 295. Precise determination of the confidence may depend on configuration and training of the confidence component 2524 and the model(s) implemented thereby. The confidence component 2524 may operate using a number of different machine learning models/techniques such as GMM, neural networks, etc. For example, the confidence component 2524 may be a classifier configured to map a score output by the scoring component 2522 to a confidence value.

The user recognition component 295 may output user recognition data 2495 specific to a one or more user identifiers. For example, the user recognition component 295 may output user recognition data 2495 with respect to each received feature vector 2505. The user recognition data 2495 may include numeric confidence values (e.g., 0.0-1.0, 0-1000, or whatever scale the system is configured to operate). Thus, the user recognition data 2495 may output an n-best list of potential users with numeric confidence values (e.g., user identifier 123—0.2, user identifier 234—0.8). Alternatively or in addition, the user recognition data 2495 may include binned confidence values. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." The user recognition component 295 may output an n-best list of user identifiers with binned confidence values (e.g., user identifier 123—low, user identifier 234—high). Combined binned and numeric confidence value outputs are also possible. Rather than a list of identifiers and their respective confidence values, the user recognition data 2495 may only include information related to the top scoring identifier as determined by the user recognition component 295. The user recognition component 295 may also output an overall confidence value that the individual confidence values are correct, where the overall confidence value indicates how confident the user recognition component 295 is in the output results. The confidence component 2524 may determine the overall confidence value.

The confidence component 2524 may determine differences between individual confidence values when determining the user recognition data 2495. For example, if a difference between a first confidence value and a second confidence value is large, and the first confidence value is above a threshold confidence value, then the user recognition component 295 is able to recognize a first user (associated with the feature vector 2505 associated with the first confidence value) as the user that spoke the user input with a higher confidence than if the difference between the confidence values were smaller.

The user recognition component 295 may perform thresholding to avoid incorrect user recognition data 2495 being output. For example, the user recognition component 295 may compare a confidence value output by the confidence component 2524 to a threshold confidence value. If the confidence value does not satisfy (e.g., does not meet or exceed) the threshold confidence value, the user recognition component 295 may not output user recognition data 2495, or may only include in that data 2495 an indicator that a user that spoke the user input could not be recognized. Further, the user recognition component 295 may not output user recognition data 2495 until enough user recognition feature vector data 2540 is accumulated and processed to verify a user above a threshold confidence value. Thus, the user recognition component 295 may wait until a sufficient threshold quantity of audio data of the user input has been processed before outputting user recognition data 2495. The quantity of received audio data may also be considered by the confidence component 2524.

The user recognition component 295 may be defaulted to output binned (e.g., low, medium, high) user recognition confidence values. However, such may be problematic in certain situations. For example, if the user recognition component 295 computes a single binned confidence value for multiple feature vectors 2505, the system may not be able to determine which particular user originated the user input. In this situation, the user recognition component 295 may override its default setting and output numeric confidence values. This enables the system to determine a user, associated with the highest numeric confidence value, originated the user input.

The user recognition component 295 may use other data 2509 to inform user recognition processing. A trained model(s) or other component of the user recognition component 295 may be trained to take other data 2509 as an input feature when performing user recognition processing. Other data 2509 may include a variety of data types depending on system configuration and may be made available from other sensors, devices, or storage. The other data 2509 may include a time of day at which the audio data 211 was generated by the device 110 or received from the device 110, a day of a week in which the audio data audio data 211 was generated by the device 110 or received from the device 110, etc.

The other data 2509 may include image data or video data. For example, facial recognition may be performed on image data or video data received from the device 110 from which the audio data 211 was received (or another device). Facial recognition may be performed by the user recognition component 295. The output of facial recognition processing may be used by the user recognition component 295. That is, facial recognition output data may be used in conjunction with the comparison of the user recognition feature vector data 2540 and one or more feature vectors 2505 to perform more accurate user recognition processing.

The other data 2509 may include location data of the device 110. The location data may be specific to a building within which the device 110 is located. For example, if the device 110 is located in user A's bedroom, such location may increase a user recognition confidence value associated with user A and/or decrease a user recognition confidence value associated with user B.

The other data 2509 may include data indicating a type of the device 110. Different types of devices may include, for example, a smart watch, a smart phone, a tablet, and a vehicle. The type of the device 110 may be indicated in a profile associated with the device 110. For example, if the device 110 from which the audio data 211 was received is a smart watch or vehicle belonging to a user A, the fact that the device 110 belongs to user A may increase a user recognition confidence value associated with user A and/or decrease a user recognition confidence value associated with user B.

The other data 2509 may include geographic coordinate data associated with the device 110. For example, a group profile associated with a vehicle may indicate multiple users (e.g., user A and user B). The vehicle may include a global positioning system (GPS) indicating latitude and longitude coordinates of the vehicle when the vehicle generated the audio data 211. As such, if the vehicle is located at a coordinate corresponding to a work location/building of user A, such may increase a user recognition confidence value associated with user A and/or decrease user recognition confidence values of all other users indicated in a group profile associated with the vehicle. A profile associated with the device 110 may indicate global coordinates and associated locations (e.g., work, home, etc.). One or more user profiles may also or alternatively indicate the global coordinates.

The other data 2509 may include data representing activity of a particular user that may be useful in performing user recognition processing. For example, a user may have recently entered a code to disable a home security alarm. A device 110, represented in a group profile associated with the home, may have generated the audio data 211. The other data 2509 may reflect signals from the home security alarm about the disabling user, time of disabling, etc. If a mobile device (such as a smart phone, Tile, dongle, or other device) known to be associated with a particular user is detected proximate to (for example physically close to, connected to the same WiFi network as, or otherwise nearby) the device 110, this may be reflected in the other data 2509 and considered by the user recognition component 295.

Depending on system configuration, the other data 2509 may be configured to be included in the user recognition feature vector data 2540 so that all the data relating to the user input to be processed by the scoring component 2522 may be included in a single feature vector. Alternatively, the other data 2509 may be reflected in one or more different data structures to be processed by the scoring component 2522.

Figure 26:
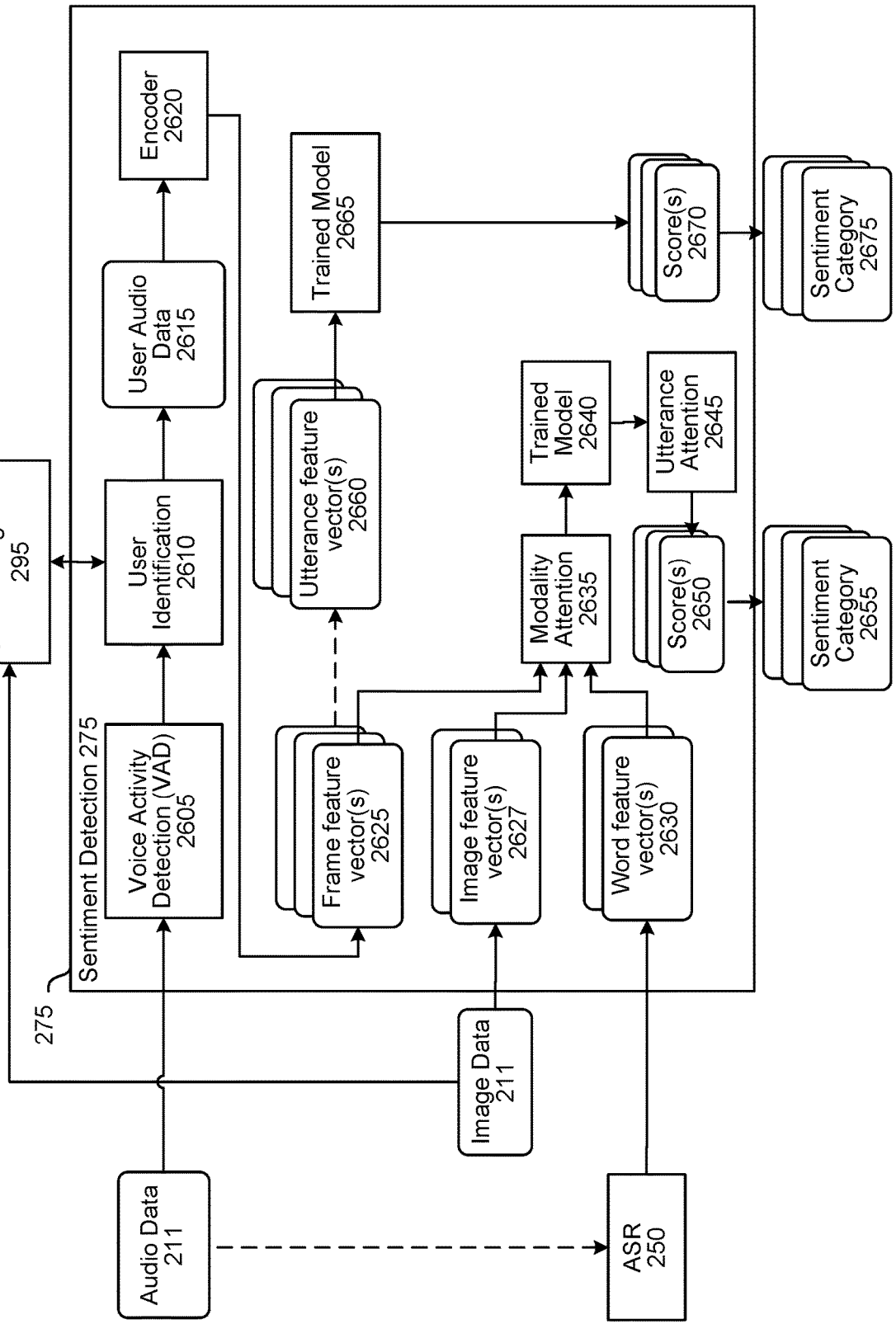
FIG. 26 is a conceptual diagram illustrating a sentiment detection component according to embodiments of the present disclosure.

FIG. 26 is a conceptual diagram illustrating sentiment detection component 275 according to embodiments of the present disclosure. The sentiment detection component 275 may determine a user sentiment based on audio data 211, image data 211, and other data. Although certain configurations/operations of the sentiment detection component 275 are illustrated in FIG. 26 and described herein, other techniques/configurations of sentiment detection may be used depending on system configuration. The system 120 may use the sentiment data to, for example, wish a congratulation or compliment to a player of a game who exhibits a positive sentiment, or offer suggestions to a player exhibiting a negative sentiment.

The sentiment detection component 275 may include a voice activity detection (VAD) component 2605, a user identification component 2610, an encoder component 2620, a modality attention component 2635, a trained model 2640, an utterance attention component 2645, and a trained model component 2665. The audio data 211 captured by a device 110 may be inputted into the VAD component 2605. The VAD component 2605 may determine if the audio data 211 includes speech spoken by a human or voice activity by a human, and may determine a portion of the audio data 211 that includes speech or voice activity. The VAD component 2605 may send the portion of the audio data 211 including speech or voice activity to the user identification component 2610. The VAD component 2605 may employ voice activity detection techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the VAD component 2605 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

The user identification component 2610 may communicate with the user recognition component 295 to determine user audio data 2615 that corresponds to a particular user profile. The user recognition component 295 may recognize one or more users as described in connection with FIGS. 24 and 25. The user audio data 2615 may be a portion of the audio data 211 that includes speech or one or more utterances from a particular user associated with the user profile. In other words, audio data representing a particular user's speech may be isolated and stored as the user audio data 2615 for further analysis. In an example embodiment, the user may be associated with or using the device 110, and may have provided permission to the system 100 to record and analyze his or her voice/conversations to determine a sentiment category corresponding to the conversation.

The user audio data 2615 may be input into the encoder component 2620 to determine frame feature vector(s) 2625. The encoder component 2620 may be a bidirectional LSTM. The frame feature vector(s) 2625 may represent audio frame level features extracted from the user audio data 2615. One frame feature vector 2625 may represent audio frame level features for an audio frame of 20 ms of the user audio data 2615. The frame feature vector(s) 2625 may be derived by spectral analysis of the user audio data 2615. The sentiment detection component 275 may determine the portions of user audio data 2615 that correspond to individual words and may extract acoustic features from the respective portions of audio using the encoder component 2620.

In some embodiments, the frame feature vector(s) 2625 may be used to determine utterance feature vector(s) 2660 representing utterance-level features of one or more utterances represented in the user audio data 2615. The utterance feature vector(s) 2660 may be determined by performing statistics calculations, delta calculation and other processing on the frame feature vector(s) 2625 for the audio frames corresponding to an utterance of interest. As such, the utterance feature vector(s) 2660 may be a feature matrix whose dimensions are based on the number of audio frames corresponding to the utterance of interest and the dimension of the corresponding frame feature vector 2625. The utterance feature vector(s) 2660 may be a high-level function or other mathematical functions representing the utterance-level features.

The ASR component 250, as described above, may generate ASR output data, for example including text data representative of one or more utterances represented in the audio data 211. In some examples, the system sends audio data 211 to the ASR component 250 for processing. In other examples, the system sends user audio data 2615 to the ASR component 250 for processing. The ASR output may be represented as word feature vector(s) 2630, where each word feature vector 2630 may correspond to a word in the text data determined by the ASR component 250 and may represent lexical information of the utterance. The word feature vector 2630 may be a word embedding.

In an example embodiment, the sentiment detection component 275 determines that the user audio data 2615 includes an entire utterance. That is, the sentiment detection component 275 may determine that a beginpoint of the user audio data 2615 corresponds to a beginpoint of an utterance, and an endpoint of the user audio data 2615 corresponds to an endpoint of the utterance. In this case, the frame feature vector(s) 2625 and the word feature vector(s) 2630 may represent all the words in one utterance.

The sentiment detection component 275 may also input image data 211 which may come from still images, an image feed of video data, or the like for example from one or more cameras of device 110 or otherwise. The image data 211 may include a representation of a user which the system may analyze to determine the user's sentiment. Image data 211 may be processed by an encoder (not illustrated) to determine image feature vector(s) 2627. Such an encoder may be included as part of sentiment detection component 275 or may be located separately, in which case image feature vector(s) 2627 may be input into sentiment detection component 275 in addition to or instead of image data 211. The image data/feature vectors may be analyzed separately by sentiment detection component 275 if audio data/ASR data is unavailable. The image data/feature vectors may also be analyzed in conjunction with the audio data/ASR output data.

The sentiment detection component 275 may align a frame feature vector 2625 with a corresponding word feature vector 2630 such that the pair represents acoustic information and lexical information, respectively, for an individual word in the utterance represented in user audio data 2615. The sentiment detection component 275 may similarly align one or more image feature vector(s) 2627 with one or more frame feature vector(s) 2625 and/or corresponding word feature vector(s) 2630 so the appropriate image(s) are matched with the frames/ASR output data thus allowing the system to consider the audio, content and image of the user talking when performing sentiment analysis. The frame feature vectors 2625, image feature vector(s) 2627, and the word feature vectors 2630 may be processed by the trained model 2640 simultaneously.

The trained model 2640 may process the frame feature vector(s) 2625 and corresponding word feature vector(s) 2630 using a machine learning model. In some embodiments, the sentiment detection component 275 includes a modality attention component 2635 configured to determine how much acoustic information versus how much lexical information versus how much image information from the respective feature vectors 2625/2627/2630 should be used by the trained model 2640. In some cases the acoustic information corresponding to certain words may indicate a certain sentiment based on how the words were spoken by the user. In other cases the lexical information corresponding to certain words may indicate a certain sentiment based on the meaning or semantic of the word. For example, words "hey you" spoken with a certain level of anger, as indicated by the corresponding acoustic information, may indicate a sentiment category of anger, while the same words "hey you" spoken with no level of anger or excitement, as indicated by the corresponding acoustic information, may indicate a sentiment category of neutral. As a lexical example, the words "I am angry" may indicate a sentiment category of anger based on the corresponding lexical information. The modality attention component 2635 may assign a weight or percentage to the data represented by the acoustic feature vectors, the data represented by the image feature vectors, and the data represented by the lexical feature vectors to indicate the importance of each to the trained model 2640.

The trained model 2640 may be a neural network, for example a bi-directional LSTM. The output of the trained model 2640 may be fed into an utterance attention component 2645. The utterance attention component 2645 may employ a neural network, for example a recurrent neural network, although the disclosure is not limited thereto. The utterance attention component 2645 may be configured to emphasize relevant portions of an input utterance. The utterance attention component 2645 may be configured to take in output data from the trained model 2640 and produce an output for every time step (e.g., a 10 ms audio frame). The utterance attention component 2645 may be configured to aggregate information from different time intervals/audio frames of the input audio data to determine how certain parts of the utterance affects determining of the sentiment. For example, an acoustic representation of a first word in the utterance may indicate a high arousal implying anger, in which case the utterance attention component 2645 is configured to realize that the first word corresponds to an anger sentiment and that that should affect the processing of the other words in the utterance to ultimately determine a sentiment category corresponding to the utterance.

The utterance attention component 2645 may output score(s) 2650 indicating a sentiment category 2655 for the user audio data 2615. The sentiment detection component 275 may predict from multiple sentiment categories, including but not limited to, happiness, sadness, anger and neutral. In an example embodiment, the sentiment category 2655 may be determined after score(s) 2650 have been determined for a particular period of time of input audio data. In an example embodiment, the sentiment categories may be broad such as positive, neutral, and negative or may be more precise such as angry, happy, distressed, surprised, disgust, or the like.

In some embodiments, the sentiment detection component 275 is configured to determine a sentiment category 2675 at an utterance-level. The sentiment detection component 275 may use contextual information from the entire utterance to determine an overall sentiment of the speaker when speaking the utterance. The sentiment detection component 275 may also use information conveyed by individual words in the utterance to determine the sentiment of the speaker when speaking the utterance. For example, particular words may represent a particular sentiment or emotion because of its meaning (lexical information), while some words may represent a particular sentiment or emotion because of the way it is spoken by the user (acoustic information). In other embodiments, the sentiment detection component 275 may be configured to determine a sentiment category on a word level (that is for each word within an utterance).

As illustrated in FIG. 26, the trained model component 2665 may process the utterance feature vector(s) 2660 using a fully-connected neural network trained using techniques known to one of skill in the art. The trained model component 2665 may output score(s) 2670 indicating a sentiment category 2675 for the user audio data 2615.

The sentiment detection component 275 may predict one of three sentiment categories 2655/2675. In some examples, the sentiment categories 2655/2675 may be positive, neutral, and negative. However, the disclosure is not limited thereto, and in other examples the sentiment categories 2655/2675 may be angry, neutral (e.g., neutral/sad), and happy without departing from the disclosure. Additionally or alternatively, the sentiment detection component 275 may predict any number of sentiment categories 2655/2675 without departing from the disclosure. For example, the sentiment detection component 275 may predict one of four sentiment categories 2655/2675, such as angry, sad, neutral, and happy, although the disclosure is not limited thereto.

The machine learning model for the trained model 2640/2665 may take many forms, including a neural network. The trained model 2640/2665 may employ a convolutional neural network and/or may employ a fully-connected neural network. In some examples, a neural network may include a number of layers, from input layer 1 through output layer N. Each layer is configured to output a particular type of data and output another type of data. Thus, a neural network may be configured to input data of type data A (which is the input to layer 1) and output data of type data Z (which is the output from the last layer N). The output from one layer is then taken as the input to the next layer. For example, the output data (data B) from layer 1 is the input data for layer 2 and so forth such that the input to layer N is data Y output from a penultimate layer.

While values for the input data/output data of a particular layer are not known until a neural network is actually operating during runtime, the data describing the neural network describes the structure and operations of the layers of the neural network.

In some examples, a neural network may be structured with an input layer, middle layer(s), and an output layer. The middle layer(s) may also be known as the hidden layer(s). Each node of the hidden layer is connected to each node in the input layer and each node in the output layer. In some examples, a neural network may include a single hidden layer, although the disclosure is not limited thereto and the neural network may include multiple middle layers without departing from the disclosure. In this case, each node in a hidden layer will connect to each node in the next higher layer and next lower layer. Each node of the input layer represents a potential input to the neural network and each node of the output layer represents a potential output of the neural network. Each connection from one node to another node in the next layer may be associated with a weight or score. A neural network may output a single output or a weighted set of possible outputs.

In one aspect, the neural network may be constructed with recurrent connections such that the output of the hidden layer of the network feeds back into the hidden layer again for the next set of inputs. For example, each node of the input layer may connect to each node of the hidden layer, and each node of the hidden layer may connect to each node of the output layer. In addition, the output of the hidden layer may be fed back into the hidden layer for processing of the next set of inputs. A neural network incorporating recurrent connections may be referred to as a recurrent neural network (RNN).

Neural networks may also be used to perform ASR processing including acoustic model processing and language model processing. In the case where an acoustic model uses a neural network, each node of the neural network input layer may represent an acoustic feature of a feature vector of acoustic features, such as those that may be output after the first pass of performing speech recognition, and each node of the output layer represents a score corresponding to a subword unit (such as a phone, triphone, etc.) and/or associated states that may correspond to the sound represented by the feature vector. For a given input to the neural network, it outputs a number of potential outputs each with an assigned score representing a probability that the particular output is the correct output given the particular input. The top scoring output of an acoustic model neural network may then be fed into an HMM which may determine transitions between sounds prior to passing the results to a language model.

In the case where a language model uses a neural network, each node of the neural network input layer may represent a previous word and each node of the output layer may represent a potential next word as determined by the trained neural network language model. As a language model may be configured as a recurrent neural network which incorporates some history of words processed by the neural network, the prediction of the potential next word may be based on previous words in an utterance and not just on the most recent word. The language model neural network may also output weighted predictions for the next word.

Processing by a neural network is determined by the learned weights on each node input and the structure of the network. Given a particular input, the neural network determines the output one layer at a time until the output layer of the entire network is calculated.

Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data. In some circumstances, the neural network may be trained with an entire lattice to improve speech recognition when the entire lattice is processed.

Various machine learning techniques may be used to train and operate models to perform various steps described herein, such as user recognition, sentiment detection, image processing, gameplay management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 27:
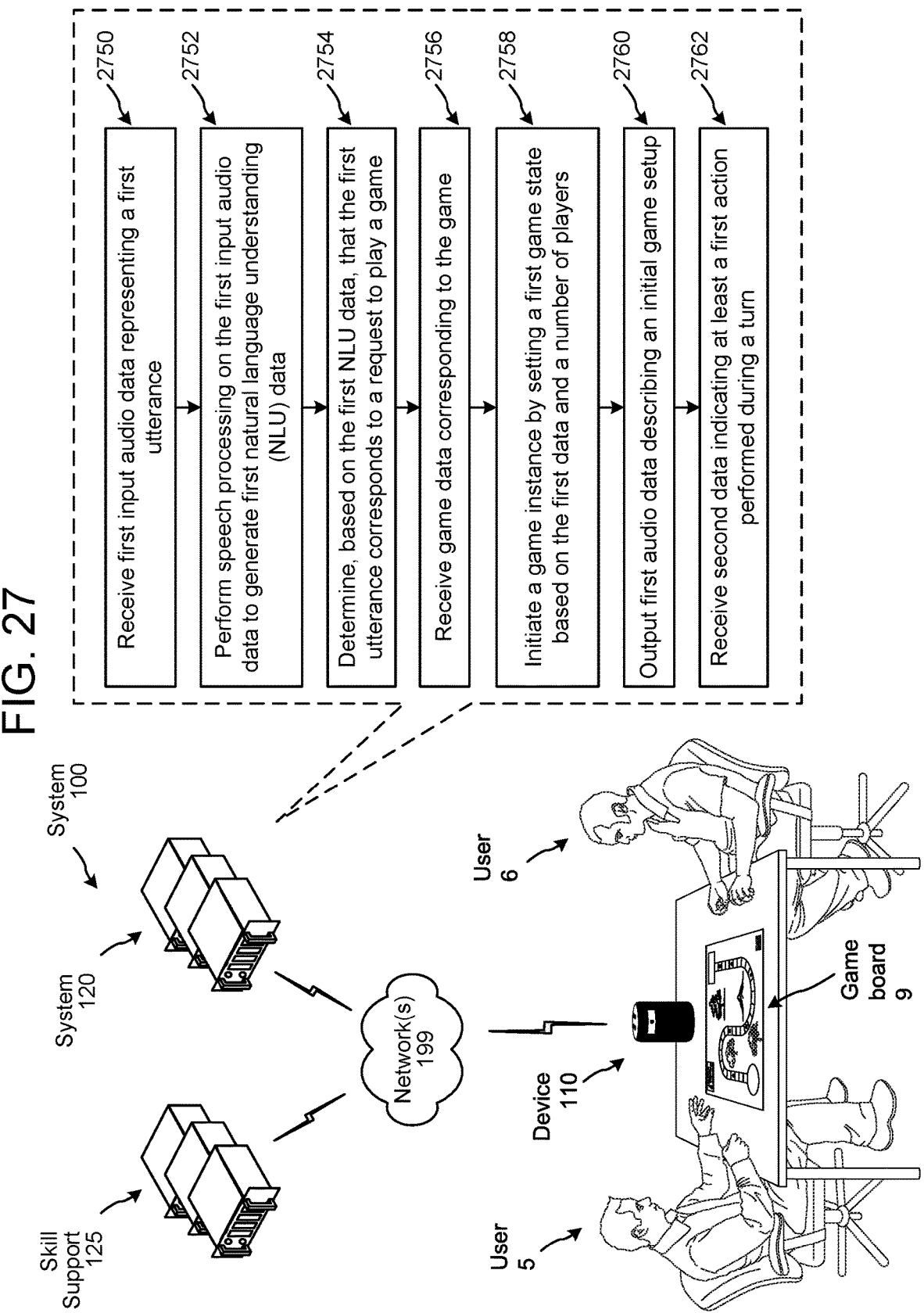
FIG. 27 is a conceptual diagram illustrating a system configured to guide and/or participate in playing a tabletop game, according to embodiments of the present disclosure.

FIG. 27 is a conceptual diagram illustrating components for the system 100 configured to guide and/or participate in playing a tabletop game, according to embodiments of the present disclosure. In particular, and as shown in FIG. 27, the system 100 may include a voice-enabled device 110 local to a user 5 and a user 6, a natural language command processing system 120 (abbreviated "system 120"), and one or more skill support systems 125 connected across one or more networks 199. While the users 5 and 6 are illustrated as being a human, other types of users (e.g., computing systems) may exist. In some implementations, the users 5 and 6 may be players of a tabletop game, engaging the system 100 as a game play "assistant." The users 5 and 6 may be teammates or opponents in the game. In some implementations, the system 100 may act as one or more additional players of the game. The particular tabletop game may include a game board 9; however, various tabletop games played with cards, dice, or other media are contemplated. Although the figures and discussion of the present disclosure illustrate certain steps in a particular order, the steps described may be performed in a different order (as well as certain steps removed or added) without departing from the present disclosure.

The device 110 may receive audio corresponding to a spoken natural language input originating from the user 5 and/or the user 6. The device 110 may record audio following detection of a wakeword. The device 110 may generate audio data corresponding to the audio, and may send the audio data to the system 120. The device 110 may send the audio data to the system 120 via an application that is installed on the device 110 and associated with the system 120. An example of such an application is the Amazon Alexa application that may be installed on a smart phone, tablet, or the like. In some implementations, the device 110 may receive text data corresponding to a natural language input originating from the user 5 and or the user 6, and send the text data to the system 120. The device 110 may also receive output data from the system 120, and generate a spoken-word audio output. The device 110 may include a camera for capturing image and/or video data for processing by the system 120. In some implementations, the device 110 may receive text files or files representing scanned text and/or images for transmission to the system 120 and subsequent natural language processing. Examples of various devices 110 are further illustrated in FIG. 38.

The following describes example operations for natural language configuration of a tabletop game system. The system 120 can receive first input audio data representing a first utterance (2750). The system 120 can perform speech processing on the first input audio data to generate first natural language understanding (NLU) data (2752). The system 120 can determine, based on the first NLU data, that the first utterance corresponds to a request to play a game (2754). The system 120 can receive game data corresponding to the game (2756). The system 120 can initiate a game instance by setting a first game state based on the first data and a number of players (2758). The system 120 can output first audio data describing an initial game setup (2760). The system 120 can receive second data indicating a first action performed during a turn (2762).

Figure 28:
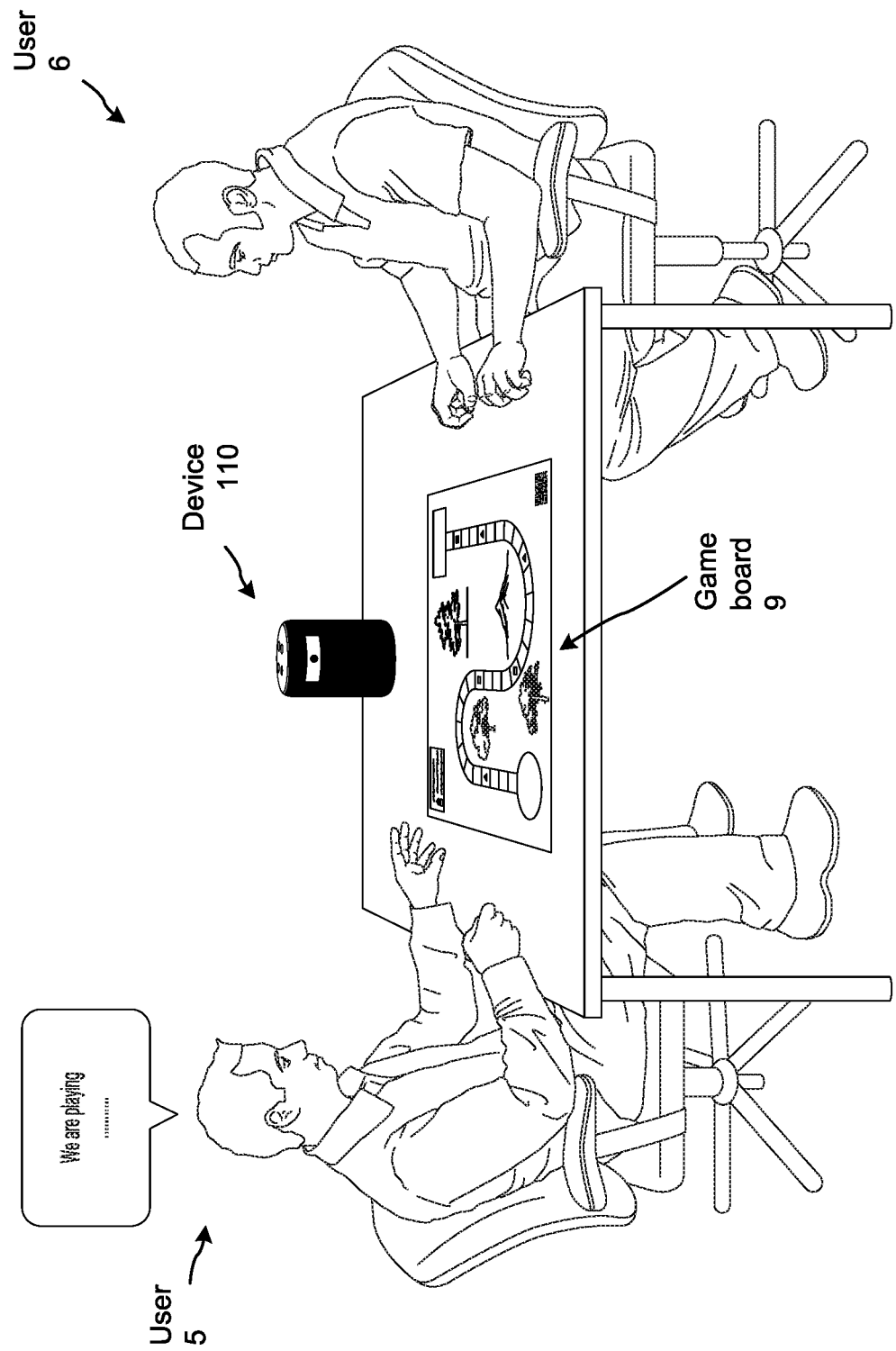
FIG. 28 illustrates users interacting with a device to begin playing a tabletop game, according to embodiments of the present disclosure.

FIG. 28 illustrates users 5 and 6 interacting with a device 110 to begin playing a tabletop game, according to embodiments of the present disclosure. The device 110 can interact with a natural language command processing system such as the system 120 previously described. In some implementations, the tabletop game may include a game board 9.

The system 120 can receive first input audio data representing a first utterance (2750). The user 5 or 6 may speak to (or near) the device 110. For example, The user 5 may say "We are playing . . . " and name the particular game the users 5 and 6 would like to play. The device 110 may transmit (e.g., over the network 199) audio data representing the received speech to the system 120 for processing. In some implementations, the device 110 may perform some or all of the speech processing locally. The system 120 can perform speech processing on the first input audio data to generate first NLU data (2752). ASR is described in additional detail herein with regard to FIG. 14, and NLU is described with regard to FIGS. 15 and 16. The system 120 can determine, based on the first NLU data, that the first utterance corresponds to a request to play a game (2754). The system 120 can receive game data corresponding to the game (2756). The system 120 can retrieve the game data from, for example, a game database 270. Example conceptual diagrams of game data for various types of games are described below with regard to FIGS. 4-7. In various implementations, the game data may include first state data representing an initial state of the game, first condition data representing at least a first condition that results in ending the game, first player data representing at least one player of the game, and first event data representing at least one action available during at least a first turn. In some implementations, the game data may include other information such as data related to one or more tokens, a random output generator, and/or a graph representing possible spaces and connections to be traversed by a token. In some implementations, the game data can include language data such as one or more of a domains-specific language model, intent classifier, and/or named entity recognition component. Importing and integrating game instructions with a speech-controlled system is described herein with regard to the example framework illustrated in FIGS. 17 through 22.

In some implementations, one of the users 5 or 6 can request modified rules such as a "house" rule. The user can speak the request to the device 110, and the system 120 can process the resulting audio data to determine that the user has described one or more rule modifications to use for the current instance of the game. The system 120 can update the game data to reflect the rule modification; e.g., the system 120 can generate second game data based on the game data and the one or more rule modifications. In some implementations, the system 120 can retain data regarding the one or more rule modifications so as to provide a customized game setting. The system 120 may process the audio data to identifier a speaker who requested the game. Alternatively or additionally, the system 120 may base user recognition on other information, such as images or biometric data. The system 120 may retrieve a customized game setting corresponding to a speaker identifier; for example, from the game database or a profile storage. User recognition is described in additional detail herein with regard to FIGS. 24 and 25.

In some implementations, the system 120 can act as one or more additional, computerized players of the game. The computerized players can play with or against a human player. The computerized players can be used to supplement human players when a game requires (or perhaps simply plays better) more players than there are users. The system 120 can receive a request, spoken or otherwise, to include one or more computerized players in the game. During the game, the system 120 can generate data representing one or more actions performed by the computerized player during a turn. The system 120 may indicate the action in various ways, including a spoken natural language output, a light projection component, or some other audio or display. For example, FIG. 32 illustrates the system 120 using natural language to dictate a move of a computerized player to a human player, according to embodiments of the present disclosure.

The system 120 can initiate a game instance by setting a first game state based on the first data and a number of players (2758). The system 120 can set the first game state by, for example, instantiating players, distributing tokens or points to a player's inventory, and/or determining an initial position for a token within a graph of the game.

In some implementations, the system 120 may learn the appearance of tokens whose appearance may vary, but whose definition is the same or similar even among different sets. For example, chess pieces vary in appearance from set to set, as do playing cards, but a rook and a jack nevertheless have the same rank and abilities. FIG. 31 illustrates the system 120 learning the appearance of a game piece whose definition is standard across game sets but whose appearance may vary, according to embodiments of the present disclosure. For example, the system can determined, based on the game data, that the game includes first token data representing a first token whose appearance may vary. The system 120 can instruct a user 5 or 6 to place an object corresponding to the token within a field of view of an image capture component of the device 110. The system 120 can receive image data representing an image of the object. The system 120 can perform image processing on the image data to generate representational data. An image data ingestion component of the system 120 may coordinate ingestion of image data and creating data that can then be used for later recognition of objects. Image processing is described in additional detail herein with regard to FIG. 13. The system 120 can associate the representational data with the first token data; for example, storing it temporarily (or longer term with regard to the particular user 5 or 6) in the game database.

In an example interaction, the system 120 may determine based on token definition data in the game data that a particular token, e.g., <Piece1> may have a non-standardized appearance. In some cases, the token definition data for <Piece1> may include no representational information at all regarding the appearance. The system 120 may thus generate an output prompt to the user 6: "Please show me Piece1." The user 5 may position the corresponding game piece in the field of view of the camera of the device 110, which captures image data of the game piece. The user 5 may narrate the process, for example, by stating "This is the front of Piece1." The system 120 may process the received speech and associate the processed image data with a front view of <Piece1>, where "front" can be a slot describing angle of received image data. The process may repeat for additional views of <Piece1>. The system 120 can process the image data to generate the representational data for the appearance of <Piece1>, and associate it with the corresponding token definition data. Therefore, while the game is being played, the system 120 can recognize <Piece1> as well as its position on the game board 9.

Figure 29:
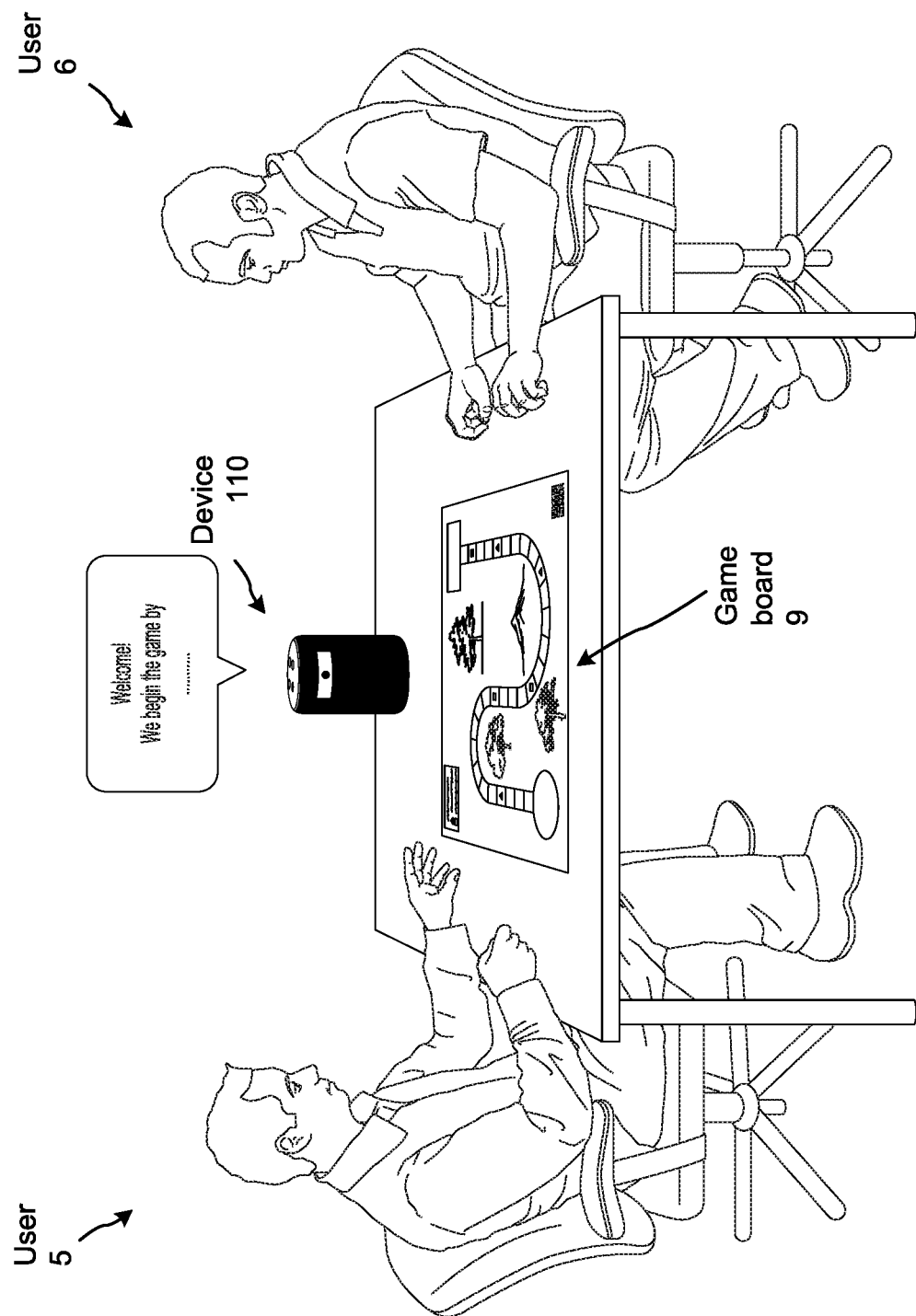
FIG. 29 illustrates the system describing an initial game setup using natural language, according to embodiments of the present disclosure.

The system 120 can output first audio data describing an initial game setup (2760). FIG. 29 illustrates the system 120 describing an initial game setup using natural language, according to embodiments of the present disclosure. The system 120 can describe an initial setup by, for example, describing player inventories and/or positions of one or more tokens for each player on the game board 9. In some implementations, the system 120 can use a camera of the device 110 to verify the setup with respect to tokens visible within the game play area. For example, the system 120, via the device 110 can output an instruction to place a first token at a first position within a game play area. The system 120 can receive image data representing an image of the game play area and process the image data to identify an object at a location within the game play area. The system 120 can determine that the object and the location do not correspond to the dictated token and position. Accordingly, the system can output a message indicating that the token is not in the proper position. In some implementations, the device 110 may include a light projection component, which the system 120 can employ to illuminate a region of a surface of the game play area to indicate a location where a token should be placed. The system 120 could also use such a light projection component to indicate a particular action (e.g., moving a token) or to project an entire game board, as described with regard to FIGS. 33A-34.

Figure 33B:
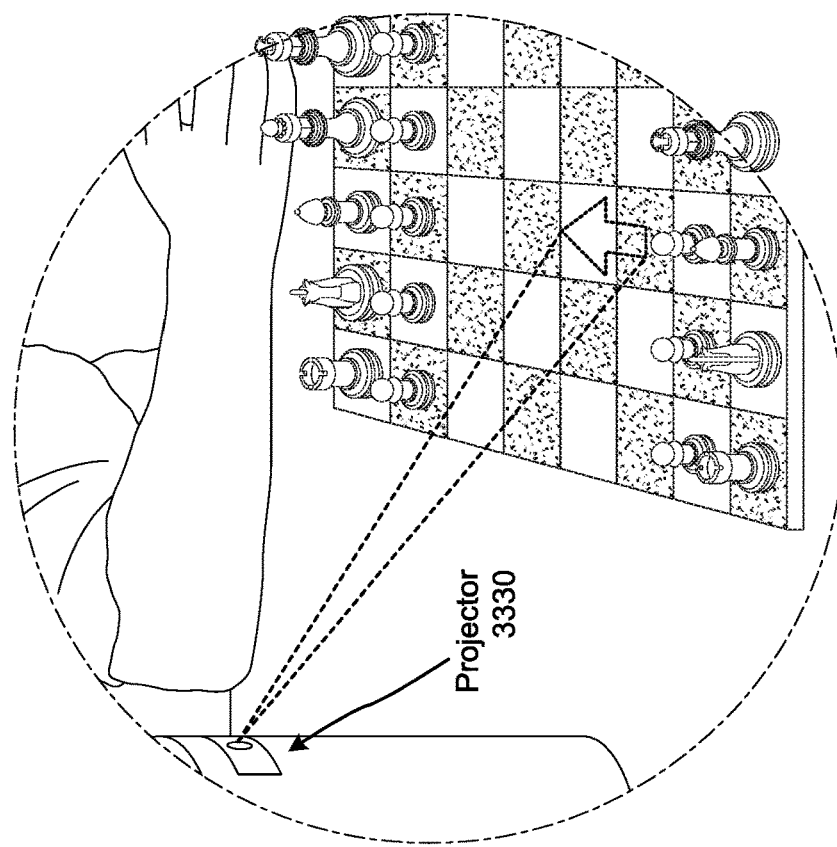
FIGS. 33A-33C illustrate the system using a light projection component to indicate a move of a computerized player to a human player, according to embodiments of the present disclosure.
Figure 33A:
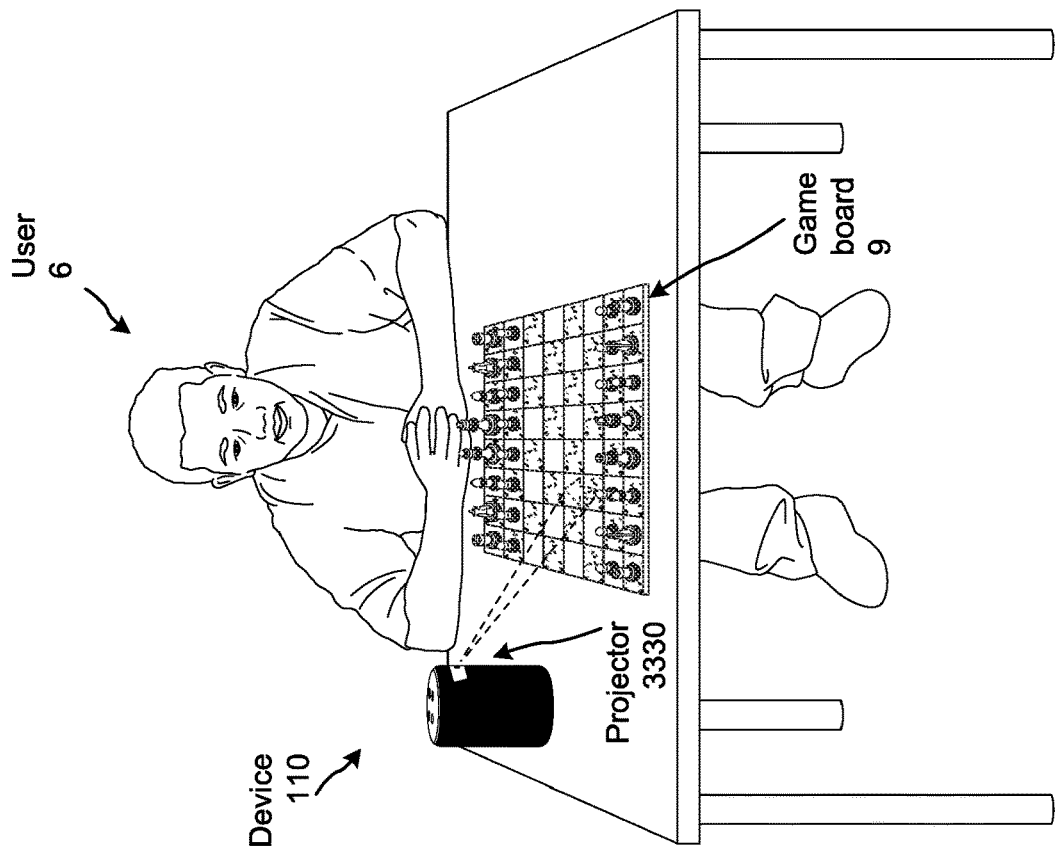
Figure 33C:
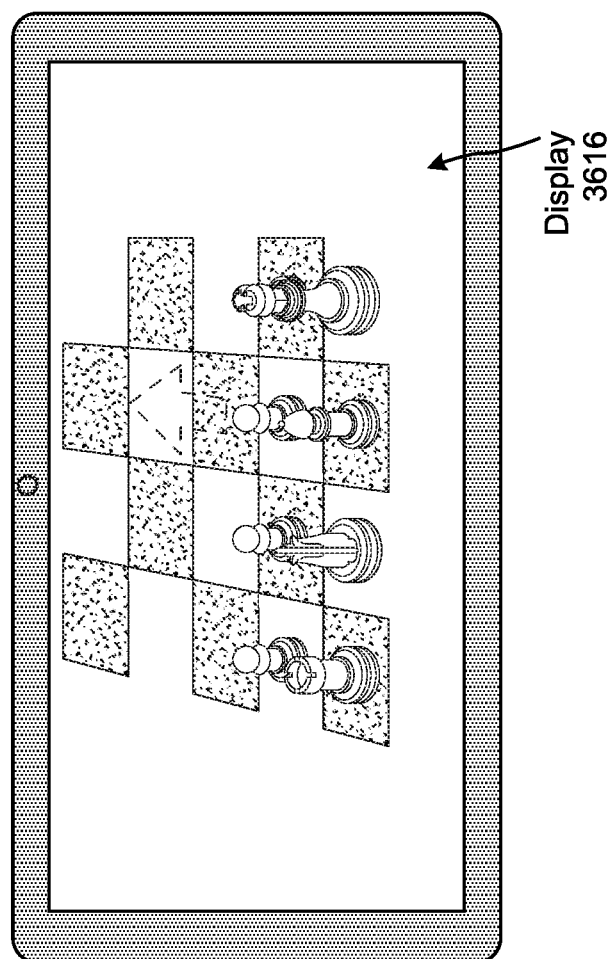
Figure 34:
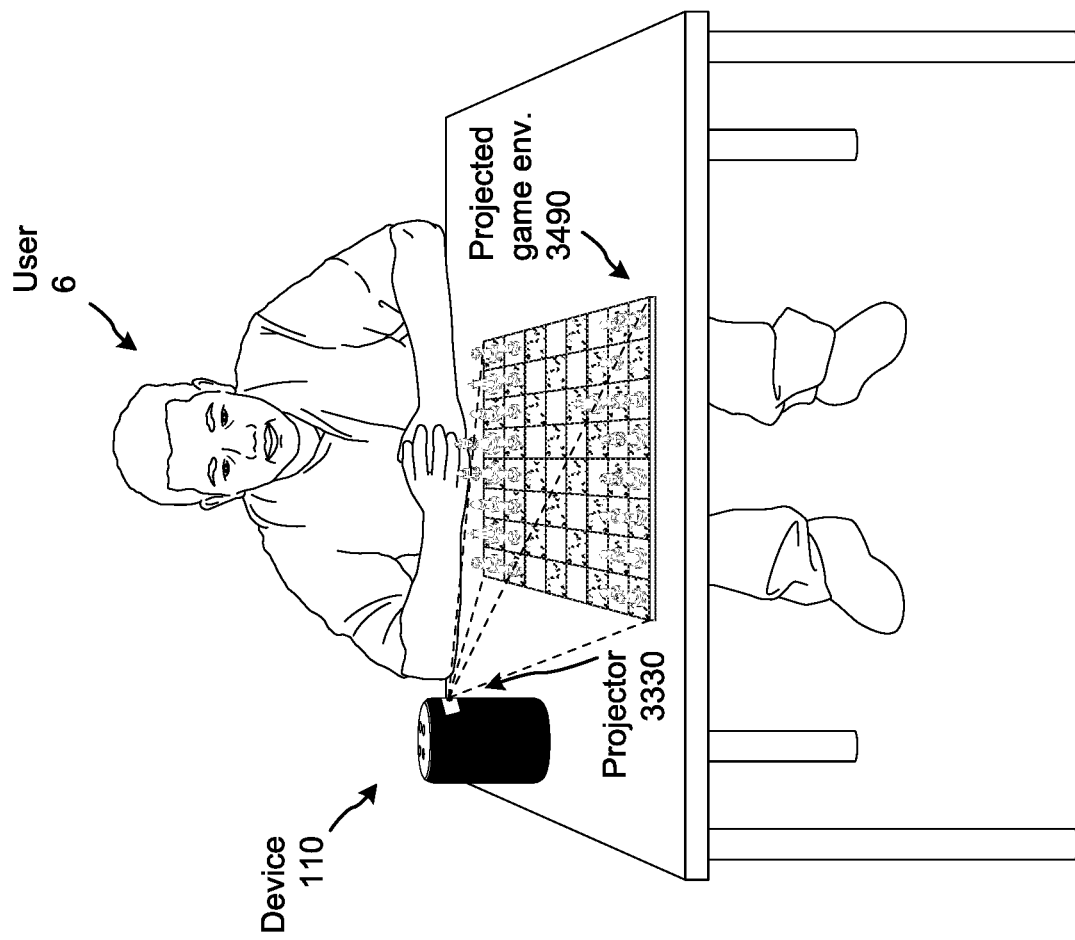
FIG. 34 illustrates the system using a light projection component to provide a display of a game board and multiple tokens, according to embodiments of the present disclosure.

FIG. 33A-33C illustrates the system 120 using a light projection component of the device 110 to indicate a move of a computerized player to a human player, according to embodiments of the present disclosure. In various implementations, the light projection component 3330 may include one or more lamps and/or lasers. Example light projection technologies that may be used include light emitting diode (LED) displays such as digital light processing (DLP) displays, liquid crystal displays (LCD), and liquid crystal on silicon (LCoS). In some implementations, the device 110 may include a solid-state laser. The light projection component 3330 can project an arrow or other visible indicator onto the game board 9. Based on the visible indicator, the user 6 may move the game piece on behalf of the computerized player. In some implementations, the device 110 and system 120 may go further, and project the entire game board 9 and all of the tokens. As shown in FIG. 33C, the device 110 may also include a display 3616 to indicate to the user the move to perform. FIG. 34 illustrates the system 120 using the light projection component 3330 to provide a display of the game environment 3490 including a game board and multiple tokens, according to embodiments of the present disclosure.

Figure 35:
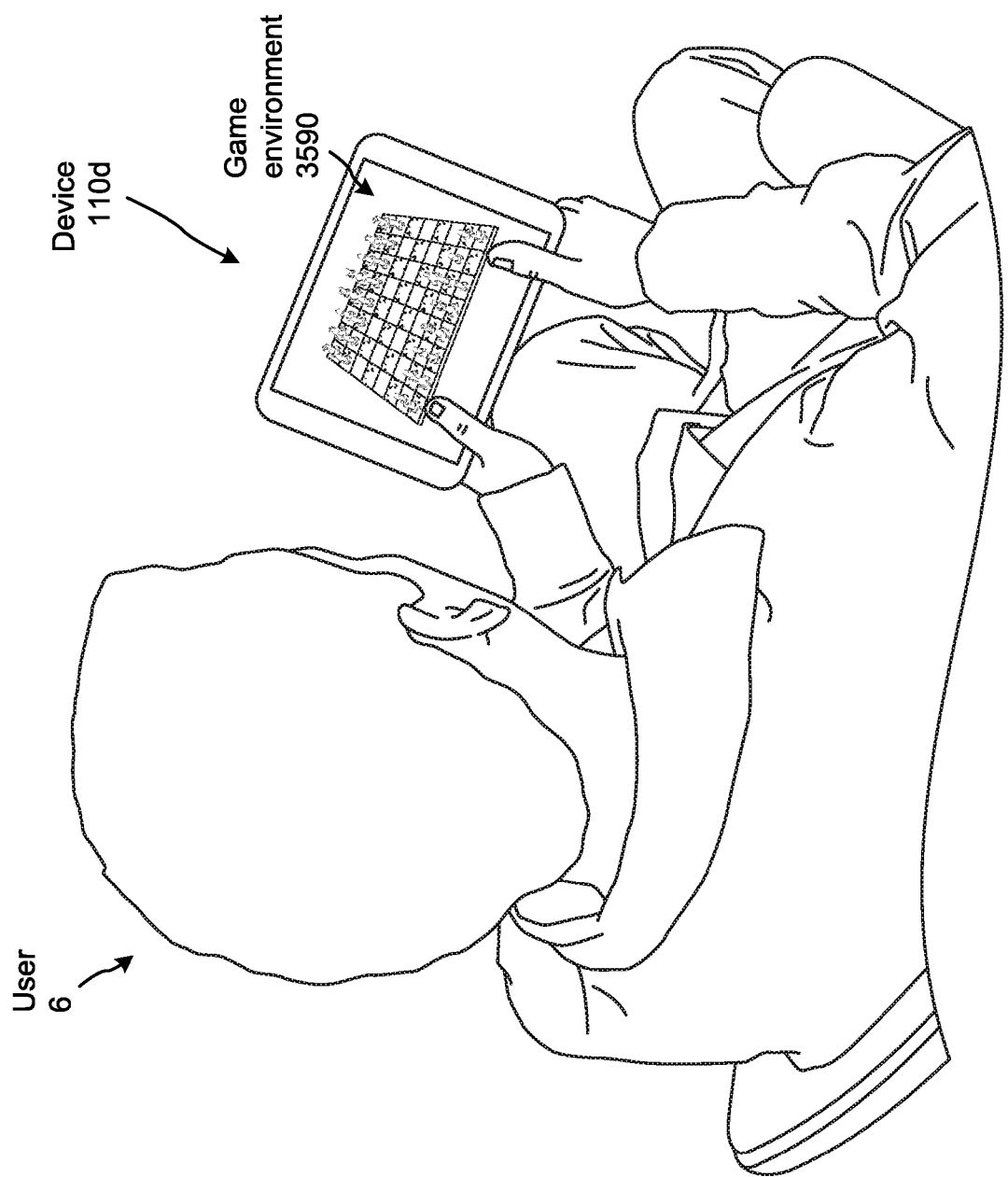
FIG. 35 illustrates the system providing a game instance in progress on a portable device, according to embodiments of the present disclosure.

Because the system 120 maintains the entire game state, in some implementations, the system 120 may allow for portability of the gaming experience by allowing the user 6 to take up a game instance in progress on another device. FIG. 35 illustrates the system 120 providing a game instance in progress on a portable device such as a tablet computer 110*d*, according to embodiments of the present disclosure. For example, as shown in FIG. 34, the device 110 (e.g., a speech-enabled device 110*a*) may project a game environment 3490, such that no physical tokens or game board is necessary. The system 120 may use the game state to similarly provide a game environment 3590 via the tablet computer 110*d*, enabling the user 6 to continue a game instance using various devices 110 in turn at various locations.

Returning to FIG. 27, the system 120 can receive second data indicating a first action performed during a turn (2762). The system 120 can receive the indication of the action by several means. The user 5 or 6 can verbally describe the move to the device 110 for processing using the speech processing abilities of the device 110 and/or system 120. A camera of the device 110 can capture one or more images of the game play area, and the system 120 can process the images to detect a repositioned token. The device 110 may capture the image following an indication by the user 5 or 6 that an action has been completed. Other manners of detecting the action are also possible; for example, capturing images of a hand gesture on a game projected by the device 110 as in FIG. 34.

In some implementations, the system 120 can determine whether the action taken is valid under the rules of the game. Game rules governing actions can include an option and a constraint. Example options can include invoking a randomizer, moving one or more pieces, and/or drawing or playing one or more cards. An option may be subject to one or more constraints that limit how the option may be exercised based on a current game state; for example, a constraint may prevent an otherwise valid move for a first token if the move would result in sharing a space with second token. Accordingly, the system 120 may determine that the action is associated with option data and constraint data in the game data. The system 120 may determine that the action corresponds to at least one option in the first option data. However, the system 120 may determine, based on the constraint data and a current state of the game, that the action violates a constraint represented in the constraint data. If so, the system 120 may output an indication that the action is invalid based on the current game state.

In some implementations, the system 120 may have sentiment detection capabilities. Sentiment detection may improve a user experience by, for example, detecting when a user is happy and offering congratulations. In another example, the system can detect when a user is frustrated and offer assistance. Sentiment detection is described in additional detail herein with regard to FIG. 26. The system 120 can process input audio data to determine a score indicating a sentiment category, and determine that the score corresponds to a negative sentiment category. Based on the detected negative sentiment, the system 120 can attempt to recommend a move. The system 120 can determine a valid action to take based on the current game state, and generate a natural language output suggesting the valid action. The system 120 can determine the valid action using, for example, a game playthrough engine, described previously with regard to FIG. 3.

Figure 30:
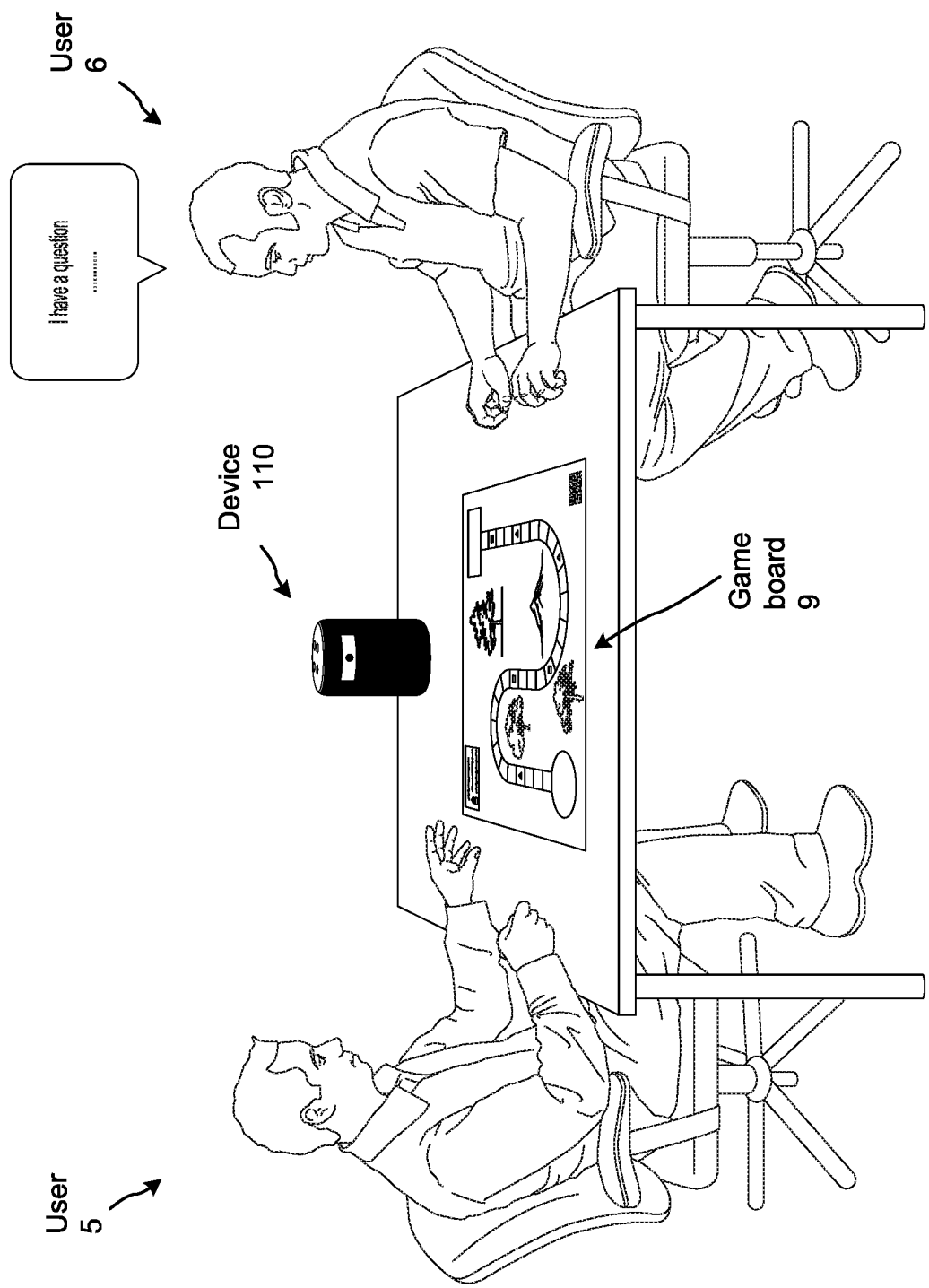
FIG. 30 illustrates a user asking the system a question about the game, according to embodiments of the present disclosure.

In some implementations, the system 120 can recite game instructions in response to a request from a user 5 or 6. FIG. 30 illustrates a user asking the system 120 a question about the game, according to embodiments of the present disclosure. The system 120 can receive a spoken request via the device 110, and perform speech processing on the resulting audio data to determine that the audio data corresponds to a request for instructions related to the game. The system 120 can, based on one or more words detected in the request, retrieve text data from data ingested and integrated from the game instructions; for example, using the framework described in FIGS. 17 through 22. The system 120 can us a text-to-speech (TTS) component to generate output audio data representing a description of at least a portion of the instructions. The TTS component is described in additional detail herein with regard to FIG. 23.

Although described herein with regard to a tangible game as a primary example embodiment, the system, components, and operations described herein may also apply to interactions and operations corresponding to one or more physical tokens and/or one or more areas to operate such tokens even if such operations may not be considered a "game." Thus the embodiment of a player of a game, operating a game token according to game rules may be generalized to include an operator engaging with the system in a manner corresponding to operations of at least one first physical token within an area that may have defined spaces therein. The operations may correspond to data such as rules data, state data, condition data, operator data, option data, constraint data, token data, graph data, as described herein with regard to a game. The system may also use image data to learn information about the operations and/or ensure satisfaction of rule or other data concerning the operations.

Figure 36:
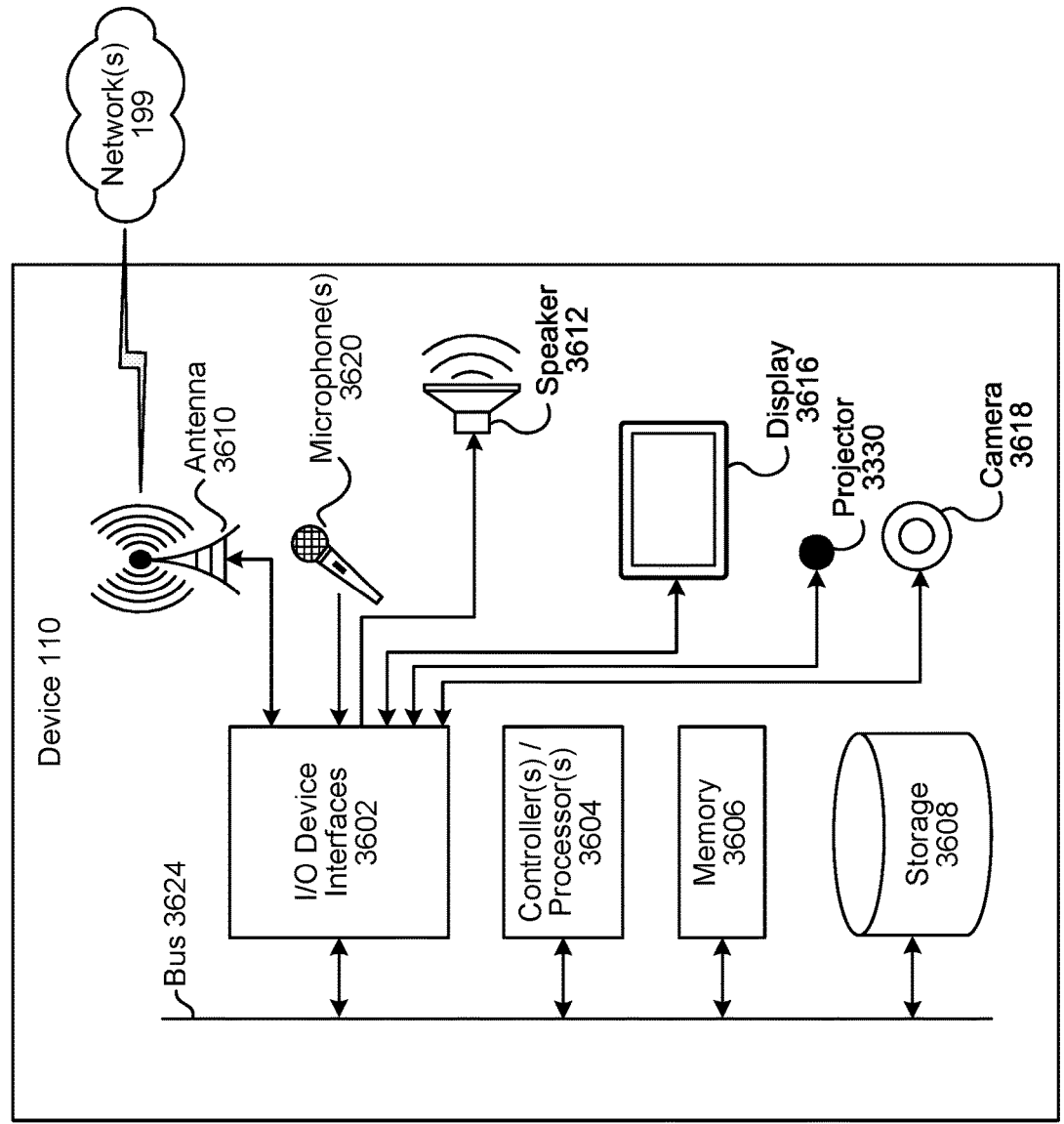
FIG. 36 is a block diagram conceptually illustrating example components of a device, according to embodiments of the present disclosure.
Figure 37:
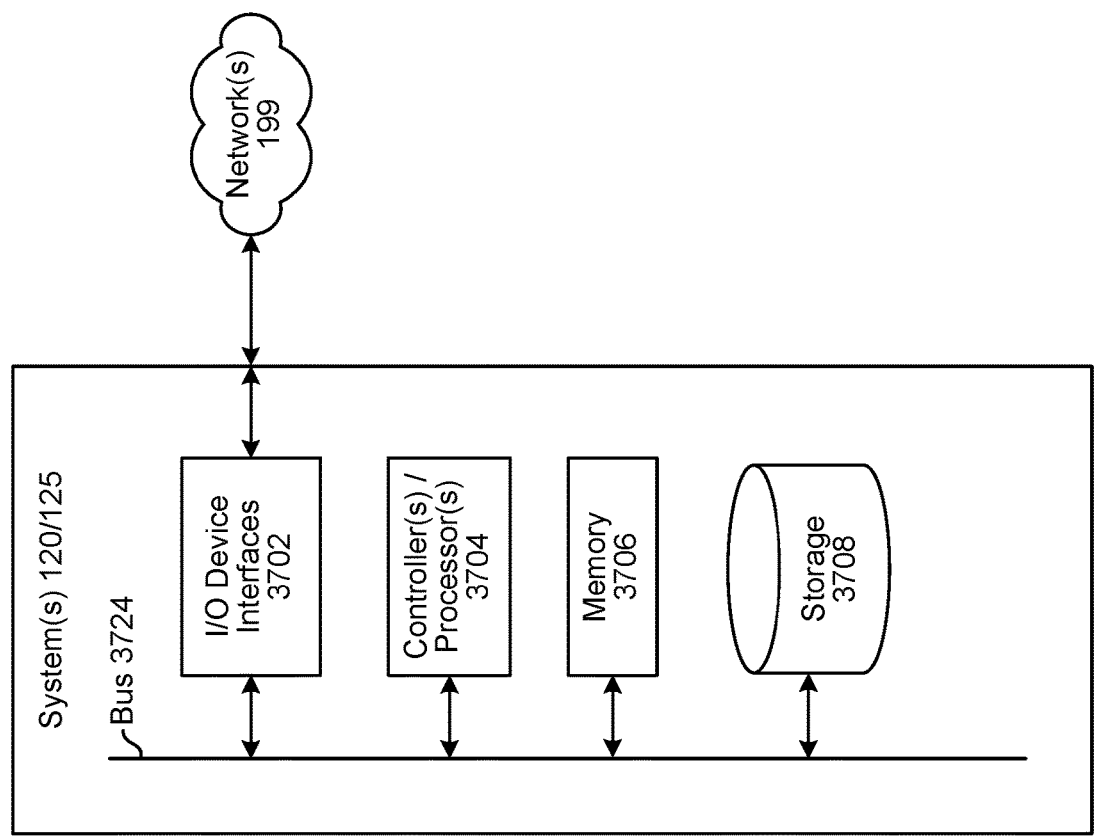
FIG. 37 is a block diagram conceptually illustrating example components of a system, according to embodiments of the present disclosure.

FIG. 36 is a block diagram conceptually illustrating a device 110 that may be used with the system. FIG. 37 is a block diagram conceptually illustrating example components of a remote device, such as the natural language command processing system 120, which may assist with ASR processing, NLU processing, etc., and a skill system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the overall system 100 of the present disclosure, such as one or more natural language processing systems 120 for performing ASR processing, one or more natural language processing systems 120 for performing NLU processing, one or more skill systems 125, etc. In operation, each of these systems may include computer-readable and computer-executable instructions that reside on the respective device (120/125), as will be discussed further below.

Each of these devices (110/120/125) may include one or more controllers/processors (3604/3704), which may each include a central processing unit (CPU) for processing data and computer-readable instructions, and a memory (3606/3706) for storing data and instructions of the respective device. The memories (3606/3706) may individually include volatile random access memory (RAM), non-volatile read only memory (ROM), non-volatile magnetoresistive memory (MRAM), and/or other types of memory. Each device (110/120/125) may also include a data storage component (3608/3708) for storing data and controller/processor-executable instructions. Each data storage component (3608/3708) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (3602/3702).

Computer instructions for operating each device (110/120/125) and its various components may be executed by the respective device's controller(s)/processor(s) (3604/3704), using the memory (3606/3706) as temporary "working" storage at runtime. A device's computer instructions may be stored in a non-transitory manner in non-volatile memory (3606/3706), storage (3608/3708), or an external device(s). Alternatively, some or all of the executable instructions may be embedded in hardware or firmware on the respective device in addition to or instead of software.

Each device (110/120/125) includes input/output device interfaces (3602/3702). A variety of components may be connected through the input/output device interfaces (3602/3702), as will be discussed further below. Additionally, each device (110/120/125) may include an address/data bus (3624/3724) for conveying data among components of the respective device. Each component within a device (110/120/125) may also be directly connected to other components in addition to (or instead of) being connected to other components across the bus (3624/3724).

Referring to FIG. 36, the device 110 may include input/output device interfaces 3602 that connect to a variety of components such as an audio output component such as a speaker 3612, a wired headset or a wireless headset (not illustrated), or other component capable of outputting audio. The device 110 may also include an audio capture component. The audio capture component may be, for example, a microphone 3620 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 3616 for displaying content. The device 110 may further include a camera 3618. The device 110 may further include a projector 3330. The display 3616 may comprise touch sensitive elements to form a touchscreen that allows a user to provide input to the device 110/system 120 using a touch interface. This may be used to initiate/interact with a game play instance that will involve the physical game components such as a board/tokens as described herein.

Via antenna(s) 363610, the input/output device interfaces 3602 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (3602/3702) may also include communication components that allow data to be exchanged between devices such as different physical servers in a collection of servers or other components.

The components of the device(s) 110, the natural language command processing system 120, or a skill system 125 may include their own dedicated processors, memory, and/or storage. Alternatively, one or more of the components of the device(s) 110, the natural language command processing system 120, or a skill system 125 may utilize the I/O interfaces (3602/3702), processor(s) (3604/3704), memory (3606/3706), and/or storage (3608/3708) of the device(s) 110, natural language command processing system 120, or the skill system 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system 120, and a skill system 125, as described herein, are illustrative, and may be located as a stand-alone device or may be included, in whole or in part, as a component of a larger device or system.

As illustrated in FIG. 38, multiple devices (110a-110n, 120, 125) may contain components of the system and the devices may be connected over a network(s) 199. The network(s) 199 may include a local or private network or may include a wide network such as the Internet. Devices may be connected to the network(s) 199 through wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a microwave 110j may be connected to the network(s) 199 through a wireless service provider, over a WiFi or cellular network connection, or the like. Other devices are included as network-connected support devices, such as the natural language command processing system 120, the skill system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of the natural language command processing system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving first data representing printed instructions for playing a game;
   performing natural language understanding (NLU) processing on the first data to generate first NLU results data corresponding to the printed instructions;
   identifying a first portion of the first NLU results data related to game setup;
   processing the first portion to determine first state data representing an initial state of the game;
   identifying a second portion of the first NLU results data related to a game objective;
   processing the second portion to determine first condition data representing at least a first condition that results in ending the game;
   identifying a third portion of the first NLU results data related to at least one player of the game;
   processing the third portion to determine first player data representing at least one player of the game;
   identifying a fourth portion of the first NLU results data related to at least one action to be performed during the game;
   processing the fourth portion to determine first event data representing the at least one action available during the game;
   determining first game data including at least the first state data, first condition data, first player data and first event data; and
   processing at least a portion of the first game data to configure a first speech processing model for use with a future natural language input corresponding to the game.

2. The computer-implemented method of claim 1, further comprising:
   processing the first game data to simulate at least a first hypothetical game without human player involvement;
   detecting, based at least in part on the first hypothetical game, a first game state in which a computerized player has no valid action available;
   determining that the first game data does not address the first game state;
   outputting first output data indicating a first potential flaw in the first game data;
   receiving second data representing a natural language response to the first output data;
   performing NLU processing on the second data to generate second NLU results data;
   determining at least one modification of the first game data based on the second NLU results data;
   determining that the at least one modification resolves the first potential flaw in the first game data; and
   generating second game data based on the first game data and the at least one modification.

3. The computer-implemented method of claim 1, further comprising:
   receiving, from an image capture component, image data representing a game board corresponding to the game;
   performing image processing on the image data to determine:
      a first node associated with a first game space,
      a second node associated with a second game space, and
      an edge associating the first game space with the second game space;
   determining, based at least on the first node, the second node, the edge, and the first game data, first graph data representing the game board;
   receiving first input audio data corresponding to a first utterance;
   performing speech processing on the first input audio data to generate second NLU results data;
   determining, based on the second NLU results data, that the first utterance describes at least a first additional connection between a first game space and a second game space, the first additional connection not determined based on the image processing;
   generating second graph data based on the first graph data and at least a first additional edge corresponding to the first additional connection; and
   generating second game data based on the first game data and the second graph data.

4. The computer-implemented method of claim 1, further comprising:
   receiving second data representing a request to initiate a first instance of a game;
   receiving the first game data, the first game data corresponding to the game;
   receiving third data corresponding to a first utterance;
   performing speech processing on the third data to generate second NLU results data;
   determining, based on the second NLU results data, that the first utterance describes at least a first rule modification to use for the first instance of the game; and
   generating second game data based on the first game data and the first rule modification.

5. A computer-implemented method comprising:
   receiving first data representing a natural language representation of instructions for operations corresponding to a first physical token;

performing natural language understanding (NLU) processing on the first data to generate first NLU results data corresponding to the instructions;

processing the first NLU results data to determine:
- first state data representing an initial state of the operations,
- first condition data representing at least a first condition that results in ending the operations,
- first operator data representing at least one operator corresponding to the first physical token, and
- first event data representing at least one action available corresponding to the first physical token;

determining second data including at least the first state data, the first condition data, the first operator data and the first event data; and processing at least a portion of the second data to configure a first speech processing model for use with a future natural language input.

6. The computer-implemented method of claim 5, further comprising:
- detecting at least a first potential flaw in the second data, wherein the first potential flaw is one of an ambiguity, a conflict, or an undefined state;
- outputting first output data corresponding to the first potential flaw;
- receiving third data representing a natural language response to the first output data;
- performing NLU processing on the third data to generate second NLU results data;
- determining at least one modification of the second data based on the second NLU results data;
- determining that the at least one modification resolves the first potential flaw in the second data; and
- generating fourth data based on the second data and the at least one modification.

7. The computer-implemented method of claim 5, further comprising:
- receiving image data representing an area corresponding to the operations corresponding to a first physical token;
- performing image processing on the image data to determine:
  - a first node associated with a first space in the area,
  - a second node associated with a second space in the area, and
  - an edge associating the first space with the second space;
- determining, based at least on the first node, the second node, the edge, and the second data, graph data representing the area; and
- generating third data based on the second data and the graph data.

8. The computer-implemented method of claim 7, further comprising:
- receiving fourth data indicating that a portion of the image data corresponds to a portion of the area other than a space associated with potential operations of the first physical token;
- determining at least one modification to the graph data based on the fourth data; and
- generating fifth data based on the third data and the at least one modification.

9. The computer-implemented method of claim 5, further comprising:
- processing the first NLU results data to determine first token data representing the first physical token;
- outputting first output data requesting the first physical token be positioned within a field of view of an image capture component;
- receiving, from the image capture component, first image data representing a first image of the first physical token;
- performing image processing on the first image data to generate first representational data; and
- generating third data based on the second data and an association between the first representational data with the first token data.

10. The computer-implemented method of claim 5, further comprising:
- processing the first NLU results data to determine first random element data representing a random output generator described in the second data;
- outputting first output data requesting a natural language description of the random output generator;
- receiving, in response to the first output data, third data representing a natural language representation of the natural language description of the random output generator;
- performing NLU processing on the third data to generate second NLU results data;
- processing the second NLU results data to determine parameters for an invocation of the random output generator, the parameters including one or more of a type of result value, a lower boundary, an upper boundary, and a number of result values to generate per invocation; and
- generating fourth data based on the second data, the random output generator, and the parameters.

11. The computer-implemented method of claim 5, further comprising:
- determining first rule data describing, for the at least one action available corresponding to the first physical token, the first rule data including:
  - option data describing at least one option corresponding to the at least one action available, and
  - constraint data describing at least one constraint that, based on current state data, prevents an option otherwise allowed based on the option data.

12. The computer-implemented method of claim 11, further comprising:
- receiving third data representing a request to initiate operations corresponding to the first physical token;
- receiving the second data, the second data corresponding to the request;
- receiving fourth data indicating a first potential action performed during the operations;
- determining, based on the option data, that the first potential action corresponds to the at least one option;
- determining, based on the constraint data and current state data, that the first potential action violates a constraint; and
- outputting first output data indicating that the first potential action is invalid based on the current state data.

13. A system, comprising:
- at least one processor; and
- at least one memory comprising instructions that, when executed by the at least one processor, cause the system to:
  - receive first data representing a natural language representation of instructions for operations corresponding to a first physical token;

perform natural language understanding (NLU) processing on the first data to generate first NLU results data corresponding to the instructions;
process the first NLU results data to determine:
first state data representing an initial state of the operations,
first condition data representing at least a first condition that results in ending the operations,
first operator data representing at least one operator corresponding to the first physical token, and
first event data representing at least one action available corresponding to the first physical token;
determine second data including at least the first state data, the first condition data, the first operator data and the first event data; and
process at least a portion of the second data to configure a first speech processing model for use with a future natural language input.

14. The system of claim 13, wherein the at least one memory further comprises instructions that, when executed by the at least one processor, further cause the system to:
detect at least a first potential flaw in the second data, wherein the first potential flaw is one of an ambiguity, a conflict, or an undefined state;
output first output data corresponding to the first potential flaw;
receive third data representing a natural language response to the first output data;
perform NLU processing on the third data to generate second NLU results data;
determine at least one modification of the second data based on the second NLU results data;
determine that the at least one modification resolves the first potential flaw in the second data; and
generate fourth data based on the second data and the at least one modification.

15. The system of claim 13, wherein the at least one memory further comprises instructions that, when executed by the at least one processor, further cause the system to:
receive image data representing an area corresponding to the operations corresponding to a first physical token;
perform image processing on the image data to determine:
a first node associated with a first space in the area,
a second node associated with a second space in the area, and
an edge associating the first space with the second space;
determine, based at least on the first node, the second node, the edge, and the second data, graph data representing the area; and
generate third data based on the second data and the graph data.

16. The system of claim 15, wherein the at least one memory further comprises instructions that, when executed by the at least one processor, further cause the system to:
receive fourth data indicating that a portion of the image data corresponds to a portion of the area other than a space associated with potential operations of the first physical token;
determine at least one modification to the graph data based on the fourth data; and
generate fifth data based on the third data and the at least one modification.

17. The system of claim 13, wherein the at least one memory further comprises instructions that, when executed by the at least one processor, further cause the system to:
process the first NLU results data to determine first token data representing the first physical token;
output first output data requesting the first physical token be positioned within a field of view of an image capture component;
receive, from the image capture component, first image data representing a first image of the first physical token;
perform image processing on the first image data to generate first representational data; and
generate third data based on the second data and an association between the first representational data with the first token data.

18. The system of claim 13, wherein the at least one memory further comprises instructions that, when executed by the at least one processor, further cause the system to:
process the first NLU results data to determine first random element data representing a random output generator described in the second data;
output first output data requesting a natural language description of the random output generator;
receive, in response to the first output data, third data representing a natural language representation of the natural language description of the random output generator;
perform NLU processing on the third data to generate second NLU results data;
process the second NLU results data to determine parameters for an invocation of the random output generator, the parameters including one or more of a type of result value, a lower boundary, an upper boundary, and a number of result values to generate per invocation; and
generate fourth data based on the second data, the random output generator, and the parameters.

19. The system of claim 13, wherein the at least one memory further comprises instructions that, when executed by the at least one processor, further cause the system to:
determine first rule data describing, for the at least one action available corresponding to the first physical token, the first rule data including:
option data describing at least one option corresponding to the at least one action available, and
constraint data describing at least one constraint that, based on current state data, prevents an option otherwise allowed based on the option data.

20. The system of claim 19, wherein the at least one memory further comprises instructions that, when executed by the at least one processor, further cause the system to:
receive third data representing a request to initiate operations corresponding to the first physical token;
receive the second data, the second data corresponding to the request;
receive fourth data indicating a first potential action performed during the operations;
determine, based on the second data, that the first potential action corresponds to the at least one option;
determine, based on the constraint data and current state data, that the first potential action violates a constraint; and
output first output data indicating that the first potential action is invalid based on the current state data.

* * * * *